United States Patent [19]

Miller

[11] Patent Number: 4,740,882

[45] Date of Patent: Apr. 26, 1988

[54] SLAVE PROCESSOR FOR CONTROLLING ENVIRONMENTS

[75] Inventor: Peter T. Miller, Norwalk, Conn.

[73] Assignee: Environmental Computer Systems, Inc., South Salem, N.Y.

[21] Appl. No.: 879,352

[22] Filed: Jun. 27, 1986

[51] Int. Cl.$^4$ .................. G06F 15/46; G06F 15/16
[52] U.S. Cl. ............................... 364/132; 364/200; 364/138; 340/825.06
[58] Field of Search ..................... 364/131–134, 364/140–147, 138, 139, 200 MS File, 900 MS File; 340/825.05, 825.06, 825.07, 825.08, 825.11, 825.13, 825.54, 825.55

[56] References Cited

U.S. PATENT DOCUMENTS

| | | | |
|---|---|---|---|
| 4,459,655 | 7/1984 | Willemin | 364/132 |
| 4,467,412 | 8/1984 | Hoff | 364/132 X |
| 4,530,045 | 7/1985 | Petroff | 364/132 X |
| 4,626,984 | 12/1986 | Unruh et al. | 364/132 |
| 4,628,478 | 12/1986 | Henderson, Jr. | 364/132 X |

Primary Examiner—Joseph Ruggiero

Attorney, Agent, or Firm—Rosen, Dainow & Jacobs

[57] ABSTRACT

A slave processor for controlling environments has a microprocessor coupled to digital inputs and outputs, to an analog-to-digital convertor connected to analog outputs, to an interface connected, and to a decoder, to a carrier current transmitter, and to a switch. The interface is connected to the serial input of the microprocessor and the switch is connected to the serial output of the microprocessor. The microprocessor is capable of retrieving at least one bit of data information from the digital inputs, retrieving a byte of data information from the analog-to-digital convertor, sending a bit of control information to the digital outputs and sending a pulse-width-modulated control signal to the carrier current transmitter in accordance with operating system instructions and applications program instructions in a first mode, and the microprocessor is capable of outputting stored applications program instructions, logged data and status information in serial form to the interface and receiving new applications program instructions in serial form from the interface in accordance with operating system instructions in a second mode.

22 Claims, 15 Drawing Sheets

A. MANUAL CONTROL (HEATING/COOLING CONTROLLED BY HOME THERMOSTAT.)
B. CARETAKER CONTROLLED WITH HOUSE THERMOSTAT CONTROLLING HIGH LIMIT HEATING OR LOW LIMIT COOLING.
C. CARETAKER CONTROL OF HEATING.

SLAVE PROCESSOR FOR CONTROLLING ENVIRONMENTS

FIELD OF THE INVENTION

The invention relates to a microcomputerized slave processor for controlling the environment in a building, such as a home or a greenhouse, in accordance with a stored program.

BACKGROUND OF THE INVENTION

It is known to control a home environment in accordance with a program stored in a personal computer. When a personal computer is used to provide control functions (environmental, security, process control, etc.), the personal computer must be kept on during all periods when such control functions are necessary. The personal computer cannot be used for other functions during this time. It is also necessary to add additional hardware to the personal computer for interfacing it with the devices to be controlled. Although the cathode ray tube, keyboard and disk drives are used to initialize and program the system, as well as occasionally for checking status, most of the time these parts of the hardware are not used.

If a dedicated controller is used, it provides only a predetermined set of functions for the situation it was designed to control. Additional status indicators are required for the system as well as some controls for initialization. These additional components add expense and are used very infrequently. Because of its fixed nature, the dedicated controller cannot be easily adapted to changing situations. Some dedicated controllers can adapt to changing situations, but these controllers are more like a specialized personal computer with built-in interfaces to the real world and special programs for dealing with only control functions. The hardware of such controllers makes them expensive and their software, being dedicated to only control functions, prevents them from being compatible with other systems.

SUMMARY OF THE INVENTION

The control system in accordance with the invention is a slave computer providing control functions for a master computer, typically a personal computer. The control system is a stand-alone single-board computer for control applications. Since its primary function is to control environments, it has no keyboard, no CRT, and no disk drives. A 300-baud, RS232 serial interface channel is used for communications with the master computer. The keyboard, CRT, and disk drives of the master computer are used to create and load programs into the control system as well as to monitor its functioning. In effect, the control system of the invention provides a cost-effective hybrid of the aforementioned prior art systems. The control system includes only a microcomputer chip, a power supply, means for communicating with the master computer, and those elements necessary for interfacing with the real world. A microcomputer element includes a CPU and memory with minimal logic to connect it to the real world and to the communications interface. In this system, the real world interfaces consist of 16 analog inputs, 16 digital inputs, and 16 digital outputs, and a carrier-current transmitter to provide carrier current control signals (CCCS) to a plurality of carrier-current signal controlled relay devices, hereafter referred to as CSCR's. The system is implemented in low-power CMOS technology so that a simple battery-backed-up power supply is used to provide uninterrupted functioning. Communication with other systems is provided using the RS232 standard, operating at 300 baud, because this provides compatibility with the greatest number of other devices such as modems and personal computers. This reduces the complexity and consequently the cost of the system in accordance with the invention.

By using the communications link with the master computer, the resources needed to program, initialize and check the status of the system are provided only on their occasionally required basis. This leaves the master computer free to be used for other higher level functions for which it was intended.

Because the only standard required is the RS232 communications link, a wide variety of personal computers, modems, and other systems can be used with the control system of the invention, providing a high level of hardware and software compatibility. Existing disk translation programs can be used to convert control and monitoring functions from one type of computer to another with no compatibility problems at the slave processor level. No special licenses are required to use proprietary operating systems, as would be needed in the case of a complex dedicated controller, to provide compatibility. In addition, upgrading the system or changing personal computers does not pose a problem. In most cases, to upgrade the control system, it is only necessary to add another control system and some new software.

The control system is a single unit; a complete, integrated package of hardware and software specifically configured in such a way as to provide easy application to a variety of environmental control and other similar situations. All the complex functions are implemented such that only the sensor itself need be connected to the control system, and the application software is easily configured. Only the unique control elements (fans, furnaces, alarms, lights, etc.) and sensors need to be added to it.

The heart of the control system is an RCA 1802 CMOS microprocessor, which is register orientated. The system memory consists of four 2K blocks, two of EPROM and two of RAM. A very compact and efficient control language makes this amount of memory the equivalent of about 30K in a system using BASIC. In addition to the serial input/output port, there are 16 digital inputs, 16 digital outputs and 16 analog input channels, as well as an interface to provide control of up to 256 CSCR devices.

The control system of the invention controls a plurality of peripheral devices in accordance with instructions from a program stored in the system memory. A pre-packaged applications program is provided, although it is possible for the user to write and use a highly customized program of his own authorship. This applications program is interpreted by the operating program of the control system. The controller responds to program instructions for retrieving selected data, program instructions for performing arithmetic and logical operations on the data, and program instructions telling the microprocessor what to do with the results of these arithmetic or logical operations.

The control system has a watchdog timer. A system reset signal is provided every four and quarter minutes. However, the counter that provides this reset signal is repeatedly reset by software commands, so that the system will only be reset if the program goes astray. If the software, due to improper operation or due to a hardware "glitch" should hang-up for any reason, the system will be re-initialized by the watchdog timer within a short time. This provides greater reliability in controlling an environment where people live. It helps prevent the system from acting in erratic and unexpected ways.

In addition, a time set switch is provided which enables the user to set the time without a higher-level computer.

The RS232 serial interface is provided by implementing a UART in software. A one-bit special output port provided on the CPU is used for the serial output. This port is also used for sending the CSCR control signals. The output is switched from RS232, to gate a direct, 120 Vac plug-in module which sends high-frequency signals over the house wiring to control the CSCR devices. The serial input is provided by one of four single-bit, software-testable flag lines on the CPU chip. Another flag line is used to monitor the request-to-send line, which is connected to the master computer by way of the RS232 interface. Power for the system is provided by a direct plug-in power transformer. Should power fail, batteries provide emergency power to the system, but not to the peripheral devices.

The control system of the invention incorporates a unique modular input/output port structure to connect its sensors to its interfaces. Inputs and outputs are grouped in units best suited to environmental and similar controls. One group of ports have one digital output line for controlling the monitored condition, one analog input line for sensing the condition to be controlled, and one line each for power and ground for the sensing and control elements. For example, a port of this type is used for sensing temperature and controlling the furnace relay. A second group of ports has three digital input lines for selecting temporary control program changes and one line provides a return signal path. A third group of ports has two digital input lines for special monitoring devices, such as the phone ring sensor, and one line each for power and ground to power the special device. A fourth group of ports has three analog input lines for remote monitoring of temperature, light levels, etc. and a fourth line provides a return signal path. A fifth group of ports has two analog input lines for special monitoring devices such as the moisture sensor, and one line each for power and ground to power the special devices. Finally, a sixth group of ports has two digital output lines for interfacing with existing controls and alarm systems. Using groupings of four lines in this manner is advantageous in that telephone cabling can be used instead of special wiring.

The control system of the invention uses a very efficient, compact and highly structured control language that permits highly specialized control functions to be implemented within the same structure. The language is similar to PASCAL. It has no GO TO or JUMP statements, but does permit procedures, which are like subroutines. No arithmetic structures are provided because they ar unnecessary in a control environment. A wide range of comparisons between inputs and/or stored data is provided for conditional branches in an IF/-THEN or IF/THEN/ELSE structure. These instructions can be nested to as many levels as memory space permits (approximately 500). The individual instructions are represented as single or as double bytes, thereby compressing the control sequence into the smallest memory space possible. The individual byte values that represent the instructions are chosen so that if they should ever, due to any sort of system "glitch", be executed as if they were processor instructions, they will not modify other memory locations and will cause the processor to halt, without interfering with the system interruptdriven clock. Within a short period of time, the watchdog timer re-initializes the system and correct operation resumes.

The analog input lines of the control system are connected to a plurality of current mode sensors. Most sensors generate a particular voltage depending upon the condition they were meant to monitor, which means that the conductor lines from the sensor to the computer contribute a loss to the voltage. This voltage loss is aggravated as a result of corrosion. By using current mode sensors, the length of the conductor line is no longer a factor, nor is minor corrosion.

As previously mentioned, the control system in accordance with the invention is a slave processor designed to communicate with a master computer by way of an RS232 interface. The control system has two modes of operation: the interactive mode and the interpreter mode. When the control system is in the interactive mode, i.e. the control system has responded to a request-to-send signal by outputting a clear-to-send signal, the remotely located master computer can down-load a new program for operating the control system into system memory. Also, the pre-packaged applications program can be reprogrammed by a remote master computer to change the status of a particular device. Alternatively, the master computer can monitor the control system by requesting that logged data and status information be output to the master computer. In the interpreter mode, the control system runs by itself in accordance with applications program instructions. The analog and digital input data are sampled in response to the appropriate program instructions, and the CSCR devices and the non-CSCR activatable devices connected to the digital outputs are appropriately controlled in accordance with applications program instructions.

The microprocessor polls the request-to-send line upon completion of a control cycle. If the request-to-send line is active, the microprocessor sends a clear-to-send signal and then requests the password. The user has two attempts to enter the correct password, after which one interpretive cycle is executed, and the password is requested again. If there is no request-to-send signal on the line, then the microprocessor directly enters the interpreter mode and begins to run the applications program.

An additional feature of the software of the control system is that it can perform data logging, which consists of either straight recording of sensor (analog and digital inputs) readings over a period of time, or a data compression wherein readings are taken periodically and for a certain interval of time the microprocessor will then provide average, high and low values for each one of the analog inputs chosen.

An additional feature of the invention is that the carrier current control signals for 48 of the CSCR control devices are constantly updated by referral to a look-up table. Every 17 minutes the microprocessor will send out the appropriate ON or OFF code depending on what the status of the device is supposed to be, as indicated by the look-up table. This ensures that the CSCR device will be in the correct state even if the device did not respond to the first command or was accidentally modified due to noise signals on the line.

BRIEF DESCRIPTION OF THE DRAWINGS

The preferred embodiment of the invention will now be described in detail with reference to the following drawings.

DETAILED DESCRIPTION OF THE PREFERRED EMBODIMENT

Figure 1:
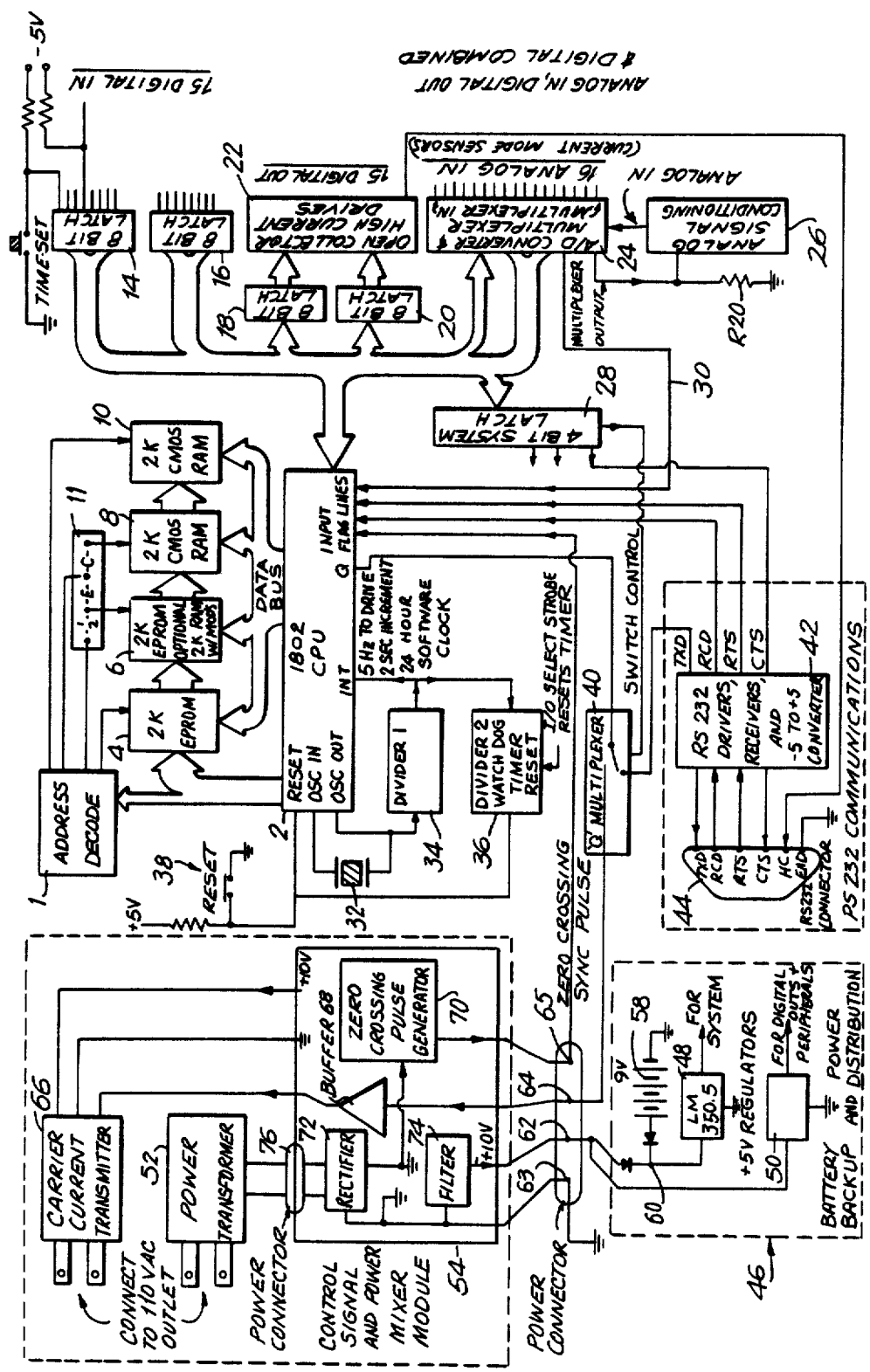
FIG. 1 is a block diagram showing the basic elements of the control system in accordance with the invention.

The environmental control device of the invention is shown in block form in FIG. 1. The heart of the system is an RCA 1802 CMOS microprocessor 2, which is a register-oriented, not a stackoriented microprocessor. The 16 registers R(O) to R(F) and their assigned functions are listed in the print-out of the computer program in Appendix I. The microprocessor 2 is connected to the system memory by way of address and data buses. The system memory comprises four 2K memory chips. Chips 4 and 6 are erasable programmable read only memories (EPROMs), and chips 8 and 10 are random access memories (RAMS). With minor modifications, EPROM 6 can be replaced by an additional RAM. Element 11 is the jumper block for memory mapping.

The microprocessor 2 is also connected to an address decoder 12 by way of the address bus. The address decoder 12 decodes two bits of chip select information and outputs a control signal to one of the four memory chips, thereby selecting which memory chip is read from and, in the case of RAMs, which chip is written into. As will be discussed in detail below, address decoder 12 also latches two memory chip address bits.

The microprocessor receives data signals from 16 digital inputs by way of a data bus and two eight-bit latches 14 and 16. The digital inputs are connected to peripheral devices which output digital signals in response to predetermined conditions, for example, the master program switch, the headlight sensor, the telephone ring sensor and the security loop. All of these peripheral devices will be discussed in detail below. The microprocessor 2 sends control signals to 16 digital outputs by way of the same data bus, two eight-bit latches 18 and 20, and open collector high-current drivers 22 which buffer the latch outputs. The digital outputs are connected to peripheral devices which cannot be activated by CSCR devices.

The microprocessor 2 is further connected to an analog-to-digital converter (ADC) chip 24 by way of the data bus. The ADC 24 has a built-in multiplexer and is connected to 16 analog inputs. The ADC chip selects one of the 16 channels in response to a four bit signal from and converts the signal for use by the system control program. These analog inputs are connected to current mode sensors which require a base current to function. Sensor current from the multiplexer is converted to a voltage level by imposing it through R20. The resultant voltage drop across R20 is then processed. A voltage signal $V_{in}$ is input to the ADC 24 after a voltage corresponding to the base current has been subtracted by analog signal conditioning unit 26 (FIG. 1).

As can be seen in FIG. 1, microprocessor 2 has a reset (RESET) terminal and an interrupt (INT) terminal. The microprocessor 2 also has two terminals OSC.IN and OSC.OUT across which a crystal element 32 is connected. The time clock for the system is implemented in the microprocessor's software. The processor's clock signal is divided down by a first divider to provide an interrupt signal every two seconds. Thus, the time is a number consisting of the number of two-second increments from midnight, which represent T=∅∅∅∅. This signal is further divided down by a second divider to provide a reset signal every four and a quarter minutes (i.e., every 256 seconds). This divider 36 is cleared (i.e., the counter is reset), however, by software commands such that the system will only be reset if the program goes astray (i.e., if the expected commands are not received within the 256-second period). The first divider 34 is clocked from the OSC.OUT terminal and outputs to the INT terminal. Divider 34 receives a 2.097152 MHz clock signal and outputs a 0.5 Hz clock signal. The output of divider 34 is also connected to the input of the second divider 36. The output of divider 36 is connected to the RESET terminal of microprocessor 2. A manually operable reset switch 38 is also connected to the RESET terminal.

Figure 2A:
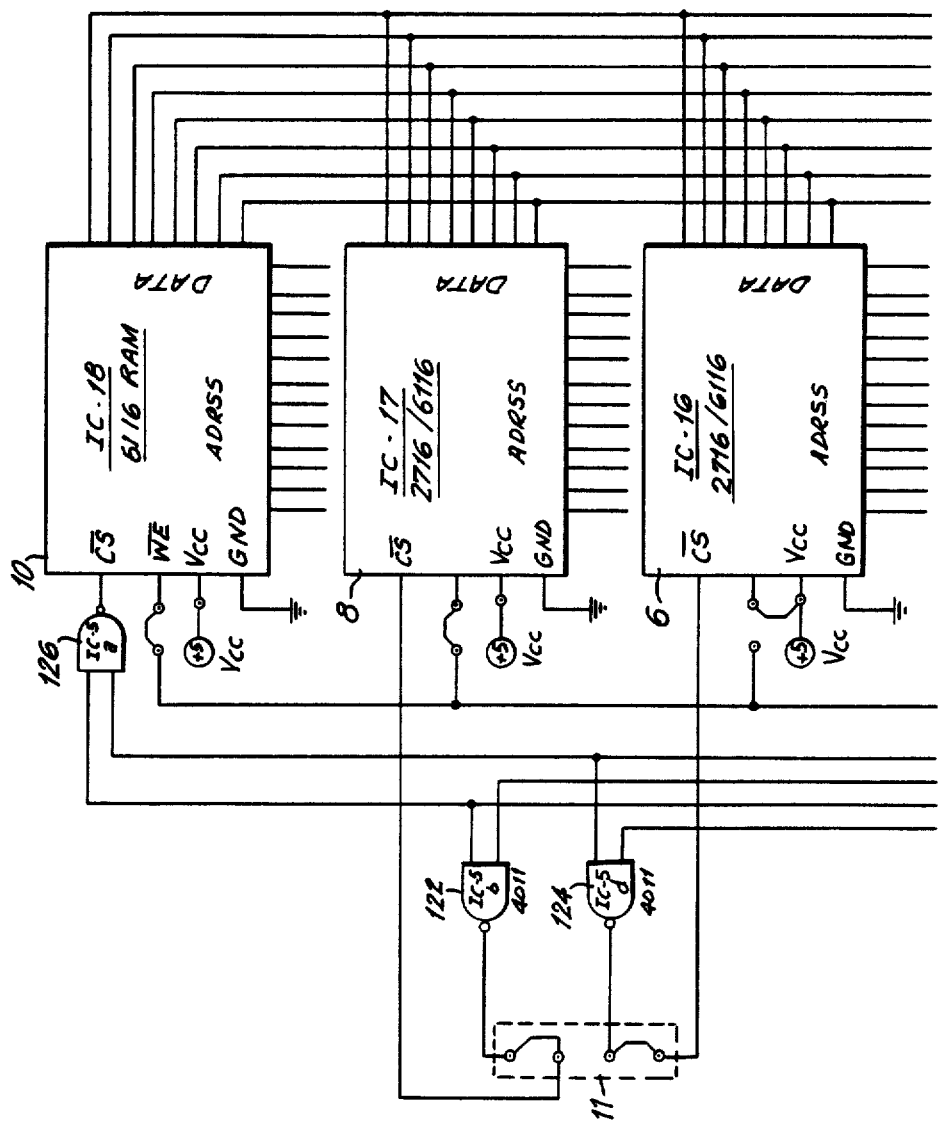
FIG. 2 shows the relationship of FIGS. 2A-2F, each of which is a detailed circuit diagram of a portion of the control system of FIG. 1. Each of FIGS. 2A-2F represents only part of a single circuit diagram.

The system in accordance with the preferred embodiment of the invention further comprises a four-bit latch 28 which is connected to receive four bits of an eight-bit signal from microprocessor 2. The other four bits of this eight-bit signal are sent to the ADC 24 for selecting one of the 16 channels. The ADC 24 is also directly connected to microprocessor 2 by way of control line 30. An end-of-conversion (EOC) signal is sent along this line to the microprocessor when the analog-to-digital conversion has been completed and the eight-bit digital information is ready to be sent. The Q terminal of microprocessor 2 is used as a serial port for outputting either CSCR control signals or RS232 transmit control signals. The output of the Q terminal and the SWITCH CONTROL signal from latch 28 control multiplexer 40. The latch 28 is also connected to send a clear to send (CTS) signal to RS232 communications unit 42. As will be described in detail in connection with the discussion of FIG. 2E, the RS232 communications unit comprises drivers, receivers and a +5 V to −5 V converter. RS232 communications unit 42 is connected to receive a transmit data (TXD) signal from multiplexer 40 and send request to send (RTS) and receive data (RCD) signals to microprocessor 2. The RS232 communications unit 42 is connected to RS232 connector 44, which will be described in detail hereinafter with reference to FIG. 4.

The system power unit is indicated by the dashed box 46 in FIG. 1. The system power unit 46 comprises an LM350.5 +5-volt regulator 48 and a 7805 +5-volt regulator 50, which both receive voltage from the power transformer 52 by way of control signal and power mixer module 54 and power connector 56. A 9-volt battery pack 58 is connected to junction 60, which lies between regulator 48 and line 62 of power connector 56. The +5-volt output of regulator 48 is provided to the system while the +5-volt output of regulator 50 is provided to the digital outputs and the peripheral devices (to be described in detail below). Battery 58 provides back-up power in the event of a loss of external power.

The power connector 56 has two lines connected to ground, only one of which is shown in FIG. 1 (i.e., line 63). As already mentioned, line 62 connects the voltage regulators to the power mixer module 54. Multiplexer 40 is directly connected to line 64 of power connector 56. Up to 256 CSCR devices can be controlled by the microprocessor by way of carrier current transmitter 66, which transmits the CSCR control signals from the microprocessor 2 to the CSCR devices over the house wiring. The CSCR devices (not shown) may be situated at electrical outlets throughout the house. The microprocessor 2 controls each CSCR device 66 by sending control signals through multiplexer 40, line 64 of power connector 66, and buffer 68 of the control signal and power mixer module 54. Microprocessor 2 receives zero-crossing sync pulses from zero-crossing pulse generator 70 by way of line 65 of power connector 56.

As already discussed, the control signal and power mixer module 54 comprises buffer 68 and zero-crossing pulse generator 70. In addition, module 54 includes rectifier 72 and filter 74 for respectively rectifying and filtering the AC voltage from power transformer 52 and outputting a DC voltage to the voltage regulators 48 and 50. Rectifier 72 is connected to power transformer 52 by way of power connector 76.

The circuits represented in block form in FIG. 1 will now be described in detail with reference to FIGS. 2A–2F. FIG. 2 shows the interrelationship of FIGS. 2A through 2F.

Figure 2B:
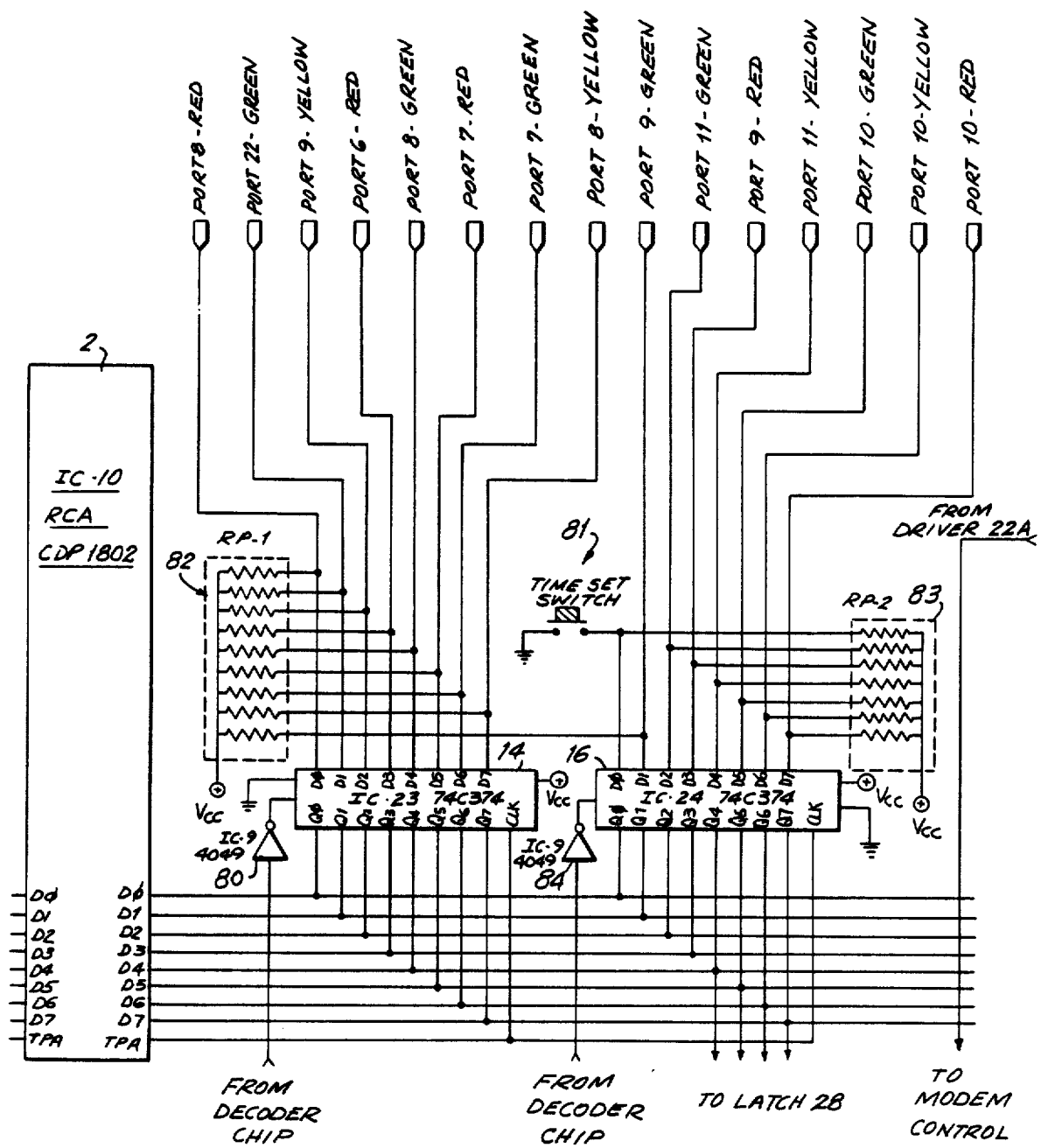

The 15 digital inputs are shown in FIG. 2B. Digital inputs 9–16 are connected to the eight data terminals D0–D7 of eight-bit latch 14, which comprises integrated circuit 74C374 (IC-23). Latch 14 latches the bit signals received by data terminals D0–D7 in response to timing pulse A (TPA), output by microprocessor 2 (IC-10) to the clock (CLK) terminal of latch 14.

Similarly, the digital inputs 2–8 are respectively connected to the data terminals D1–D7 of eight-bit latch 16, which also comprises an integrated circuit 74C374 (IC-24). The eighth data terminal D0 is connected to time set switch 81. When time set switch 81 is closed, the data terminal D0 of latch 16 is pulled low. Similarly, data terminals D0–D7 of latch 14 and data terminals D1–D7 of latch 16 are pulled low when the corresponding data port is grounded. Otherwise, the data terminals D0–D7 of latch 14 will be pulled high by the 4.7 kilo-ohm resistors in resistor array 82 and data terminals D0 and D2–D7 of latch 16 will be pulled high by the 4.7 kilo-ohm resistors of resistor array 83, data terminal D1 of latch 16 being pulled high by a resistor of array 82.

The latched data bits are output to microprocessor 2 by latch 14 via data terminals Q0–Q7 in response to a signal received at the output enabling (OE) terminal, which output enabling signal has been inverted by inverter 80. Inverter 80 may be a 4049 integrated circuit (IC-9). The data bits output by latch 14 are transmitted from data terminals Q0–Q7 to data terminals D0–D7 of the microprocessor respectively. This eight-bit data word is then processed by the microprocessor. The latched data bits in latch 16 are output via data terminals Q0–Q7 in response to receipt of a signal at the output enabling (OE) terminal of latch 16, which output enabling signal has been inverted by inverter 84. The output enabling signals respectively received by latches 14 and 16 are derived by inverting corresponding signals output by decoder chip 86 (see FIG. 2E). Only one of the latches 14 and 16 will be enabled to output at any given time depending on the three-bit selector signal output by microprocessor 2 at selector terminals N0–N2, which selector signals are received by terminals A, B and C of decoder chip 86.

The bits output from terminals D0–D7 of microprocessor 2 are latched into latch 18 (IC-21) (FIG. 2C) in response to the output by AND gate 87 of a clocking signal to the clock (CLK) terminal of latch 18. Alternatively, the bits output from terminals D0–D7 of microprocessor 2 are latched into latch 20 (IC-22) in response to the output by AND gate 89 of a clocking signal to the clock (CLK) terminal of latch 20. AND gates 87 and 89 each have an input terminal connected to the timing pulse B (TPB) terminal of microprocessor 2 and an input terminal connected to a corresponding output terminal of decoder chip 86. Four of the seven different combinations of selector signals (disregarding the condition when none of the selector terminals output signals) output from terminals N0–N2 determine whether digital information is to be transmitted to microprocessor 2 via the digital inputs or whether digital information is to be transmitted to the digital outputs from microprocessor 2. In particular, two combinations of the selector signals output at terminals N0–N2 determine which of latches 14 and 16 are to output the latched data bits when digital information is to be transmitted from the data inputs to the microprocessor and two other combinations determine which of the latches 18 and 20 are to output the latched data bits when digital information is to be transmitted from microprocessor 2 to the data outputs. An eight-line data bus connects the data terminals D0–D7 of microprocessor 2 to the data terminals Q0–Q7 of latches 14 and 16 and the data terminals D0–D7 of latches 18 and 20. As will be discussed in detail below, the system control latch 28 and the analog-to-digital converter (ADC) 24 are also connected to microprocessor 2 by way of this data bus.

A third AND gate 88 also has an input terminal connected to the TPB terminal of microprocessor 2 and an input terminal connected to an output terminal of decoder chip 86. The output terminal of AND gate 88 is connected the clock (CLK) terminal of system control latch 28 and to the address latch enable (ALE) terminal of ADC 24. The signal output by AND gate 88 simultaneously enables latching of the four least significant bits of an eight-bit signal output from terminals D0–D7 of microprocessor 2 at selector terminals D0–D3 of the ADC 24 and latching of the four most significant bits at terminals D4–D7 of system control latch 28.

Output terminal 1 of decoder chip 86, directly connected to the read (RD) terminal of ADC 24, enables the read-out of data bits from data terminals Q0–Q7 of ADC 24 to the corresponding data terminals D0–D7 of microprocessor 2 by way of the data bus.

Finally, output terminal 4 of decoder chip 86 is directly connected to divider 36 for providing the watchdog timer reset signal, to be discussed in detail below.

To summarize the operation of decoder chip 86, a signal is sent via one of seven output terminals in response to the three-bit signal output by microprocessor 2 at selection terminals N0–N2. No selection is made by the microprocessor when no signals are output at any of the selection terminals N0–N2. Depending on which three-bit signal is output at selection terminals N0–N2, one of the seven output terminals 1-7 of decoder chip 86 outputs a control signal. The seven possible responses to a control signal at the respective seven output terminals of decoder chip 86 are as follows: (1) an eight-bit signal is output from latch 14 to microprocessor 2; (2) an eight-bit signal is output from latch 16 to microprocessor 2; (3) an eight-bit signal is latched into latch 18 from microprocessor 2; (4) an eight-bit signal is latched into latch 20 from microprocessor 2; (5) four bits of an eight-bit signal are latched into system control latch 28 and the other four bits of the eight-bit signal are latched into analog-to-digital converter 24; (6) an eight-bit signal is read out of analog-to-digital converter 24 and; (7) the watchdog timer reset signal is output to divider 36, thereby resetting the count in divider 36 to zero (to be discussed below).

Figure 2C:
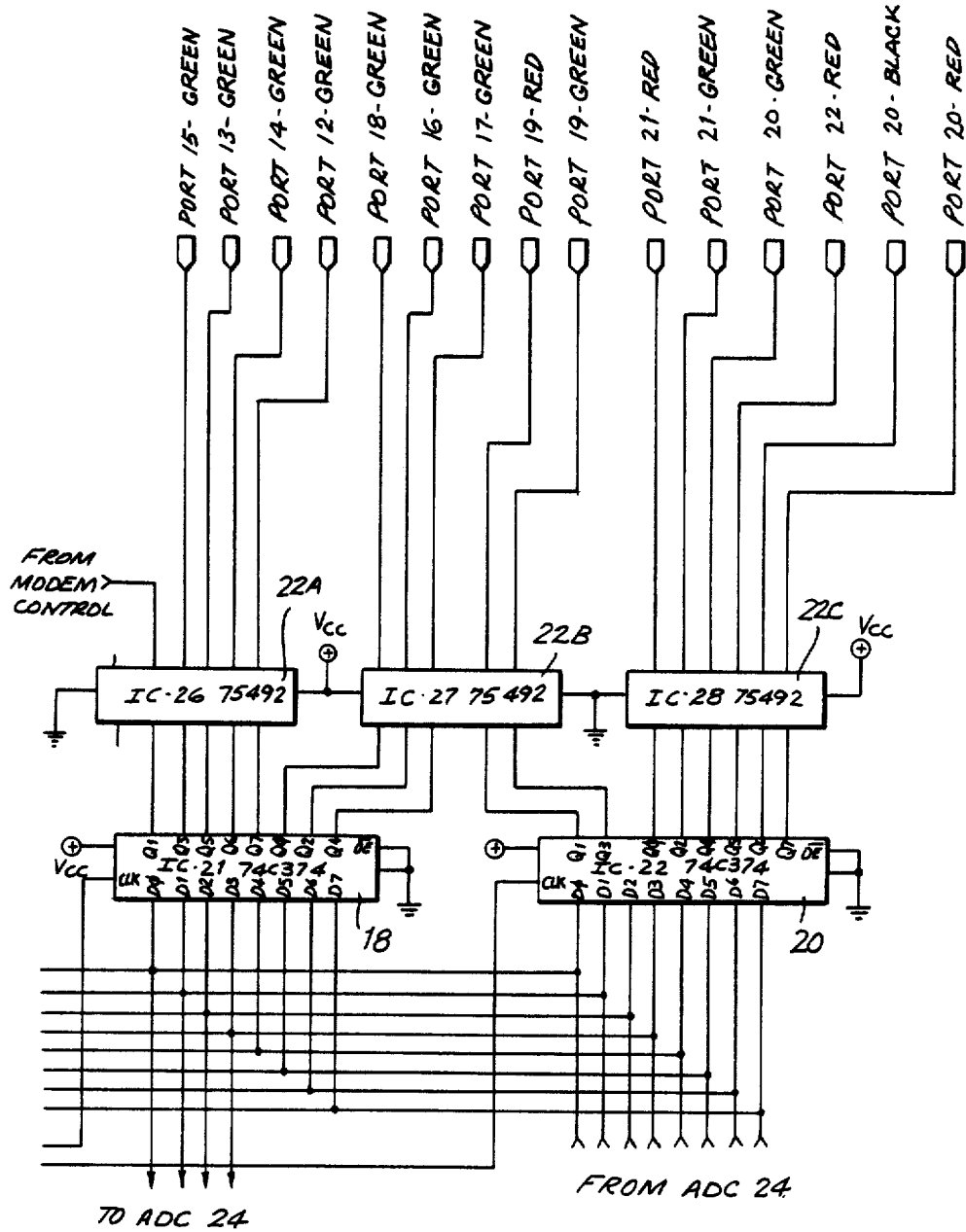
Figure 2D:
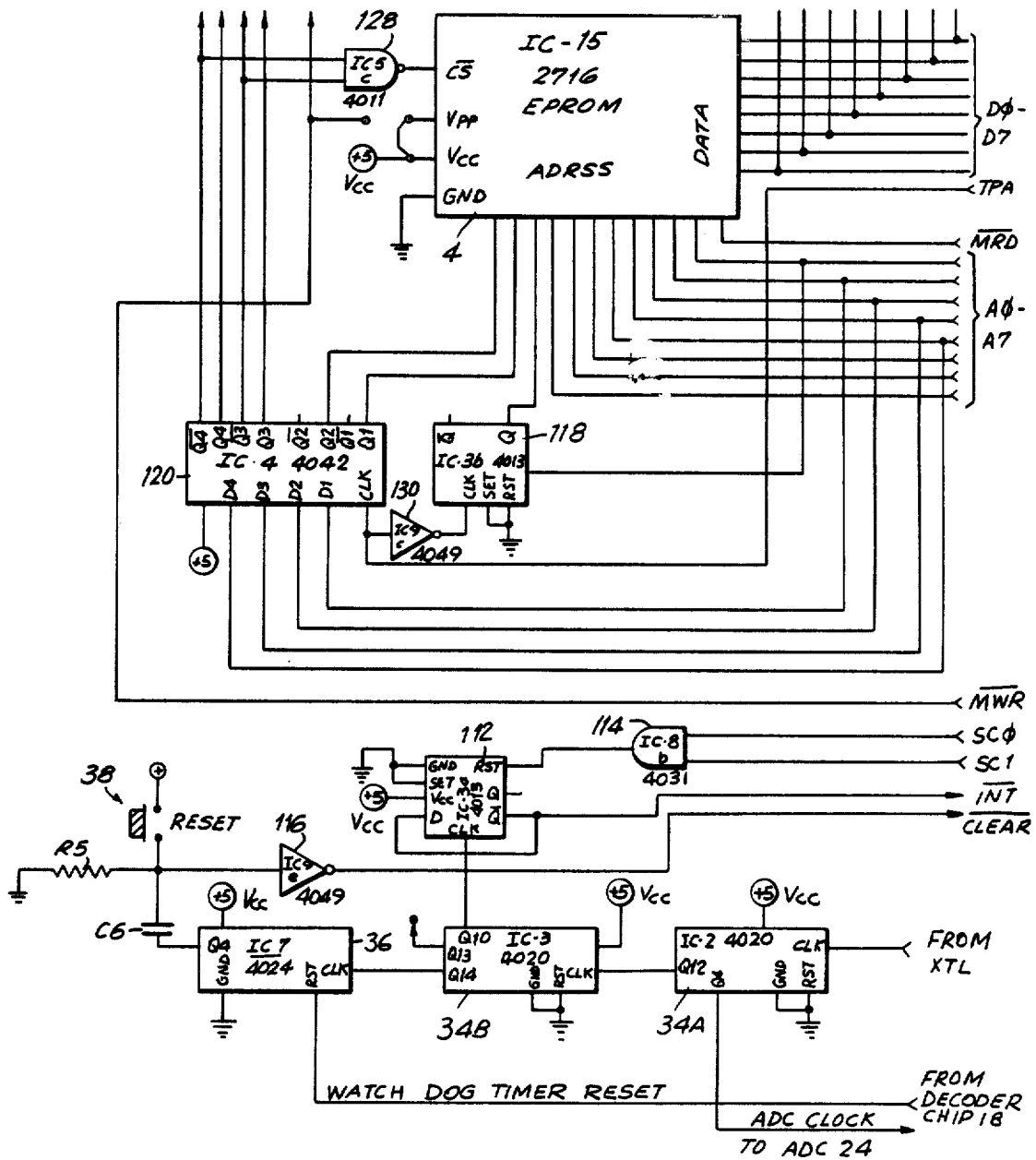
Figure 2E:
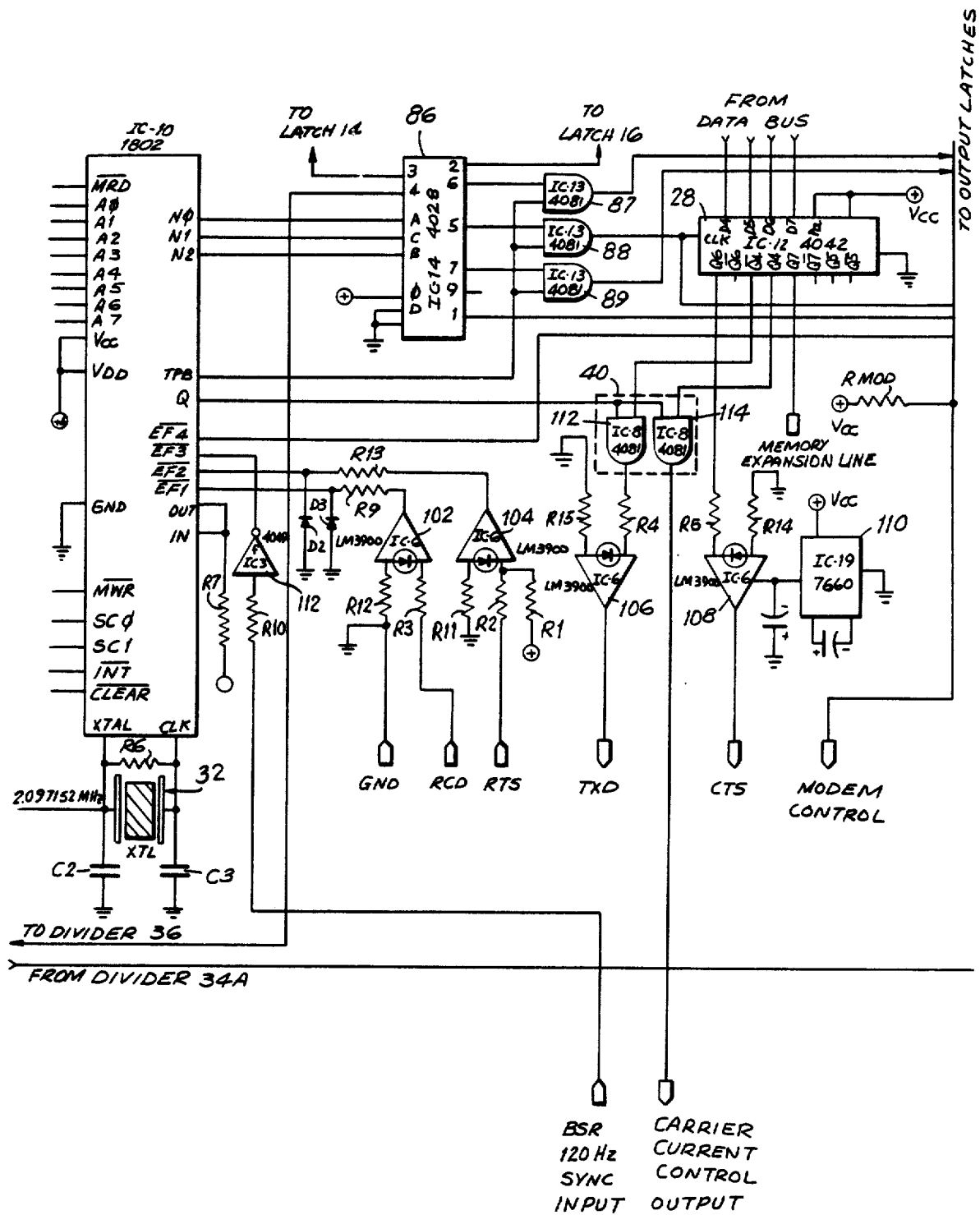

Referring now to FIG. 2C, it can be seen that the output terminals of latch 18 are buffered through open-collector, high-current drivers 22A (IC-26) and 22B (IC-27), while the output terminals of latch 20 are buffered through open-collector, high-current drivers 22B and 22C (IC-28). Six of the digital outputs are connected to the output terminals of driver 22C, five of the digital outputs are connected to the output terminals of driver 22B, and four of the digital outputs are connected to the output terminals of driver 22A. In addition, one output terminal of driver 22A is connected to the brown contact of the RS232 connector 44 (see FIG. 4), which is in turn connected to the modem (not shown) by means of which a remote master computer may be telephonically connected to the control system. In response to control signals from microprocessor 2, the driver circuits 22A–C output signals which activate those peripheral devices not activatable by means of a CSCR device (e.g. a furnace). The driver circuits 22A–C are 75492 buffer chips. The maximum voltage permitted between each chip and ground is 30 volts. When the driver chips are on, they provide a path to ground with a saturation voltage of 0.9 volt for 7 milliamps and 1.5 volts maximum for 250 milliamps. The nominal maximum current per channel is 100 milliamps, but under special circumstances 600 milliamps per 75492 driver chip is permitted. Driver chip 22A is connected to ports 12-15, driver chip 22B is connected to ports 16-19, and driver chip 22C is connected to ports 20-22.

Figure 2F:
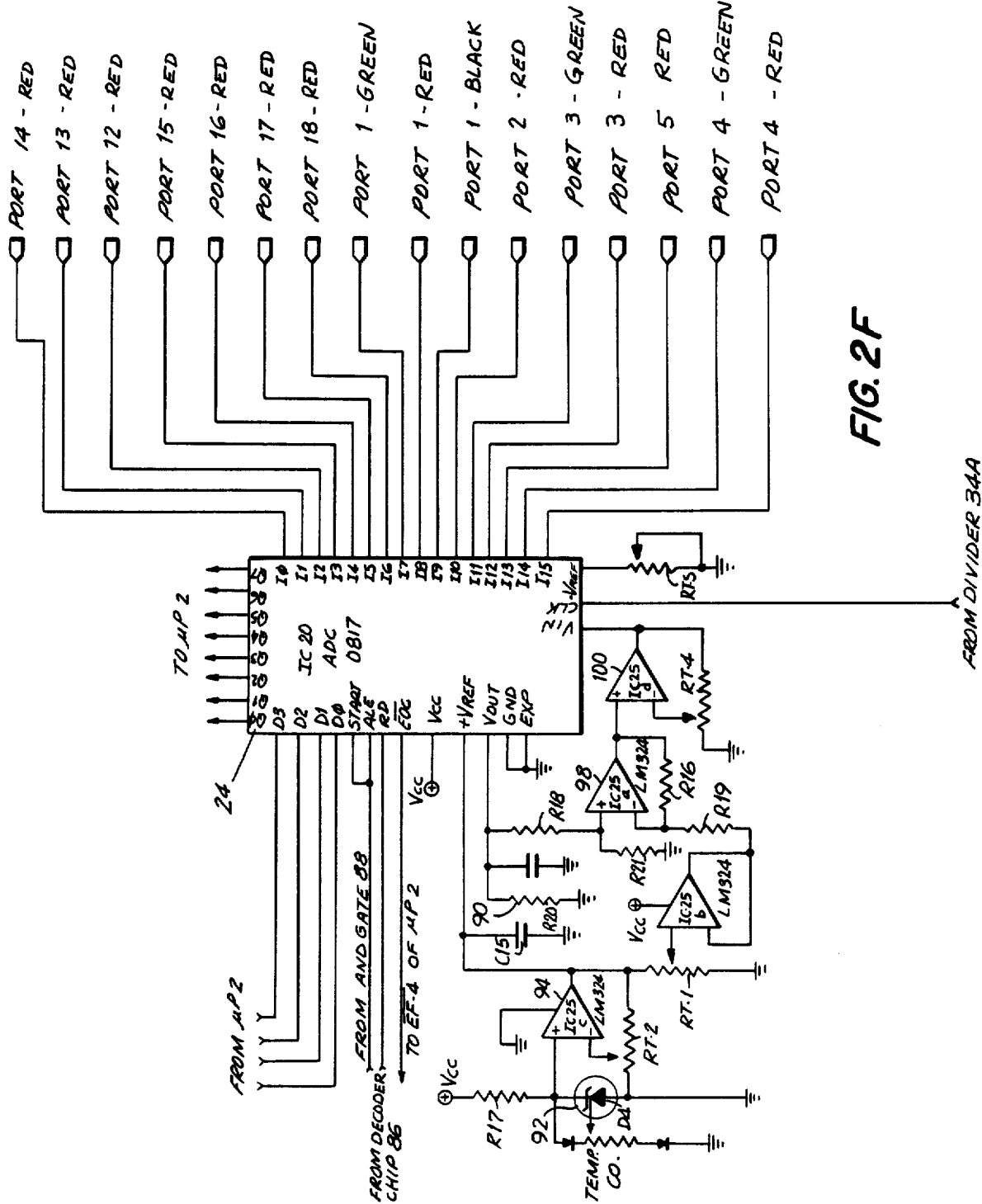

FIG. 2F is a detailed circuit diagram of the ADC chip 24 (IC-20) and the analog signal conditioning circuit 26 associated therewith. The ADC chip 24 has a built-in multiplexer connected to the 16 analog data input terminals I0–I15, each of which is respectively connected to a peripheral device (not shown) by way of an analog input. All of the analog peripheral devices connected to the analog inputs operate in the current mode. The front end of the analog-to-digital converter 24 is set up to convert the selected current to a voltage via a 1% 3.3 kilo-ohm resister (R20) indicated by numeral 90. As previously noted, the four bits of information arriving at data terminals D0–D3 of ADC chip 24 from microprocessor 2 select which of the 16 analog data input terminals is to have its input converted from an analog to a digital value. The current input at the selected analog data input terminal is converted to the voltage across resister 90, which voltage is indicated by the terminal labeled $V_{out}$ in the ADC chip 24.

The analog peripheral devices, in order to be functional, require a base current. This base current is input to the ADC chip 24 along with the current value representing the sensed data. Therefore, in order to process the sensed data, the base current must be subtracted from the total current before conversion and transmission to microprocessor 2. This is carried out by first providing a temperature-stable voltage reference 92 (ICL 8069). This reference voltage is amplified by amplifier 94 (IC-25c). The amplified reference voltage is supplied to the negative input of differential amplifier 98 (IC-25c) by way of buffer amplifier 96 (IC-25b). The voltage output $V_{out}$ from ADC 24 and converted to a voltage value from a current value by R20, is supplied to the positive input of differential amplifier 98. The difference between $V_{out}$ and $V_{ref}$ is output by differential amplifier 98 to amplifier 100 (IC-25d), which outputs an amplified voltage $V_{in}$ which represents the sensed analog data. This voltage $V_{in}$ is then converted to 8 bits of digital information by the ADC chip 24.

The ADC chip 24 outputs an end of conversion signal at terminal $\overline{EOC}$ to microprocessor 2 indicating that the analog-to-digital conversion for the selected analog input has been completed and that the digital bit signals are ready to be transmitted. In response, the microprocessor 2 outputs signals at terminals N0–N2 which control decoder chip 86 (IC-14) to output a read (RD) signal at output terminal 1, in response to which the ADC chip transmits the digital bits latched at output terminals D0–D7 to the microprocessor for processing.

Figure 3:
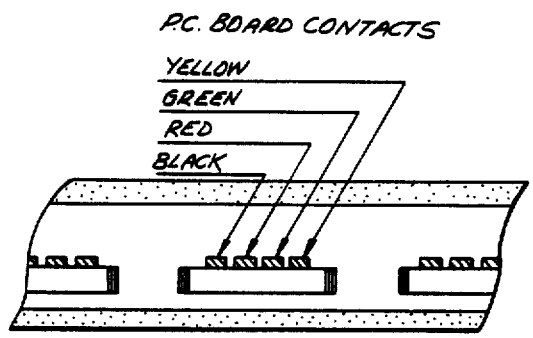
FIG. 3 is a diagrammatic end view of the edge fingers of a typical port.

Referring now to FIG. 3, a typical port is depicted. Each port comprises four PC board contacts: yellow, green, red and black. There are twenty-two of these ports. The manner in which the contacts of these twenty-two ports are distributed amongst the digital inputs, the digital outputs, and the analog inputs is shown in the following table:

| PORT SPECIFICS | | | | |
|---|---|---|---|---|
| Port No. | Yellow | Green | Red | Black |
| 1 | +5 volts | Analog 8 | Analog 9 | Analog 10 |
| 2 | +5 volts | N.C. | Analog 11 | Ground |
| 3 | +5 Volts | Analog 12 | Analog 13 | Ground |
| 4 | +5 volts | Analog 15 | Analog 16 | Ground |
| 5 | +5 volts | N.C. | Analog 14 | Ground |
| 6 | +5 volts | N.C. (pad) | Digital IN 12 | Ground |
| 7 | +5 volts | Digital IN 15 | Digital IN 14 | Ground |
| 8 | Digital IN 16 | Digital IN 13 | Digital IN 9 | Ground |
| 9 | Digital IN 11 | Digital IN 2 | Digital IN 4 | Ground |
| 10 | Digital IN 7 | Digital IN 6 | Digital IN 8 | Ground |
| 11 | Digital IN 5 | Digital IN 3 | N.C. (pad)* | Ground |
| 12 | +5 volts | Digital OUT 8 | Analog 3 | Ground |
| 13 | +5 volts | Digital OUT 6 | Analog 2 | Ground |
| 14 | +5 volts | Digital OUT 7 | Analog 1 | Ground |
| 15 | +5 volts | Digital OUT 4 | Analog 4 | Ground |
| 16 | +5 volts | Digital OUT 3 | Analog 5 | Ground |
| 17 | +5 volts | Digital OUT 5 | Analog 6 | Ground |
| 18 | +5 volts | Digital OUT 1 | Analog 7 | Ground |
| 19 | +5 volts | Digital OUT 12 | Digital OUT 10 | Ground |
| 18 | +5 volts | Digital OUT 13 | Digital OUT 16 | Digital OUT 15 |
| 21 | +5 volts | Digital OUT 11 | Digital OUT 9 | Ground |
| 22 | +5 volts | Digital IN 10 | Digital OUT 14 | Ground |

*Note: Digital IN 1 is used for the "TIME SET" switch, and Digital OUT 2 is the extra line used by the J-Cat modem for dialing.

Figure 4:
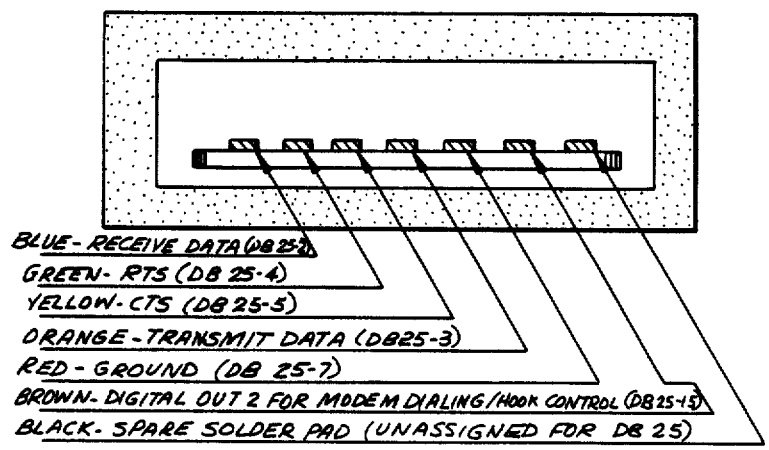
FIG. 4 is a diagrammatic end view of the various contacts of the RS232 connector.

As already noted, microprocessor 2 can be connected to a modem by way of RS232 connector 44, shown in detail in FIG. 4. The RS232 connector has seven contacts, six of which are utilized in accordance with the preferred embodiment of the invention. The blue contact of RS232 connector 44 is connected to the positive input of operational amplifier 102, by way of which serial data signals from the RS232 connector are received at terminal EF-1 of microprocessor 2. The green contact of RS232 connector 44 is connected to the positive input of operational amplifier 104, by means of which a request to send (RTS) signal is transmitted to terminal EF-2 of microprocessor 2. The yellow contact of RS232 connector 44 is connected to the output of operational amplifier 108, by means of which a clear to send (CTS) signal is transmitted from system control latch 28 to the master computer, which is connected to RS232 connector 44 by way of the modem. The orange contact of RS232 connector 44 is connected to the output terminal of operational amplifier 106, by means of which data is transmitted from microprocessor 2 to the master computer. The operational amplifiers 102, 104, 106 and 108 are all elements of a type LM3900 (IC-6) quad-op-amp which work in the current mode, i.e. which bias with current instead of voltage. All of the operational amplifiers operate from +5 to −5 V. Voltage converter 110 converts the +5 volts into −5 volts for the op-amps' negative supply. The red contact of RS232 connector 44 is connected to ground. The brown contact of RS232 connector 44 is connected to digital output 2 for modem dialing/hook control.

The plus input terminal of operational amplifier 108 is connected to terminal Q6 of system control latch 28. Output terminals Q4 and Q4 are respectively connected to AND gates 112 and 114 of multiplexer 40, for respectively enabling the transmission of data to the master computer (not shown) and the transmission of control data to the CSCR devices from terminal Q of microprocessor 2. Output terminal Q5 of system control latch 28 is currently not used and output terminal Q7 of system control latch 28 is available for use in memory expansion.

The terminal Q of microprocessor 2 is used as a serial port for transmitting serial data signals. The four terminals EF1-EF4 of microprocessor 2 are single-bit software-testable flag lines. As already noted, terminal EF-1 is used for the serial port for receiving serial data signals. In addition, terminal EF-2 receives the request to send (RTS) signal which originates from the master computer, terminal EF-3 receives the zero-crossing sync pulses by way of inverter 112 (IC-9) and terminal EF-4 receives the EOC signal from ADC chip 24 indicating the completion of analog-to-digital conversion. Because the microprocessor 2 can handle only eight-bit words, the serial input to terminal EF-1 of microprocessor 2 must be converted to parallel input and the parallel data generated by microprocessor 2 for output must be converted to serial output before being transmitted by way of terminal Q. This is accomplished by providing a UART which is implemented in software.

As already noted, the serial port Q is also used for sending CSCR control signals. The output is switched to turn on and off a direct 110 $V_{ac}$ plug-in module which sends high-frequency signals over the house wiring to control the CSCR devices. These CSCR control signals consist of pulses of 120 kHz signals placed across the 60 Hz ac power lines and synchronized to the zero crossings on the power line. A "1" bit is represented by three 1-millisecond bursts separated by 1.793-millisecond off periods and starting 200 microseconds after the zero crossing. A "0" bit comprises no signal for ½ cycle from zero crossing to zero crossing. A control signal consists of three parts: the leader, the house code, and the device select or control code. The leader consists of three "1" bits followed by a "0" bit. The leader is immediately followed by the 4-bit house code and the 5-bit device select code. These codes are sent most significant bit first with each bit followed by its inverse so that two bits of CSCR signal are sent for every bit of data (except for the leader). The controlling sequence consists of two parts: (1) send the house and device codes and (2) send the house and control codes. It is necessary to allow at least two full 60-Hz cycles between messages. The house codes are 0 to F Hex, four bits. The control and device codes are five bits. The house code identifies one of sixteen possible channels to which the particular CSCR device to be controlled is tuned. For the device code, the lower four bits specify the device and the fifth bit is set to 0. The control codes have a fifth bit set to "1" and only use the three least significant bits to specify one of six control functions. The six control functions are as follows:

|  | D8 | D4 | D2 | D1 | D16 |  |
|---|---|---|---|---|---|---|
| CLEAR: | 0 | 0 | 0 | 0 | 1 | 10H |
| ALL: | 0 | 0 | 0 | 1 | 1 | 11H |
| ON: | 0 | 0 | 1 | 0 | 1 | 12H |
| OFF: | 0 | 0 | 1 | 1 | 1 | 13H |
| BRIGHTEN: | 0 | 1 | 0 | 0 | 1 | 14H |
| DIMMER: | 0 | 1 | 0 | 1 | 1 | 15H |

The house and device codes follow the same Real to Logical sequence, wherein "1" or "A" on the code selector is not 0001 as a 4-bit Hex code:

| Logical:   | 1 | 2 | 3 | 4 | 5 | 6 | 7 | 8 | 9 | 10 | 11 | 12 | 13 | 14 | 15 | 16 |
|------------|---|---|---|---|---|---|---|---|---|----|----|----|----|----|----|----|
|            | A | B | C | D | E | F | G | H | I | J  | K  | L  | M  | N  | O  | P  |
| Real, hex: | 6 | E | 2 | A | 1 | 9 | 5 | D | 7 | F  | 3  | B  | 0  | 8  | 4  | C  |

The EF-3 flag line is used to test if the zero-crossing pulse is high or low. The microprocessor waits to find the falling edge of the zero-crossing pulse. The control module 54 must supply active low pulses at each power line zero crossing. If no zero-crossing pulses are received within 54.6 milliseconds (one zero-crossing period is 8.333 milliseconds), the subroutine used to send the signals, times out and returns with register R(0).0 set to 00. The CSCR control program is presented in full in the appendix, which should be referred to for a detailed description of the manner in which the CSCR devices are controlled by microprocessor 2.

As previously noted, the time clock for the system of the invention is implemented in software. The crystal 32 is connected across terminals XTAL and CLK of microprocessor 2 (see FIG. 2E). The oscillator comprises crystal 32 and the internal driving elements. A 2.097152 MHz clocking signal is output to the clock (CLK) terminal of divider 34A, which is an integrated circuit of type 4020 (IC-2). The divider 34A receives the clocking signal from oscillator 34 and divides it to obtain a clocking signal (ADC CLOCK) which is output to the ADC chip 24. The divided-down clocking signal is also output to the clock (CLK) terminal of divider 34B, which is also an integrated circuit of type 4020 (IC-3). This clocking signal is further divided to output a 0.5 Hz signal at terminal Q10, which clocking signal is received at the clock (CLK) terminal of latch 112. Latch 112 is an integrated circuit of type 4013 (IC-3a). The dividers 34A and 34B are both 12-bit dividers. Thus, the $2^{21}$ Hz clocking signal output from the microprocessor is divided down to a $2^{-1}$ Hz signal. The result is that an interrupt signal is output to terminal INT of microprocessor 2 every two seconds. Latch 112 latches the interrupt signal.

Register R(7) in the microprocessor is the clock time register within which the number of two-second increments from midnight is stored. Register R(7), a 16-bit register, is updated by one unit in response to each interrupt signal. At the end of each day (i.e. when the number of interrupt signals received equals one-half the number of seconds in a day), the microprocessor updates register R(8), in which the number of clock days is stored for a given week. The microprocessor adds one unit to the count in register R(8) and resets the count in register R(7) to zero.

The microprocessor 2 stops carrying out program instructions in response to an interrupt signal and updates the count in register R(7), i.e. the number of two-second increments transpired since midnight. In response to receipt of an interrupt signal, microprocessor 2 outputs status signals from terminals SC0 and SC1, which status signals in turn enable AND gate 114 (IC-8). The output terminal of AND gate 114 is connected to the reset (RST) terminal of latch 112. Following the receipt of a reset signal from AND gate 114, latch 112 is reset.

This arrangement for latching the interrupt signal is necessary so that in the event that the microprocessor is not able to answer the interrupt signal, for example, during RS232 transmission, the microprocessor will be able to detect the interrupt signal until the status signals SC0 and SC1 are output. Thus, latch 112 functions like a mailbox for storing the clocking signal received from divider 34B until the reset signal is received.

The clocking signal output by divider 34B is also output to the clock (CLK) terminal of divider 36. Divider 36 further divides the already divided clocking signal to output a signal every 256 seconds (i.e. $2^{-8}$ Hz). Divider 36 is an integrated circuit of type 4024 (IC-7). Divider 36 is reset in response to receipt of a WATCHDOG TIMER RESET signal from decoder chip 86. Decoder chip 86 outputs the WATCHDOG TIMER RESET signal in response to a predetermined combination of selector signals output at terminals N0-N2 by microprocessor 2. The command to output the WATCHDOG TIMER RESET signal is periodically output in the course of microprocessor 2 performing the pre-stored instruction loops. If the microprocessor continues to execute the program correctly, this reset signal will be output within the 32 seconds it takes divider 36 to time-out, thereby preventing the count in divider 36 from reaching that predetermined count which would result in the output of a CLEAR signal to inverter 116 for resetting the microprocessor 2. Thus, microprocessor 2 will be reset in the event that the program goes astray. In addition, a microprocessor 2 can be reset by operation of the manual reset button 38.

As previously noted, the system memory consists of four 2K blocks 4, 6, 8 and 10 (see FIGS. 2A and 2D), which are connected to microprocessor 2 by way of a common data bus and a common address bus. Memory chip 4 (IC-15) is an EPROM containing the operating system. Memory chip 6 (IC-16) is either a RAM or EPROM when in full memory configuration. Memory chip 8 (IC-17) is a user-selectable RAM or EPROM in the pre-packaged configuration. Finally, memory chip 10 (IC-18) is a random access memory having addresses which provide program-data-log RAM space, a character input buffer for the interactive mode, data stacks, systems stacks, storage space for the "delay" time functions, and storage space for the CSCR and status flags. The respective addresses for each memory chip in hexadecimal code are provided in the appendix. In the preferred embodiment shown in FIG. 2A, the memory chips 8 and 10 differ from memory chips 4 and 6 in that a jumper is connected across terminals 21 to provide a write enable (WE) terminal connected to the memory write (MWR) terminal of microprocessor 2. A control signal output from terminal MWR by microprocessor 2 enables the write-in of data into memory chips 8 or 10. Each of the EPROMs 4 and 6 can be switched over to serve as a random access memory by switching the jumper from across terminals 21 and 24 to the aforementioned position for connecting terminal 21 to the memory write terminal. Each memory chip has an output enable (OE) terminal which is connected to the memory read (MRD) terminal of microprocessor 2. In response to a memory read signal from microprocessor 2, stored data including actual data, program instructions, or status information, can be read out from any address in any one of the four memory chips in dependence on the address signals and chip select signals output by microprocessor 2 at address terminals A0-A7. Likewise in response to a memory write signal, data can be written into RAM 8 or RAM 10 in dependence on the address signals output by microprocessor 2.

The jumper block 11 comprises four terminals, two of which are connected to NAND gates 122 and 124, which are integrated circuits of type 4011 (IC-5). The microprocessor operating system is programmed to retrieve applications program instructions from predetermined addresses. Depending on how the jumpers in jumper block 11 are set, either memory chip 6 or memory chip 8 will be selected in response to address signals 0800-0FFF from microprocessor 2. In the prepackaged configuration, the prepackaged applications program will be stored in memory chip 6, whereas a customized applications program can be stored in memory chip 8 by the user. Thus, the microprocessor will perform the instructions of the applications program stored in the memory chip selected by setting of the jumpers.

Each memory chip has eight data terminals D0-D7 and 11 address terminals A0-A10. The data terminals D0-D7 of the memory chips are connected to the same data bus to which the data terminals of latches 14, 16, 18 and 20 are connected. However, for the sake of clarity, two separate data buses are shown in FIGS. 2A and 2B, although in actuality they are one and the same. In addition, each memory chip has a chip select (CS) terminal. These chip select terminals are respectively connected to the output terminals of NAND gates 122, 124, 126 and 128.

The microprocessor 2 outputs a total of 13 address bits, 11 bits representing the address location in the memory chip and two bits representing the chip select bits for determining which of the four memory chips is to be addressed. However, only eight address terminals are provided in microprocessor 2. Therefore, the five most significant bits of the 13-bit address are output at address terminals A0-A4 to terminals D1-D4 of latch 120 and to terminal D of latch 118 at a first predetermined time, and the eight least significant bits of the 13-bit address are output at terminals A0-A7 to address terminals A0-A7 of the memory chips at a subsequent predetermined time. The five most significant bits are latched in latches 118 and 120, and are then output to the memory chips at the same time that the eight least significant address bits are output from microprocessor 2. Thus, each memory chip receives an 11-bit address signal at its address terminals A0-A10, and only one of the four memory chips receives an enabling chip select (CS) signal. Which of the four memory chips receives the chip select signal is determined by the signals output at terminals Q3 and Q4 and their complementary terminals Q3 and Q4 of latch 120. These output signals control NAND gates 122, 124, 126 and 128 such that only one of the NAND gates will output the chip select signal. Latch 118 is an integrated circuit of type 4013 (IC-3b) and latch 120 is an integrated circuit of type 4042 (IC-4). Both latches 118 and 120 have clock (CLK) terminals connected to the TPA terminal of microprocessor 2. However, the CLK terminal of latch 118 is connected to the TPA terminal of microprocessor 2 by way of converter 130.

It would be obvious to one of ordinary skill in the art that the preferred embodiment could be modified by latching two additional address lines and substituting 8K memory chips for the 2K memory chips. In this case a 15-bit address signal would be output from microprocessor 2, the seven most significant bits being latched in the latches and the eight least significant bits following thereafter.

Figure 6:
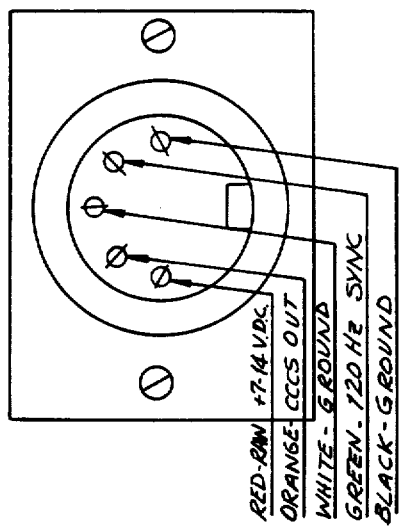
FIG. 6 is a diagrammatic end view of the power connector.
Figure 5:
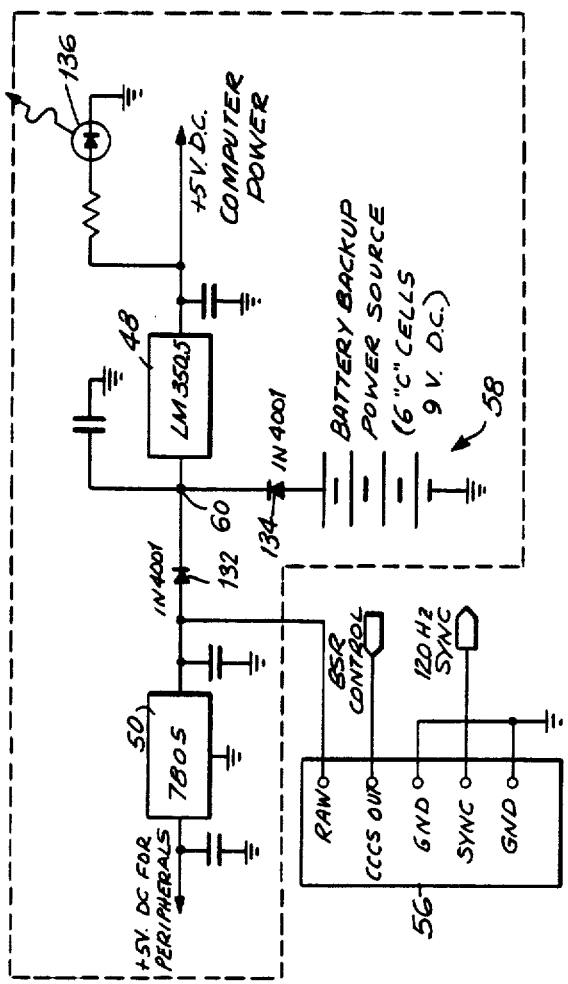
FIG. 5 is a circuit diagran showing the battery back-up and power distribution section.

FIG. 5 shows the power distribution system and power connector in accordance with the preferred embodiment of the invention. The terminals RAW, CCCS OUT, GND, SYNC, and GND of power connective 56 are shown in FIG. 6. The power connector 56 takes the form of a jack on the back of the control housing (not shown). A raw DC voltage (+7−14 V) is supplied to the RAW terminal of power connector 56 from the control signal and power mixer module 54 (see FIG. 1). This DC voltage is fed to voltage regulators 48 and 50 of the power distribution system. The DC voltage is supplied to voltage regulator 48 by way of diode 132, which is of type IN4001. This diode prevents backflow of battery power to voltage regulator 50. The battery back-up power source 58 provides emergency power in the event of a low-voltage condition or complete loss of power. The battery array comprises six "C" cells and provides 9 volts of power to voltage regulator 48 by way of diode 134.

Voltage regulator 48 provides a +5-volt DC voltage to power the computer, while voltage regulator 50 outputs a +5-volt DC voltage to the peripheral devices. As is apparent from the placement of diode 132 between the battery back-up power source 58 and voltage regulator 50, emergency power is not supplied to the peripheral devices during a power failure. An LED 136 is connected to the output of voltage regulator 48 by way of a resistor. LED 136 provides a visual signal indicating that the power is on.

Figure 8:
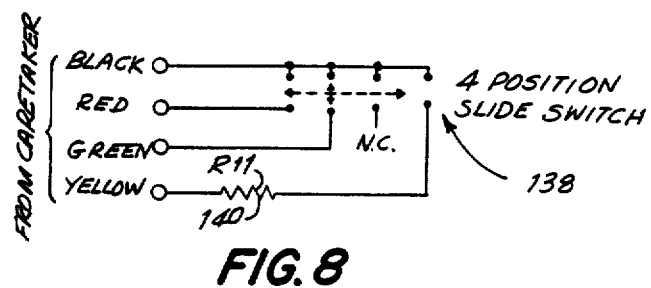
FIG. 8 is a circuit diagram showing the master program switch.

A four-position master program selector switch module used to select the appropriate block of program functions is shown in FIG. 8. The slide switch 138 has four positions which correspond to the four settings: HOME, AWAY, BED, and SECURITY. It uses three digital input lines from the control system, the 'HOME' position being unconnected. The other settings pull the selected signal line to ground. It is housed in one of the standard-size painted aluminum boxes and can be mounted on a standard single gang gem box or directly to a wall. Since the Yellow line is configured for +5 Vdc on some ports, a 100-ohm resistor 140 is placed in series with the switch on this line to prevent the possibility of a short-circuit should the module be plugged into the wrong port. The selector switch module of FIG. 8 is a four-position slide switch.

Figure 9:
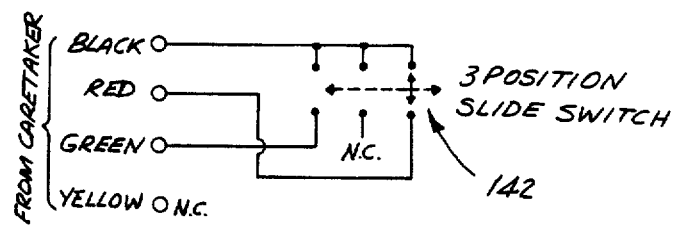
FIG. 9 is a circuit diagram showing the three-position program switch.

The three-position program switch module shown in FIG. 9 is similar to the master program selector switch of FIG. 8 except that slide switch 142 has three positions instead of four. It can be used as a Summer/Winter program selector or as a security loop selector switch.

Figure 7:
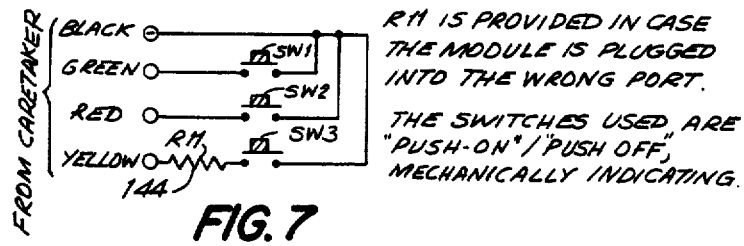
FIG. 7 is a circuit diagram showing the three-button emergency module.

A standard-sized painted aluminum box houses three push-on/push-off switches (SW1, SW2, SW3 in FIG. 7) used on digital inputs to activate emergency functions of the control system program. Switches SW1, SW2 and SW3 provide mechanical indication that they have been activated, their tops turning red when pushed. A 100-ohm resistor 144 is placed in series with the Yellow line for the same reasons as specified for the master program switch of FIG. 8.

Figure 11:
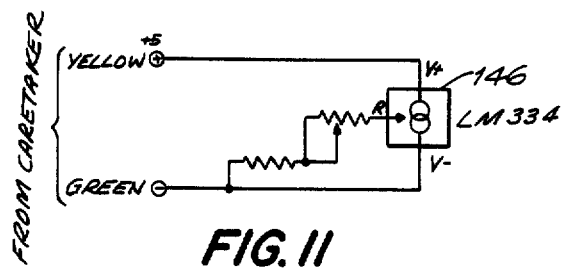
FIG. 11 is a circuit diagram showing the single remote temperature sensor.
Figure 12:
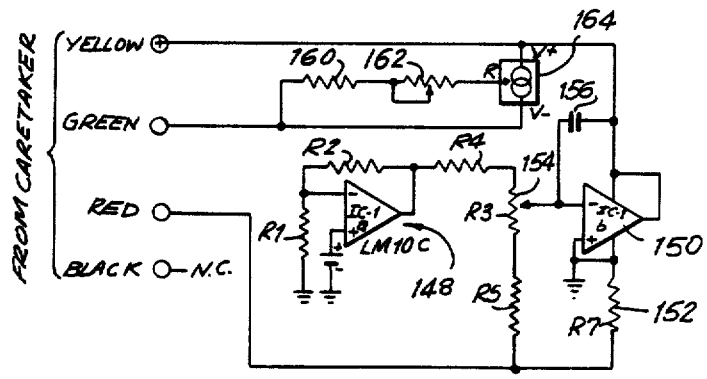
FIG. 12 is a circuit diagram showing the remote temperature setting and sensing module, which may be changed into a remote analog setting module by removal of the LM334 current source.

The single temperature module of FIG. 11 is a tiny potted P.C. board with a mounting hole formed therein. Being potted, it can be mounted inside or outside, and is intended to be hidden away. This module does not mount on the standard gem boxes like most of the modules. It is also different in that it has only two leads coming out of it (Yellow, Green), and usually will be used with some form of line splitter. All the temperature sensors use an active solid-state current source 146 which is temperature dependent, the LM334. The quiescent current is set by an external resistance value trimmed to produce a current of 0.5517 mA at 0° F.

Figure 10:
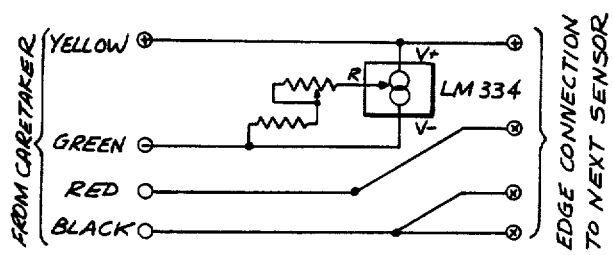
FIG. 10. is a circuit diagram showing the line-splitting temperature sensor.

The line-splitting temperature module shown in FIG. 10 is the more common form of temperature sensor. It can be used with any other temperature sensor or light sensor. It is also a potted P.C. board, but with a set of connector fingers to accept another female connector from another sensor. The signal routing is such that the +5-volt line is passed straight through and the outer two analog signal lines are moved over one to the +5-volt line, the outermost line just being duplicated. The signal line next to the +5-volt line is used on the board for temperature readings. These temperature sensors should not be placed in direct sunlight as this will heat the sensor and cause inaccurate temperature readings.

The analog setting module provides a remotely settable analog signal to the control system by means of a user-accessable dial. It can be used as a 'security lock' to provide initial de-activation of a security system, as well as a means of setting a temperature, light level or moisture value remotely. In the case of its use as a security device, once the module is set, the alarm system can be disarmed only if the correct current corresponding to the setting is sent. The circuitry consists of a temperature-stabilized reference voltage source 148 (LM10C) and an operational amplifier configured as a two-terminal current regulator. This is accomplished by using a very low power operational amplifier 150 and configuring it to monitor its own current consumption, sensed as a voltage drop across a resistor 152 (R7) in series with its negative supply pin. (There is a very small unmonitored current from the reference voltage source of approximately 7 microamps, but since the reference source is stable, it contributes no significant error to the signal.) The output of operational amplifier 150 is connected to the supply source pin and sinks current so that the voltage drop across resistor 152 matches that from the adjustable tap on potentiometer 154 (R3), connected across the reference source 148. Calibration is accomplished by turning the whole potentiometer relative to the front label on the housing and locking it in position. A 0.1-microfarad capacitor 156 is connected from the plus side to the reference feedback terminal to reduce the 60 Hz hum and provide more consistent readings. The housing is one of the standard-size painted aluminum boxes and can be mounted on a standard single gang gem box or directly to a wall. It has a knob and scale on the front panel to set the desired value.

The remote temperature setting and sensing module is identical to the remote analog setting module with the addition of a temperature sensor comprising resistor 158, potentiometer 160 and current source 162. It would normally be used with high-voltage heating systems where the actual switching is done by a CSCR device. It can, however, be used with the thermostat module of FIG. 13.

Figure 13:
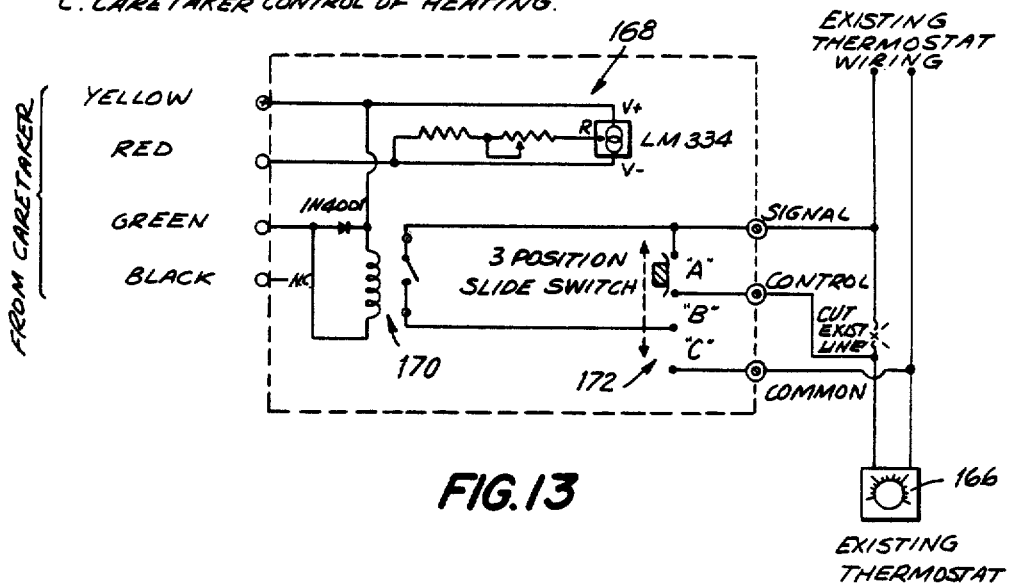
FIG. 13 is a circuit diagram of the thermostat module.

The thermostat module shown in FIG. 13 is used primarily with an existing thermostat 166, which is wired into it. The module contains a temperature sensor 168, using the LM334 as previously described; a low-voltage control relay 170, activated by one of the system's digital outputs; and a three-position slide switch 172 to select the desired function. The three selections are CONTROL, LIMIT, and MANUAL. Under "MANUAL" the existing thermostat controls the temperature and is used to override the control system. Under "CONTROL", the stored program controls the temperature, while under "LIMIT", the control system still has control, with the upper limit set by the existing thermostat. This module is housed in one of the standard-size painted aluminum boxes and can be mounted on a standard single gang gem box or directly to a wall. Three pig-tail wires are provided to be wired into the existing thermostat. One of the existing lines is cut and the module is wired in series with it. The remaining wire is connected to the uncut thermostat wire. This unit is to be used only with low-voltage systems.

Figure 14:
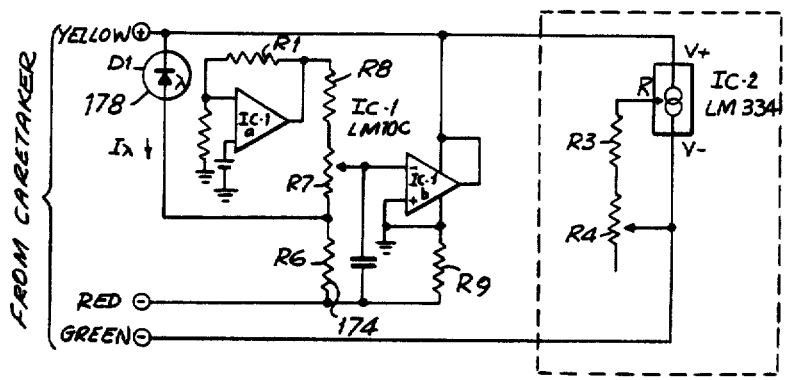
FIG. 14 is a circuit diagram showing the light level sensor, which may optionally also contain a temperature sensor when current source LM334 is included.

The light level sensor shown in FIG. 14 is a small (1"×1") plastic box with mounting flanges containing a small P.C. board with an Eye-Response silicon photodiode 178. The output response is linear, dependent upon the number of photons striking it. Since it is potted, it can be mounted outside. The circuitry used is the same as that used for the remote analog setting module with the photodiode current creating an additional voltage drop across resistor 174 (R6), which is added to the reference setting voltage of potentiometer 176 (R7).

The combined temperature and light module is identical to the light-level sensor above, with the LM334 temperature sensor circuitry added to it (see dashed box) on the same P.C. board. (The light-level sensor and combined light and temperature sensor use the same P.C. board; the temperature sensor elements being omitted in the case of a simple light-level sensor.) The same mounting precautions should be taken with respect to mounting it in direct sunlight as with the temperature sensors since the housing is black and will be heated by the sun, causing inaccurate readings.

Figure 15:
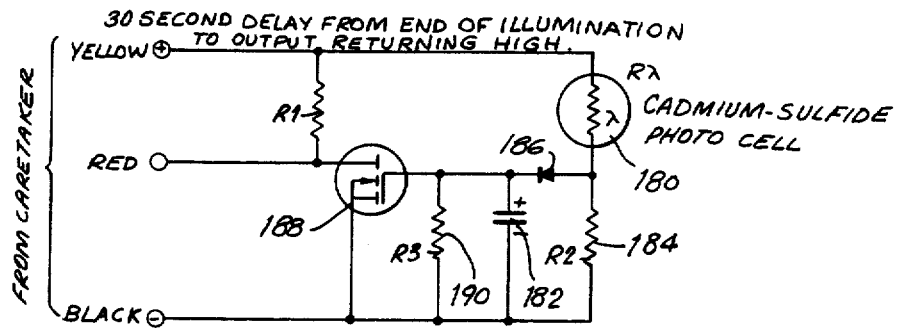
FIG. 15 is a circuit diagram showing the headlight sensor.

The head-light driveway sensor module shown in FIG. 15 is used to detect car headlights coming up a driveway. It provides a digital output when the light level exceeds a certain threshold, and is to be mounted facing the incoming cars, but not the direct rays of lamps or other driveway lighting. This module is a 1"×1" black plastic box, containing a cadmium-sulfide photocell 180 and capacitor delay circuit 182. When light shines on the photocell, the voltage at the junction of it and resistor 184 (R2) rises so that diode 186 (IN34A) conducts, charging capacitor 182. This voltage applied to the gate of the FET 188 causes it to pull the Red signal line low. After the light is removed, diode 186 prevents capacitor 182 from discharging through resistor 184, and because of the very low gate leakage current of the FET, resistor 190 (R3) sets the discharge time. When the voltage of capacitor 182 drops sufficiently, the FET 188 no longer conducts, and the Red signal line goes high again. For the values indicated, this delay is about 30 seconds.

Figure 16:
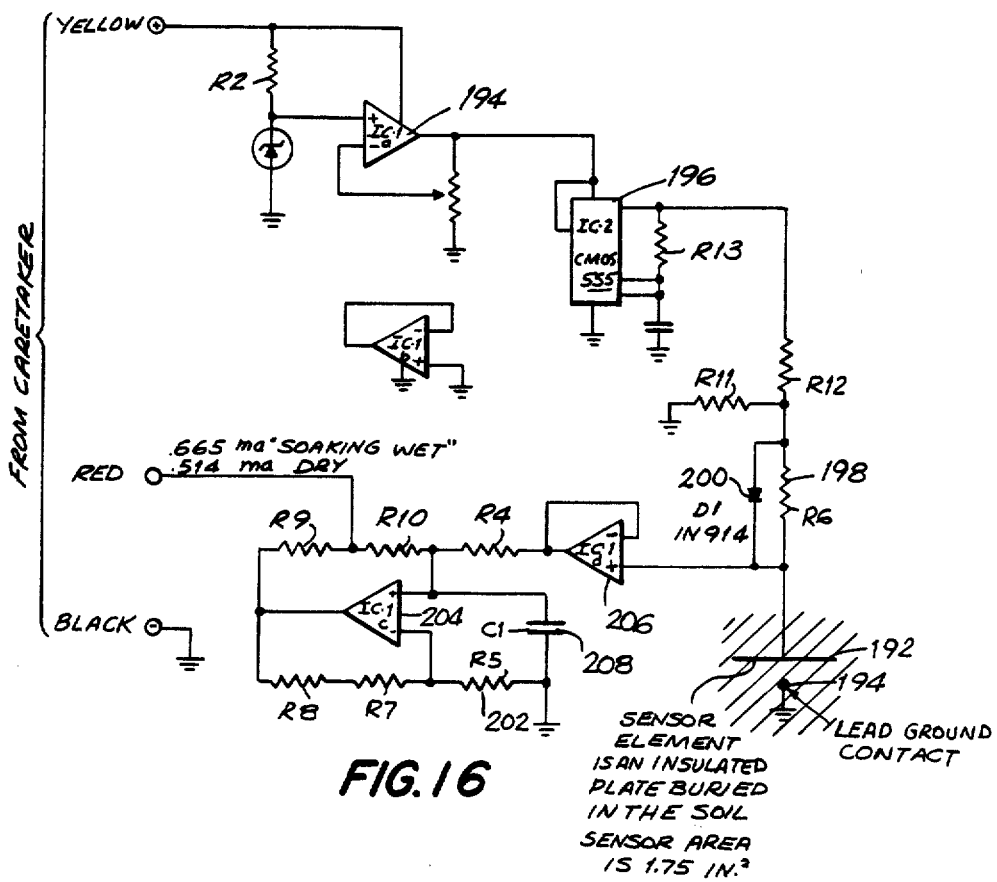
FIG. 16 is a circuit diagram showing the moisture sensor.

The moisture level sensor module shown in FIG. 16 is used to monitor soil water content for a lawn or a greenhouse sprinkler system. It provides an analog signal to the control system. The sensor 192 is an epoxy-dipped 1"×5.4" P.C. board assembly that is pushed into the soil to a depth of 3.5". A lead contact 194 at the bottom end must make good soil contact. It senses moisture by capacitance and should be kept away from metal objects to prevent inaccurate readings. (The sensor operates at approximately 9 kHz, and is therefore below the 10 kHz frequency limit that the FCC requires testing above.) It comes with an 8-foot cable. VRF-1 192 and IC-1a 194 provide a temperature-stabilized power source for a CMOS 555 timer 196 (IC-2), which provides the approximately 9-kHz signal to the sensing plate 192 via resistor 198 (R6) and diode 200 (D1). These permit the capacitance of the plate to charge quickly through diode 200 and to discharge very slowly through resistor 202 (R5). If the sensing plate is dry, or in air, its capacitance will be low (9 pf), and it will be easily discharged to a lower voltage during the off time of the source signal through resistor 198 (R6). When the sensor 192 is in water or very wet soil, the capacitance will be much larger (300 pf), and the sensor plate will maintain a fairly high voltage, i.e. almost the peak voltage of timer source 196. This positive-referenced, varying amplitude signal is used as the reference voltage to set the value of a current source using IC-1c 204 and IC-1d 206 (section b is unused). Capacitor 208 (C1) is used to smooth out the oscillations from the signal source and provide a steady dc current.

Figure 17:
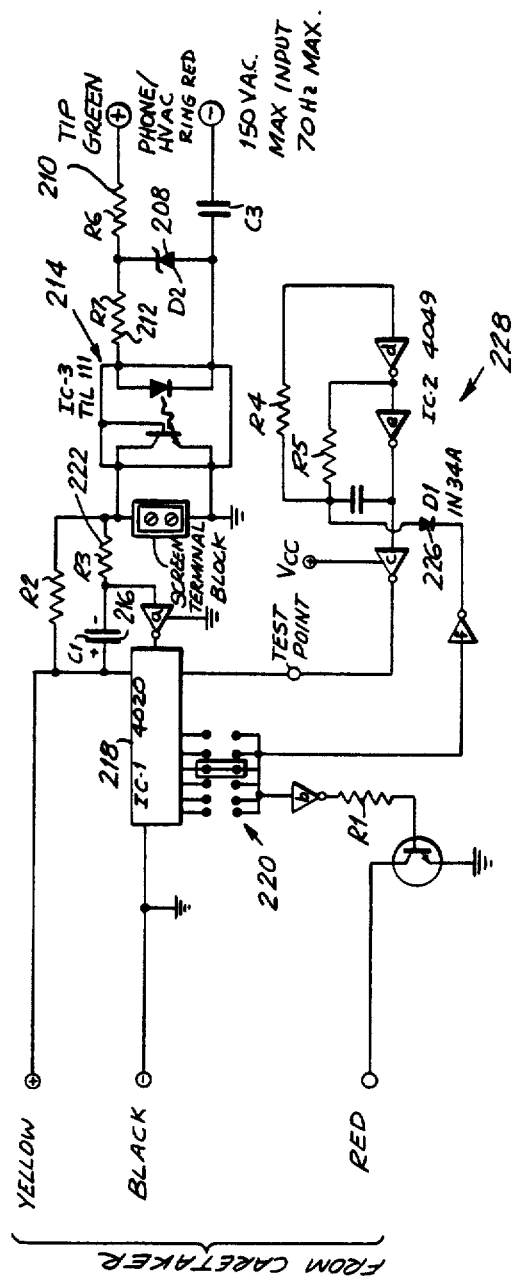
FIG. 17 is a circuit diagram showing the telephone and high-voltage sensor/delay module.

The telephone and voltage sensor module shown in FIG. 17 is a digital output module primarily used to detect the telephone ring signal. It contains a delay circuit with jumper selectable settings 220 of 1, 2, 4, 8, 16 and 32 minutes. Upon detecting the ring signal, the output is pulled low. This output is connected to one of the system's digital inputs. The delay is started as soon as the ring ends. Additional rings will reset the delay. After the selected delay time has timed out, the output returns high.

The module's delay function can also be triggered by a low-voltage momentary switch, or a low to high voltage signal such as a doorbell or 110 volt AC power line. When the phone ring signal or H.V.ac is applied to the input, it is rectified and current-limited by diode 208 (D2), resistor 210 (R6) and resistor 212 (R7), before it is applied to the optocoupler 214 (IC-3). This pulses pin 5 low (which can alternatively be pulled low by a momentary switch placed across the jumper block), discharging capacitor 216 (C1) and resetting the counter 218 (IC-1). The time constant of capacitor 216 and resistor 222 (RS) prevents a single voltage spike on the telephone line from activating the module. When counter 218 is reset, all the outputs go low, turning the transistor 224 (Q1) ON via IC-2a, and pulling the Red signal line low. This also raises the voltage at pin 15 of IC-2f, preventing diode 226 (D1) from conducting and enabling the oscillator 228 made up of IC-2c, IC-2d, and IC-2e to oscillate. This clocks the counter 218 until the output selected by the jumper goes high, disabling the oscillator 228 and turning transistor 224 OFF, letting the signal line go high again.

A security loop/junction box (not shown) is an additional accessory which may be used. This is one of the standard unpainted aluminum boxes with a screw-connector strip to provide easy wiring to the control system's digital input lines used for the security loop or for special digital output lines or general line splitting. This can be used with ports 6-11 for security purposes.

Another accessory is the line-splitting patch block, which is a small circuit board housed in an open-bottomed plastic box and used to split the control system lines for special functions. It has four four-finger edge connections that can be jumper-wired to split out the various lines to other standard cables.

Yet another accessory is the line-coupling connector, which is just a short piece of P.C. board with four connective strips on it so that two female connectors can be joined for longer cable runs.

Figure 18:
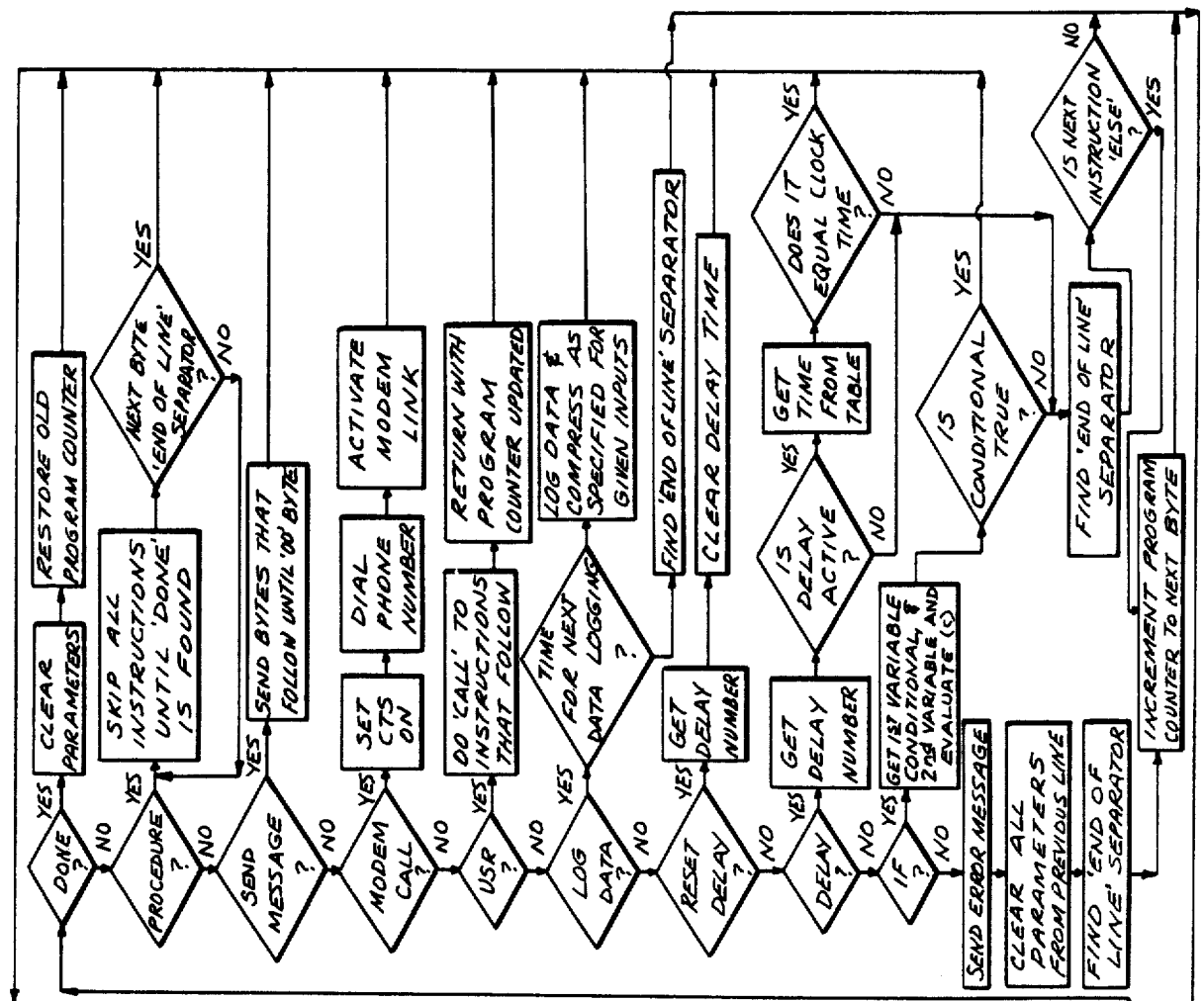
FIG. 18 is a flowchart of the interpretive program functions of the control operating system program.
Figure 18:
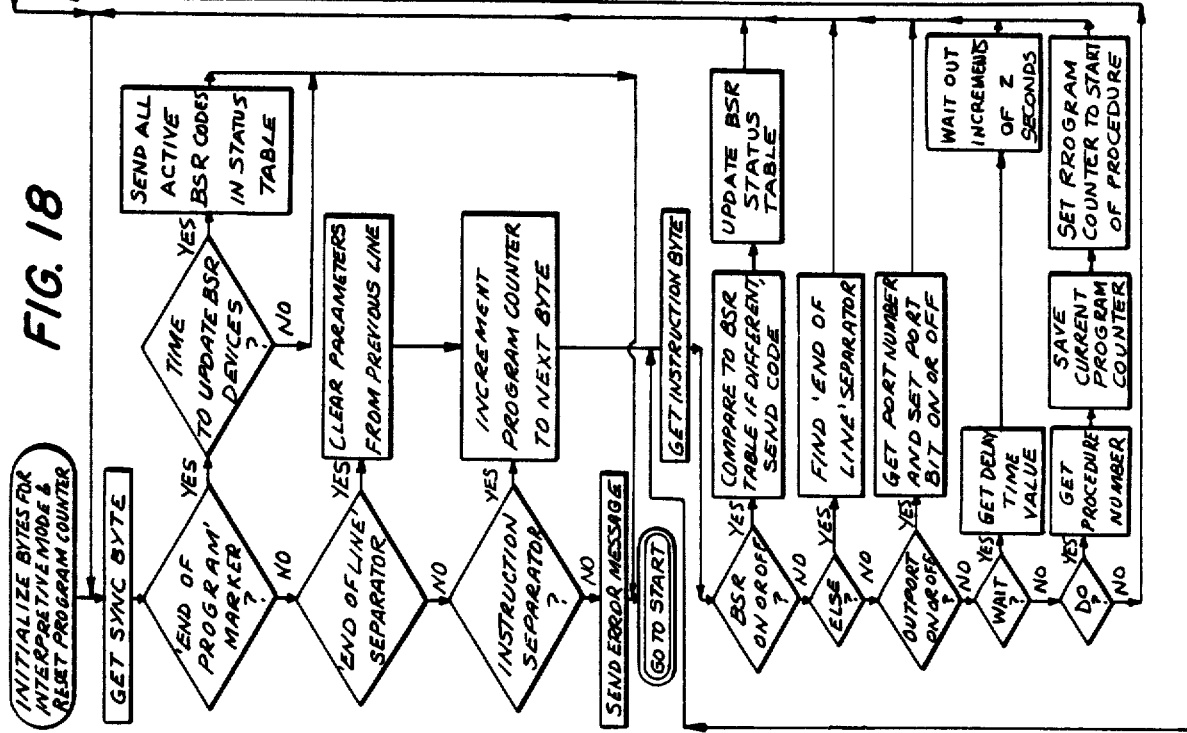

FIG. 18 is a flowchart of the Interpretive program functions of the control operating system program. This flowchart depicts the program functions carried out by microprocessor 2 when the system is in the Interpretive mode. In accordance with the operating system program stored in memory chip 10 (see the Appendix for the full program listing), microprocessor 2 interprets the program instructions stored in memory chip 8 in the full memory configuration or memory chip 6 in the pre-packaged configuration.

The basic control instructions are as follows:

| | |
|---|---|
| PROCEDURE | Defined at the start of the program; like subroutines and terminated with DONE. These can contain all other instructions and can even call themselves. |
| DO | This invokes the procedure, identified by a number. |
| CSCR ON/OFF ... IMM | Turns a CSCR-type device ON or OFF. This suffix, "IMMEDIATE", modifies the normal CSCR ON/OFF instruction in that it sends the carrier current control (CCCS) signals regardless of what previous status is in the CSCR Status table. |
| OUTPORT ON/OFF | Turns a specified output bit ON or OFF. |
| SET-DELAY | The current time is saved as one of 32 delay-initialized values if no value is currently in the table (0000). It is used to create the DELAY-TIME variable used by the IF/THEN/ELSE structure, which is the difference, on a 24 hour basis, between the start of the delay and the current clock time. |
| RESET-DELAY | Resets the delay function for another cycle. |
| SET-FLAG | Sets a flag bit to ON. |
| RESET-FLAG | Sets a flag bit to OFF. |
| LOG-DATA | Logs input data for the intervals specified for the devices specified. |
| MODEM-CALL | Calls another system or central station via the optional modem and makes the communications link. The telephone number to be called follows the instructions. |
| IF/THEN/ELSE | This conditional structure provides comparisons between the various inputs. If the statement is true, the THEN part of the instructions are executed. If the statement is false, the THEN instructions are skipped until an 'end-line' marker is found, and the following instructions are executed. The optional ELSE part is skipped in a similar manner if the statement is true and is executed if false. |

The following are the inputs that can be compared in terms of greater than (>), less than (<), and equals (=):

| | |
|---|---|
| CLOCK-TIME | This is the current clock time. |
| DELAY-TIME | The difference between the time the delay was started and the current clock time. |
| SCHEDULE-TIME | This is a two-byte value of time and can only be compared against CLOCK-TIME or DELAY-TIME. It would not make sense to compare them against anything else. |
| DIGITAL-INPUT DIGITAL-OUTPUT BSR FLAG | These are either ON or OFF and though they can be compared against analog values, that would make no sense. |
| DATA | Numerical values from 0 to 255. |
| ANALOG-INPUT | Analog input values from 0 to 255. |

Figure 19:
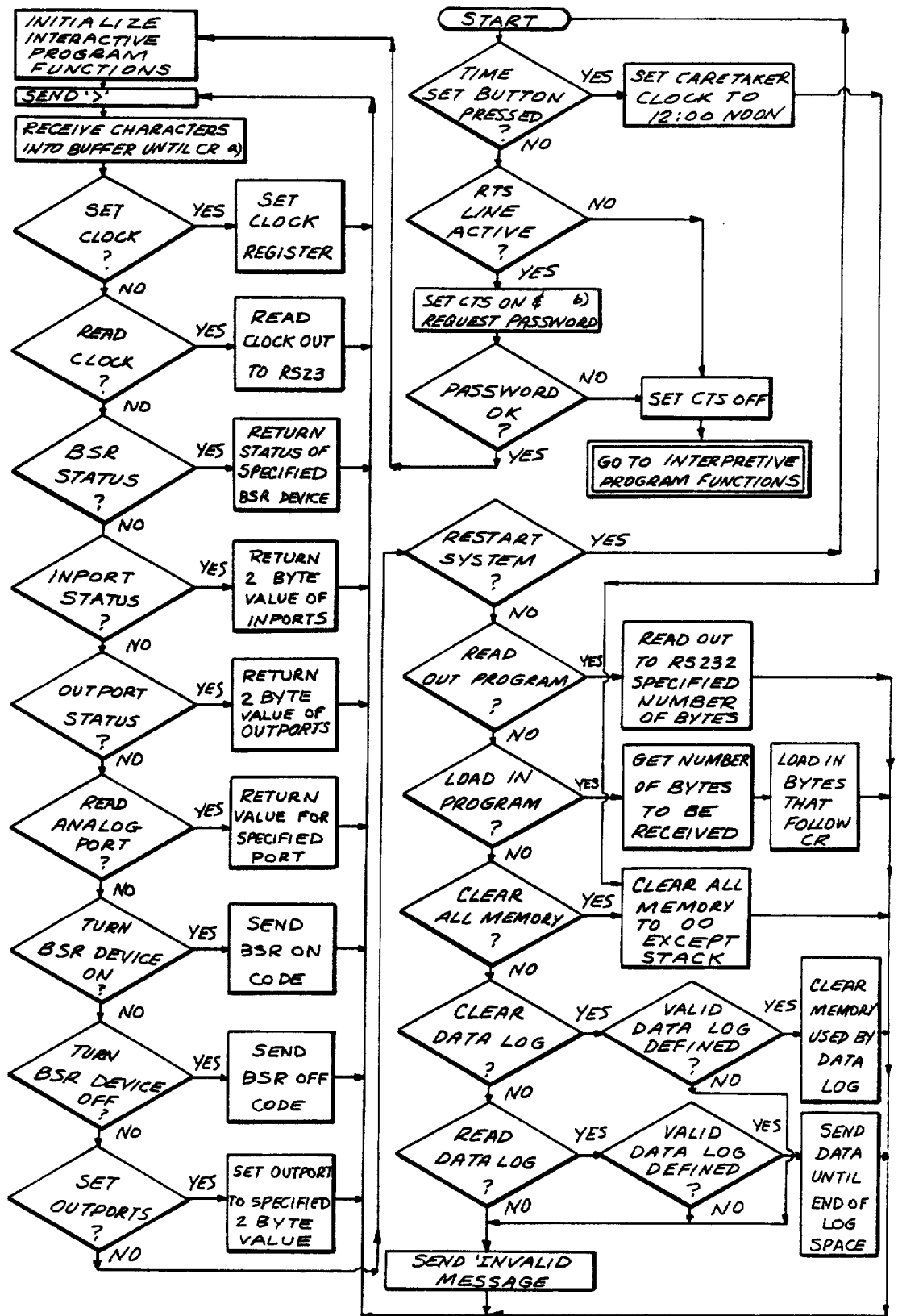
FIG. 19 is a flowchart of the interactive program functions and communications initialization of the control operating system program.

FIG. 19 shows the flowchart of the Interactive mode program functions of the control operating system program. The control system can receive new program instructions from an external master computer or can send stored program instructions, logged data, and status information to the master computer in response to appropriate commands from the external computer.

The foregoing description of the preferred embodiment is presented for illustrative purposes only and is not intended to limit the scope of the invention as defined in the appended claims. Modifications may be readily effected by one having ordinary skill in the art without departing from the spirit and scope of the inventive concept herein disclosed.

APPENDIX

```
;*************************************************************
;       VCCTROM.PC1        FIRST PART OF VCCTROM.ASM   REV-L
;   INITIALIZE VREELAND CONTROL CARD PROGRAM & ROUTINES
;           P.T.MILLER    6//84, 7//84, 7//85, 2//86, 3//86, 6//86

NOLIST
; Sytstem Register usage, RCA CDP1802 CPU;
;       R(0)      DMA, Rest P.C. & G.P.
;       R(1)      Interupt Pointer; used for Time Clock
;       R(2)      System Stack Pointer
;       R(3)      Program Counter (P.C.)
;       R(4)      Pseudo-Call Pointer
;       R(5)      Pseudo-Return Pointer
;       R(6)      Return / Argument Pointer
;       R(7)      Clock Time Register; 2 Sec. Increments from Midnight:0000-A8C0
;       R(8)      Clock Days; Sunday-Saturday , 0-6 [R(8).1 not used]
;       R(9)      16 Bit Output Port Holding Register
;       R(A)      Secoundary Accumulator ( 8 or 16 bit)
;       R(B)      Counting / Timing / G.P. Register
;       R(C)      Data Stack Pointer
;       R(D)      Character Input Buffer/Indexing Reg., IF//ELSE nesting counter
;       R(E)      Data-Log Indexing Register
;       R(F)      Interpreter Program Counter ;   Stack convention: Always DEC. stack at start of routine (saving old data),
;   and INC. stack befor leaving (restoring old data). After a routine, the stack
;   pointer will be the same as befor.

;       Memory:
;CE1:   0000-07FF       / EPROM containing Operating system

;CE2:   0800-0FFF         RAM or EPROM when in Full Memory Configuration

;CE3:   1000-17FF         User Selectable RAM or EPROM in Pre-Pakage Configuration ;CE4:   1800-1CFF         Progam / Data-log RAM space
;       1D00-1E1F         Character Input Buffer for Interactive Mode (31 Char.s)
;       1D00-1E00         Data Stack space (Input Buffer Not used by Interperter)
;       1E01-1EBB         System Stack space, 378 bytes, 189 nestings;Sub.s& Prcd.
;       1EC0-1EFF         Storage For 'Delay' Time functions
;       1F00-1FFF         BSR & Status Flag Storage space ; Control Port Latch Bit Assignments, 'OUT 3', IC-12 :
;       0-3     Select A/D converter channels 0-15
;       4       Select Q; Switches Q to RS232 TRX if 0, BSR Control if 1
;       5       Undefined
;       6       RS232 Clear-To-Send (CTS); 0=-4vdc, 1=+4vdc
;       7       Future Use: to permit the use of 4K EPROMs, providing the 12th
;               bit. To reliable start the system, the first few bytes of code
;               should be the same and set this bit low to select the lower half
;               of the chip. This bit can then be used to switch between the
;               high and low sections.

; The "Q",1 bit output flip-flop of the CPU is used to generate both the BSR
; and RS232 seiral bit streams.

; The CPU's Flag-Input lines are defined as:
;       EF-1    RS232 Receive Data line
;       EF-2    RS232 Request-To-Send (RTS); Active Input from the master
;               system indicates a request for the Interactive Mode.
;       EF-3    BSR 120Hz Line Voltage Zero-Crossing Pulse used to sychronize
;               the BSR control messages with the on line receivers. (Unregulated
;               active-low pulses from the power modual, inverted and buffered
;               to active high at the flag-input.)
```

```
;       EF-4        A/D conversion completed, active high

; I/O Port Assignments:
;       N1      "69",Input      Read A/D Converter Data
;       N2      "62",Output     Reset Watch-Dog-Timer
;       N3      "63",Output     Control Port Latch
;       N4      "6C",Input      Low Digital Input Port
;       N4      "6D",Input      High Digital Input Port
;       N5      "66",Output     High Digital Output Port
;       N5      "67",Output     Low Digital Output Port ; Software UART Configuration:          RS232 Input Lines :
;       300 Baud                         -3 Vdc to -20 Vdc = 1
;       8 Bit Word                       +3 Vdc to +20 Vdc = 0
;       No Parity                       RS232 Output Lines :
;       1 Stop Bit                       + 4.3 Vdc = 0
;                                        - 4.3 Vdc = 1
;  The CareTaker is configured as a DCE (Data=Communications-Equipment),therefor
; the RS232 pin assignments are:
;   Pin 4 <= RTS,  Pin 5 => CTS,  Pin 7 = Ground,  Pin 3 => TXD,  Pin 2 <= RCD
        LIST

ORG     0000H
        WIDTH   132
        PGLEN   63

;RAMBTM: EQU    01000H          ; RAM BOTTOM 2K=1800,4K=1000,6K=0800
DBUFFR: EQU     01D00H          ;RECV'DATA BUFFER FOR INTRACTIVE MODE
DTSTAK: EQU     01DFEH          ;TOP OF DATA STACK SPACE
PASWRD: EQU     01E04H          ;PASS-WORD STORAGE SPACE;5BYTES,TOP TO BOTTOM,END=00
STACK:  EQU     01EBBH          ;TOP OF SYSTEM STACK SPACE
DLYTBL: EQU     01ECOH          ;DELAY TIME STORAGE TABLE,32 DELAYS POSSIBLE
BSRSTA: EQU     01F00H          ;BSR STATUS TABLE

RCVDLY: EQU     08H             ;SET DELAY FOR RS232 'RTS' TEST TIME,2 SEC.INC'S
COMDLY: EQU     05H             ;SET COM-LINK PASSWORD TIME
EMRGCY: EQU     0C0H            ;SET BITS FOR EMERGENCY RESPONCE
OCLOCK: EQU     5460H           ;SET CLOCK ON COMAND,12:00PM. 7E90 is 6:00PM

COLD:   REQ             ;SET Q=SPACE ON RS232 TRX LINE
        LDI     00H     ;SET PROGRAM COUNTER (P.C.) FOR REGISTER (REG.) 3
        PHI     R3
        PLO     RC      ;INIT. LOW DATA STACK [1E00]
        LDI     A.0(SETPC)
        PLO     R3
SETPC:  SEP     R3
        SEX     R3
        OUT3            ;SWITCH Q FOR RS232 & SET ClearToSend (CTS) ON
        DB      60H
        SEX     R2
        LDI     A.1(CLOCK) ;ININITIALIZE HIGH ADDRESS IN SPECIAL P.C. REG.S
        PHI     R1      ;INTERUPT CLOCK P.C.
        PHI     R4      ;PSEUDO-RETURN P.C.
        PHI     R5      ;PSEUDO-CALL P.C.
        LDI     A.0(CLOCK)      ;INIT. LOW PARTS OF REG.S
        PLO     R1
        LDI     A.0(PSCALL)
        PLO     R4
        LDI     A.0(PSRET)
        PLO     R5
;
        LDI     A.1(STACK)      ;INIT. HIGH SYSTEM & DATA STACK REG.S
        PHI     R2
        PHI     RC
        LDI     A.0(STACK)      ;INIT. LOW SYSTEM STACK
        PLO     R2
        CALL    SNDMSG  ;SEND "RESET " MESSAGE TO CONFIRM START OF SYSTEM CYCLE
        DC      'RST'
        DC      00H
        BR      RSTWDT
WARM:   CALL    SNDMSG  ;PREFASCE "RESET" MESSAGE WITH "SYS " TO CONFIRM
        DC      'Sy',00H        ;CORRECT TERMINATION OF CONTROL PROGRAM
```

```
            BR      COLD
RSTWDT: LBR         CLKSET      ;JUMP TO RESET W.D.T & SET CLOCK ON COMMAND. RETURNS
        ;TO WTRTS IF NO COMMAND TO SET CLOCK; RETURNS WITH 'D'=01. IF THE CLOCK IS TO
        ;BE SET, IT JUMPS TO CLRPRG TO CLEAR MEMORY & BSR TABLE. IT THEN RETURNS TO
        ;INTRAC. (NOTE: THIS BYPASSES THE PASS-WORD REQUEST)
WTRTS:  IDL                     ;Wait for Interupt,every 2 sec.
        BN2         CTSON       ;Test RTS Status.Change BN2 to B2 to change polarity **
CTSOFF: SEX         R3          ;IF NO RTS,THEN TURN CTS OFF
        OUT3
        DB          60H
        SEX         R2
        LBR         MODCHK      ;AND JUMP TO DISCONECT MODEM AND RUN INTERPRETER PROG.
CTSON:  SEX         R3          ;IF RTS WAS ACTIVE, TURN CTS ON
        OUT3
        DB          00H
        SEX         R2
;***** LINK REQUESTS SECURITY # BEFOR GOING TO INTRACTIVE MODE.
; READS 1-4 BYTE PASSWORD SET IN P/W MODULE. IF FIRST P/W BYTE IS 00, P/W IS
; CONSIDERED VALID AUTOMATICALY. SHORTING DIGITAL IN ON PORT 22 DOSE THE SAME.
; IF NO P/W MODULE IS PRESSENT, THE DEFALT BECOMES 'FF FF FF FF' HEX.
LINK:   GHI         R3          ;SET D=00
        SKP                     ;SET R(D).1 AS FLAG TO PERMIT 2nd FOR PASSWORD
RELINK: GLO         R3          ;GET NON-00 VALUE TO USE AS 2nd TRY MARKER; 00 = 1st
        PHI         RD
        CALL        SNDMSG      ;REQUEST & TEST PASSWORD
        DB          0DH,'??:'
        DB          00H         ;;MESSAGE TAKES 133ms TO SEND, DELAY FOR SERPRT RESET.
        LDI         A.1(PASWRD)
        PHI         RF
        LDI         A.0(PASWRD) ;PASSWORD IS STORED AT 1E00H,HIGH P.C. IS 00H
        PLO         RF          ;SET PASSWORD POINTER
PSWLOP: CALL        SERPRT      ;SUB READS 1 BYTE OUT FROM R(A).1 AND READ BACK 1 BYTE
        GHI         RA          ; TO R(A).1 SERIALY.
        STR         RF          ;SAVE 1ST PASSWORD BYTE & DEC R(F)
        DEC         RF
        GLO         RF          ;TEST FOR LAST LOOP
        BNZ         PSWLOP      ;READ IN (A.0(PASWRD)=04H) BYTES FROM P/W MODULE
        STR         RF          ;D=00,STORE PASSWORD TERMINATOR
        LDI         A.0(PASWRD)
        PLO         RF          ;RESET POINTER TO PASSWORD IN MEM.
        PLO         RD          ;SET R(D).0 AS TIMER FOR RESPONCE TIME-OUT
                                ;( USE LOW PASSWORD ADDRESS TO SAVE A BYTE )
RCVN0:  DEC         RD          ;DEC TIMER
RCVPAS: CALL        RCUART
        GLO         RD          ;GET TIMER VALUE
        BZ          NOPASS      ;IF IT IS 00,TIME IS UP
        GHI         RA
        BZ          RCVN0       ;IF NO CHAR.RCV'D,TRY AGAIN
        STR         R2          ;PUT CHAR. ON STACK
        LDN         RF          ;GET PASSWORD CHAR.&....
        DEC         RF          ;...DEC FOR NEXT CHAR.
        BZ          INTRAC      ;IF IT IS 00H THEN PASSWORD MATCHED OK,GOTO INTERACT.
        XOR                     ;ELSE TEST IT AGINST THAT ON STACK
        BZ          RCVPAS      ;IF IT MATCHES,TEST THE NEXT ONE, ELSE...
NOPASS: GHI         RD          ;GET NUMBER FOR TRYS LEFT
        BZ          RELINK      ;IF 00, TRY AGAIN, ELSE...
        BR          CTSOFF      ; .. CTS OFF, RUN INTERP.

; CLEAR PROG.
CLRPRG: LDI         0FCH        ;SET START OF ERASE MEM. POINTER. SINCE MEMORY WRAPS-
        PHI         RA          ;AROUND @1FFF, ALL RAM MEM. IS CLEARED
        BR          ERARAM

;******    INTERACTIVE COMMAND ADDRESS LOOK-UP TABLBE    *******
        ORG         0080H
ICMDS:  DW          JPMONX      ;@ JUMP TO EXTENDED MONITOR IF PRESSENT
        DW          SETCLK      ;A SET CLOCK TIME & DAY
        DW          REDCLK      ;B READ CLOCK TIME & DAY
        DW          CLRPRG      ;C CLEAR ALL RAM MEM. (INCLUDING BSR CODE STATUS) TO 00H
        DW          LDPRG       ;D LOAD PROGRAM VIA RS232
        DW          RDPRG       ;E READ PROGRAM BACK VIA RS232
        DW          RDBSR       ;F READ CURRENT BSR STATUS FOR SELECTED PORT
        DW          RDOUT       ;G READ OUTPUT PORT STATUS
```

```
           DW       RDINP      ;H READ INPUT PORT STATUS
           DW       RDADC      ;I READ SELECTED ANALOG INPUT PORT
           DW       SETBSR     ;J TURN ON SELECTED BSR DEVICE
           DW       RSTBSR     ;K TURN OFF " BSR
           DW       OUTSET     ;L SET OUTPUT PORTS
           DW       INTERP     ;M JUMP TO & RUN INTERPRETER PROGRAM
           DW       CLRDTL     ;N CLEAR ONLY LOGGED DATA
           DW       RDDTL      ;O READ DATA LOG BACK TO RS232

INTERACTIVE COMMAND BLOCK
ITRAC: B2           CTSOFF     ;Test RTS,Change B2 to BN2 to change Polarity **
       DEC          R2         ;RESET WatchDogTimer (W.D.T.)
       OUT2
       CALL         SNDMSG,ODH  ;SEND CR & PROMPT ">"
       DC           OAH,'>',OOH
       CALL         FILBUF     ;RECEIVE CHAR.S ON RS232 TILL CR INTO BUFFER & RESET
       LDN          RD
       ANI          OFOH       ;TEST FOR VALID RANGE OF CHAR.S: "@"-"O"
       XRI          40H
       BNZ          INVMSG     ;SEND INVALID MESSAGE IF IT IS
       PHI          RF         ;SET HIGH LOOK-UP ADDRESS ( D=OO )
       LDA          RD         ;GET VALID CHAR.
       SHL                     ; 2X
       PLO          RF         ;SET LOW LOOK-UP ADDRESS
       LDA          RF         ;GET ADDRESS OF INTERACTIVE FUNCTION
       PHI          R6         ;AND PLACE IT IN THE PSUDO-CALL/RET REG.
       LDA          RF
       PLO          R6
       DEC          R2         ;EQUALIZE THE STACK....
       DEC          R2
       DEC          R2
       SEP          R5         ;AND DO A SNEEKY 'RETURN' TO THE ROUTINE VMSG:  CALL         SNDMSG     ;SEND INVALID MESSAGE & TRY AGAIN
       DC           'INV',OOH
       BR           INTRAC ; UP-DATE BSR STATUS.  LAST PART OF INTERPRETER EXIQUETION
; UP-DATING IS DONE ONLY FOR FIRST 48 BSR CODES;C,E,&M EVERY 16.53 MIN.
; ALL OF THESE CODE THAT ARE ACTIVE IN THE STATUS TABLE ARE SENT.
RUPD:  GHI          R7
       SHR                     ;GET LSB OF HIGH TIME
       GLO          R7
       SHRC                    ;SHIFT IT INTO LOW TIME, DROP LOW 2 SEC INC.S
       ANI          OF8H       ;MASK TO SEE IF 992 SEC. INCREMENTAL VALUE
       LBNZ         WARM       ;IF NOT TIME FOR BSR UP-DATE,RESTART WHOLE SYSTEM. ELSE
       LDI          ODOH       ;SET POINTER TO BSR STATUS TABLE TO 3rd LAST HOUSE CODE
       PLO          RD         ; THIS CONSTANTLY UPDATES ONLY THE LAST 3 HOUSE CODES
       LDI          A.1(BSRSTA) ;[ 'C' HOUSE CODES CAN BE USED AS FLAGS ]
       PHI          RD         ;SET HIGH ADDRESS OF STATUS TABLE
RNXT:  GLO          RD         ;GET NUMBER OF BSR DEVICE
       PHI          RA         ;SAVE TO TELL BSR CONTROL SUB. WHAT DEVICE TO CONTROL
       LBZ          WARM       ;IF IT'S OO ,WRAP-AROUND HAS OCCURED, RESTART SYSTEM
       GHI          RA         ;R(A).1 IS NOW BSR CODE FOR 'CNTBSR' SUB.
       PLO          RB         ;SET LOW REG. FOR BSR STAT TABLE
       LDI          A.1(BSRSTA)
       PHI          RB         ;SET HIGH REG. " " "
       GLO          RA         ;GET BSR CONTROL VALUE AND...
       STR          RB         ;...STORE IT IN TABLE
;NOTE: BSR control byte is OR'ed with House-Code; it must be correct command
; and the high nibble must be O .
       CALL         CNTBSR
       BR           JPNTRC ; - READ PROGRAM -
RDPRG: CALL         RAMBTM     ;SET START OF READ-FROM ADDRESS ,RETURNS IT IN R(F)
       GHI          RF
       PHI          RB
       GLO          RF         ;TRANSFER R(F) TO R(B)
       PLO          RB
       CALL         SETNDX     ;GET & CONVERT 4 BYTES..,RETURN ADDRESS IN R(F)
       BR           READNX     ;JUMP TO LOOP TO SEND PROGRAM
```

```
; - READ DATA LOG - ........
; LOGED DATA WILL START WITH A "C" IF IT IS IN COMPRESSED MODE, "N" IF NOT
RDDTL:  CALL    DTLID       ;MAKE SURE THERE IS LOGGED DATA
        GHI     RA
        LBZ     INVMSG      ;SEND INVALID MESSAGE IF THERE ISN'T ANY
        PHI     RB          ;SAVE DTL START HIGH ADRS IN REG.(B).1
        STXD                ;SAVE HIGH ON STACK ALSO FOR ARITHITIC LATER
        GLO     RA          ;  SAME FOR LOW PART
        PLO     RB
        STR     R2
        GLO     RE          ;GET THE CURRENT LOW DTL ADDRESS
        SM                  ;SUBTRACT THE START OF DTL FROM IT
        PLO     RF          ;SAVE LOW VALUE
        INC     R2          ;INC STACK TO HIGH VALUE
        GHI     RE          ;GET CURRENT HIGH DTL ADDRESS
        SMB                 ;DO ARITMITIC FOR HIGH VALUE
        LBNF    INVMSG      ;INVALID IF LESS THAN START OF DTL....
        ADI     01H         ;ADJUST COUNT SO REG. IS NUMBER OF BYTES IN DTL +100H
; THIS PERMITS TESTING OF ONLY THE HIGH BYTE OF THE COUNTER TO DETECT THE END
        PHI     RF          ;SAVE IT
; THIS BLOCK IS ALSO USED BY THE READ-PROGRAM BLOCK
READNX: LDA     RB          ;GET BYTE
        PHI     RA          ;PASS IT FOR..
        CALL    BYTSND      ;CONVERSION & SENDING IT VIA RS232
        DEC     R2
        OUT2                ;RESET W.D.T.
        B2      JPNTRC      ;IF RTS IS LOST, STOP SENDING DATA...
        DEC     RF          ;DEC. BYTE COUNTER
        GHI     RF          ;TEST FOR END OF LOG SPACE
        BNZ     READNX      ;IF NOT,LOOP AGAIN
        BR      JPNTRC

; - LOAD PROGRAM -
LDPRG:  CALL    SETNDX      ;GET 4 ASCII/HEX BYTES FROM THE BUFFER & RETURN IN RF
        GHI     RF
        PHI     RD          ;SET RD TO NUMBER OF BYTES TO LOAD + 0100H
        GLO     RF
        PLO     RD
        CALL    RAMBTM      ;RETURNS WITH R(F) SET TO START OF RAM SPACE
NXBYT:  CALL    RCUART      ;WAIT AND GET NEXT BYTE FROM SOFTWARE UART
        GHI     RA
        STR     RF          ;SAVE IT IN RAM
        INC     RF          ;INC FOR NEXT BYTE
;NOTE: Program size and over-flow into system memorey space is the respone-
;ability of the master computer that down-loads the program.
        LBZ     INVMSG      ;SEND INVALID MESSAGE IF IT IS
        LDA     RD          ; ELSE, GET CONTROL CODE TO SEND & INC R(D)
        BZ      BSRNXT      ;IF 00H,GET NEXT ONE
        PLO     RA          ;IF NOT 00,SET ON/OFF CODE
        CALL    CNTBSR      ;SEND CONTROL SIGNAL
        BR      BSRNXT      ;NEXT ONE
;
; - CLEAR DATA LOG -
CLRDTL: CALL    DTLID       ;SET START OF ERASE MEM. TO AFTER DATA-LOG (DTL) SPACE
        GHI     RA          ;RETURNS REG.(A)=00 IF NOT DATA LOG AVALIBLE
        BZ      INVMSG      ;IF NO DTL SPACE WAS ASSIGNED, SEND INVALID MESSAGE
ERARAM: GHI     R3          ;LOAD 00 INTO MEM.(REG.(A)) [ P.C. LOW IS 00 ]
        PHI     RE          ;CLEAR DATA LOG POINTER; NO MORE DATA LOG
        STR     RA
        INC     RA          ;INC TO NEXT ADRESS TO ERASE
        GHI     RA
        XRI     A.1(DBUFFR) ;TEST FOR LAST ADDRESS
        BNZ     ERARAM      ;LOOP IF NOT
        BR      INTRAC      ;RETURN TO INTERACTIVE WHEN DONE
; - READ CLOCK -
REDCLK: GLO     R8          ;GET & SEND DAY VALUE FROM LOW REG.(8)
        PHI     RA
        CALL    BYTSND
        GHI     R7          ;GET & SEND TIME VALUE FROM REG.(7)
        PHI     RA
        CALL    BYTSND
        GLO     R7
```

```
            BR        GROPND      ;TO SAVE MEM.,USE GROUP ENDING
;  - READ BSR -
   ; BSR COMAND CODES ARE : 02H= ON, 03H= OFF
RDBSR:  CALL      BFR2HX      ;GET 2 ASCII/HEX BYTES FROM THE BUFFER & ...
        GHI       RA          ;RETURN AS HEX. VALUE IN REG.(A)
        PLO       RA          ;SET LOW REG. OF BST STAT. TABLE
        LDI       A.1(BSRSTA)
        PHI       RA          ;SET HIGH REG. OF BSR STAT.
        LDN       RA          ;GET STAT.
        BR        GROPND

;  - READ ADC -
RDADC:  CALL      BFR2HX      ;GET ANALOG PORT TO READ VALUE INTO REG.(A) FROM BUFFER
        CALL      REDADC      ;TO PASS TO A/D INPUT SUB.
        BR        GRPNDP      ;SAVE MEM.

;  - READ OUTPORTS -
RDOUT:  GHI       R9          ;GET HIGH OUTPUT PORT STATUS...
        PHI       RA          ;AND PASS IT TO SUB...
        CALL      BYTSND      ; TO CONVERT IT TO ASCII/HEX AND SEND IT VIA RS232
        GLO       R9          ;GET LOW .....
        BR        GROPND

;  - READ INPORTS -
RDINP:  INP5                  ;READ HIGH INPUT PORT
        PHI       RA
        CALL      BYTSND      ;CONVERT & SEND IT
        INP4                  ;READ LOW INPUT PORT
GROPND: PHI       RA          ;PASS VALUE TO SUB.
GRPNDP: CALL      BYTSND      ;CONVERT TO ASCII/HEX & SEND IT VIA RS232
        BR        JPNTRC      ;JUMP BACK FOR MORE INTERACTIVE COMMANDS

;  - SET BSR PORT ON -
SETBSR: LDI       02H         ;SET BSR "ON" CONTROL VALUE....
        LSKP                  ;AND SKIP SETTING BSR "OFF" VALUE
;  - SET BSR PORT OFF -
RSTBSR: LDI       03H         ;SET BSR "OFF" VALUE
        PLO       RA          ;SAVE CONTROL VALUE FOR 'CNTBSR' SUB.
        CALL      BFR2HX      ;GET & CONVERT BSR CODE TO HEX. FROM ASCII/HEX
        DEC       R2          ;RESET W.D.T.
        OUT2
        B2        JPNTRC      ;IF RTS IS LOST, STOP SENDING DATA...
        DEC       RD          ;DEC. LOOP COUNTER
        GHI       RD          ;TEST FOR END
        BNZ       NXBYT       ;LOOP IF NOT
        BZ        JPNTRC      ;ELSE RETURN TO INTERACTIVE FUNCTIONS

;  - SET OUTPORTS -
OUTSET: CALL      SETNDX      ;GET & CONVERT 4 ASCII/HEX BYTES FROM THE BUFFER
        GHI       RF          ;RETURNED IN REG.F
        PHI       R9          ;TRANSFER THEM TO REG.9
        GLO       RF
        PLO       R9
        CALL      SETOUT      ;SET OUTPUT PORTS TO NEW STATUS VALUE
JPNTRC: LBR       INTRAC      ;BACK TO INTERACTIVE MODE

;  - SET CLOCK -
SETCLK: CALL      SETNDX      ;GET & CONVERT 4 BYTES
        GHI       RF
        PLO       R8          ;SET DAY
        GLO       RF
        PHI       R7          ;SET HIGH PART OF TIME
        CALL      BFR2HX      ;GET & CONVERT 2 BYTES
        GHI       RA
        PLO       R7          ;SET LOW PART OF TIME.
        BR        JPNTRC      ;BACK TO INTRAC.
;

;****************************************************************
; NEW SUB: SEEK-DONE  FINDES END OF PROCEDURE MARKER  'FF FF F7'
SEKDON: GHI       RF          ; TEST FOR END OF MEM.SPACE
        XRI       A.1(DBUFFR)
```

```
            LBZ      ERRMSG     ;*;IF TOO HIGH IN MEM. ERROR (RESTART @ 0000H)
            LDA      RF         ;TEST BYTES FOR LINE-'DONE'{ FF FF F7
            XRI      0FFH       ;TEST FOR 1ST FF
            BNZ      SEKDON     ;IF NOT CONTINUE 'SEEK-DONE'
            LDA      RF         ;TEST FOR 2ND FF
            XRI      0FFH
            BNZ      SEKDON
            LDA      RF         ;GET CODE BYTE FOLLOWING LINE-END AND ...
            XRI      0F7H       ; TEST FOR 'DONE',...
            BNZ      SEKDON     ;IF IT IS, RETURN,..ELSE LOOP TILL FOUND OR OUT OF MEM.
            EXIT                ;RETURN FROM SUB.
;
; SET THE CLOCK TO A FIXED TIME IF THE TIME-SET BUTTON ON THE BOTTOM IS PRESSED
;THIS ROUTINE IS USED TO SET THE CLOCK IN SITUATIONS THAT DON'T USE A MASTER
CLKSET:     DEC      R2         ;RESET W.D.T.
            OUT2
            INP4                ;GET SW. DATA
            GHI      R3         ;SETS D=01H
            AND                 ;TEST FOR TIME-SET BIT
            LBNZ     WTRTS      ;IF NOT PRESSED,TEST FOR RTS SIGNAL
            PLO      R8         ;ELSE SET DAY TO SUNDAY, SINCE 'D'=00H
            LDI      A.1(OCLOCK)
            PHI      R7
            LDI      A.0(OCLOCK)
            PLO      R7
GOBACK:     LBR      CLRPRG     ;CLEAR ALL RAM MEM.

NOLIST
;******* SPECIAL SUB. *******
; THIS SUB. PERMITS SERIAL EXPANSION OF THE SYSTEM VIA PORT 22 WHICH PROVIDE
; BOTH A DIGITAL INPUT & OUTPUT. DATA IS RECEIVED BY THE SUB. IN R(A).1 AND IS
;SHIFTED OUT LSB FIRST WHILE DATA IS SHIFTED INTO R(A)'S MSB. 1 BYTE IS
;TRANSFERED PER CALL. THE DIGITAL OUT LINE IS NORMALY LOW. IF IT IS LOW FOR
;MORE THAN 16ms, THE SERIAL PERIFERAL LATCHES THE DATA IT HAS RECEIVED AND
;LOADS THE OUTPUT SHIFT REGISTER. ON THE RISING EDGE OF THE OUTPUT LINE, THE
;MODULE'S MONOSTABLE #1 TRIGGERS AND WHEN IT TIMES-OUT 3.9ms LATER, IT CLOCKS
;BOTH THE INPUT AND OUTPUT REGISTERS. BY VARYING THE DUTY CYCLE OF THE OUTPORT
;DATA IS SEND IN THE FOLLOWING MANNER:
;     DATA TO BE SENT:
;       |  1  |  0  |  0  |  1  :  -  :  -  :  -  :  -  :
;
;     OUTPORT BIT USED FOR CLOCKING:
;     __/""""\__/"""\____/"""\____/""""_____
;
;     MONOSTABLE # 1:
;     __/""""\___/"""\____/"""\____/"""_____
;
;     MONOSTABLE # 2:
;     __/"""""""";"""""""";"""""""";""""""""""""""""""""""""""""""_____
;
            LIST

SERPRT:     LDI      08H        ;SET SHIFTS/READS COUNTER
            PLO      R0
NXSHFT:     INP5                ;GET INPUT BIT FROM PORT 22
            SHR                 ;BIT IS #1 OF HIGH PORT,DI#11
            SHR                 ;SHIFT INPUT BIT INTO DF
            GHI      RA         ;GET HIGH PART OF SOURCE, R(A)
            SHRC                ;SHIFT DF => MSB, LSB => DF
            PHI      RA         ;SAVE UPDATED R(A).1; DF IS BIT TO BE SHIFTED OUT
            LSNF                ;LONG SKIP IF DF=0
            LDI      0B0H       ;SET 2.68ms DELAY
            LSDF                ;LONG SKIP IF DF=1
            LDI      050H       ;SET 1.22ms DELAY
            PHI      R0         ;SAVE DELAY VALUE
            DEC      R2
            GHI      R9         ;GET HIGH OUTPORT STATUS
            ANI      0DFH       ;SET-UP PORT 22 OUTPUT BIT OFF
            STXD
            ORI      20H        ;SET-UP PORT 22 OUTPUT BIT ON
            STR      R2
            OUT7                ;SET BIT HIGH   <<<*******
```

```
            GHI     R0
SRLOP1:     ADI     01H         ;INC. TILL 00H
            BNZ     SRLOP1      ;IF 50H,1.22ms TILL 00, ELSE,2.68ms IF B0H
            OUT7                ;SET BIT LOW      <<<********
            GHI     R0
SRLOP2:     SMI     01H         ;DEC TILL 00H
            BNZ     SRLOP2      ;IF 50,2.68ms TILL 00, ELSE,1.22ms IF B0H
            DEC     R0          ;DECREMENT THE SHIFT COUNTER....
            GLO     R0          ;..GET IT...
            BNZ     NXSHFT      ;...AND SHIFT OUT NEXT BIT IF IT'S NOT 00
            EXIT                ; ELSE RETURN
;NOTE: CALL DLYBSR BEFOR OR AFTER AS MANY SERIAL BYTES HAVE BEEN READ AS ARE
;  REQUIRED, TO LATCH NEW DATA INTO OUTPUT PORT LATCHES AND FROM INPUTS.
;  THIS SUB PROVIDES A 41.6ms DELAY; MORE THAN ENOUGH TO TIME OUT MONO.#2

;***********************************************************
;   VCCTROM.PC2         PART 2 OF VCCTROM.ASM   REV-K
;   INITIALIZE VREELAND CONTROL CARD PROGRAM & ROUTINES
;         P.T.MILLER     6//84, 7//84, 7//85, 2//86, 3//86

;
;VCCINTRP.ASM
;       Interpreter part of Vreland Control Card ROM
            ORG     0200H
;INTERPRETER JUMP TABLE
            DW      0000H       ;00  UNDEFINED:POSSIBLE ILLEGAL CODE
            DW      BSRON       ;01  BSR ON
            DW      BSROFF      ;02  BSR OFF
            DW      PORTON      ;03  PORT ON
            DW      PRTOFF      ;04  PORT OFF
            DW      WAIT        ;05  WAIT 2-4 SEC. BEFOR CONTINUING EXEQ.
            DW      DO          ;06  DO PROCEDURE
            DW      PROCDR      ;07  PROCEDURE
            DW      IIF         ;08  IF...
            DW      SENDMS      ;09  SEND MESSAGE
            DW      IELSE       ;0A  ...ELSE
            DW      MODCLL      ;0B  MODEM CALL
            DW      USR         ;0C  USER FUNCTION
            DW      LOGDAT      ;0D  LOG DATA
            DW      DELAY       ;0E  DELAY
            DW      RSTDLY      ;0F  RESET DELAY
;
MODOFF:     GLO     R9          ;PERMITS A MODEM LINK TO APPEAR TRANSPARENT TO THE C.T.
            ANI     02H         ;CHEK TO SEE IF MODEM IS 'OFF-HOOK'
            BNZ     XMDOFF      ;IF NOT 00,'ON-HOOK', INTERPRETER
            SHL                 ;SET DF=0
            LDI     04H
            PHI     RB
            LDI     44H         ;SET 25ms OFF TIME
            PLO     RB
            CALL    SWOUT
            LDI     6AH
            PLO     RB
            LDI     03
            PHI     RB
            SHR                 ;SET DF=1
            CALL    SWOUT       ;SWOUT RETURNS D=00, R(B)=00FF
            SHR                 ;SET DF=0
            LBR     SWOUT       ;PUT MODEM 'ON-HOOK',DELAY IN SWOUT DEC.S R(B),00FE,
; AND TESTS R(B).1,00 SO NODELAY OCCURES. SWOUT'S "EXIT" BECOMES THIS SUB.S
; EXIT AND SAVE MEM.

MODCHK:     CALL    MODOFF
INTERP:     CALL    RAMBTM      ;FIND START OF RAM, RETURN IN R(F), INTERPRETER POINTER
NXTTRP:     LDA     RF          ;Get first char.& Advance Reg.(F)
            ADI     01H
            BZ      ID1FF       ;I.D.of first FF
            SMI     24H         ;Test for instruction/sync. char.
            BZ      NXTPLS      ;I.D. '23'
```

```
ERRJMP: LBR     ERRMSG      ;If not FF or '23' then send 'ERROR @' Messsg
ID1FF:  LDA     RF          ;GET 2ND CHAR
        ADI     01H
        BNZ     ERRJMP      ;I.D. OF 2ND FF,IF NOT,SEND "ERROR @ XXXX" MESSAGE
NXTPLS: DEC     R2          ;RESET W.D.T.
        OUT2
        LDN     RF          ;Get byte. But don't advance
        ADI     01H
        LBZ     BSRUPD      ;END OF PROGRAM IF 3RD FF
        XRI     0F8H
        BZ      TRPDON      ;ID DONE INSTRUCTION : F7  OF PROCEDURE
        LDN     RF
        SDI     0FH         ;DO SUBTRACTION TO TEST FOR VALID INTRUCTION; SETS MAX.
        LBNF    ERRMSG      ;INVALID INSTRC. IF >11H
        DEC     R2              ;DEC STACK FOR LATER RETURN FROM SNEEKY JUMP...
        DEC     R2              ;   "
        DEC     R2              ;   "
        DEC     R2              ; SET UP SNEEKY JUMP
        LDA     RF          ;Get byte & advance pointer
        SHL                 ;SHIFT TO DO 2X....
        PLO     R6          ;CREATE LOW "CALLED-FROM" ADDRESS
        GHI     R3          ;HIGH ADDRESS IS IN SAME BLOCK
        PHI     R6          ;REG.(6) IS POINTER TO ADDRESS OF ROUTINE
        STXD                ;SAVE HI 'RETURN ADRS';THIS BLOCK IS HIGH ADDRESS
        LDA     R6          ; GET HIGH ROUTINE ADDRESS FROM TABLE
        STR     R2          ;;TEMP. SAVE ON STACK
        LDA     R6          ;GET LOW ADDRESS [R(6) NO LONGER NEEDED AS POINTER ]
        PLO     R6          ;PUT IN LOW CALL/RET TEMP. REG.
        LDN     R2          ;;GET SAVED HIGH ADRSS
        PHI     R6          ;PUT HIGH CALL/RET
        LDI     A.0(NXTTRP) ;SET ADDRESS OF INTERPRETING THE NEXT INSRUCTION
        STXD                ;SAVE LOW RETURN ADRS
XMDOFF: EXIT            ;DO SNEEKY 'RETURN' TO INSTRUCTION; ALSO EXIT FOR MODOFF SUB.
;
; MODIFIED TO SEND ONLY NEWLY CHANGED COMMANDS,OTHERS DEPEND UPON UP-DATE TABLE
; OR 'IMMEDIATE RESPONCE' SUFIX 17H FOLLOWING BSR DEVICE #.
BSRON:  LDI     02H         ;SET "ON" COMAND BYTE
        LSKP                ;SKIP TO IMPLEMENT
BSROFF: LDI     03H         ;SET "OFF" COMMMAND BYTE
        PLO     RA          ;TEMP. SAVE
        STR     R2          ;SAVE ON STACK FOR XOR LATER
        LDA     RF          ;GET & SAVE BSR DEVICE #
        PHI     RA
        PLO     RB          ;SET POINTER TO SPECIFIED DEVIECE IN BSR STAT.TABLE
        LDA     RF          ;GET NEXT INSTRUCTION & TEST FOR IMMEDIATE SUFIX
        XRI     8FH
        BZ      BSRIM       ;IF IT IS, JUST DO IT, IGNORE TABLE
        DEC     RF          ;IF NOT, DEC PROGRAM COUNTER BACK TO OLD BYTE
        LDI     A.1(BSRSTA)
        PHI     RB          ;SET HIGH POINTER BSR STAT.
        LDN     RB          ;GET OLD BRS STAT.
        XOR                 ;COMP. WITH NEW
        BZ      NOBSR       ;IF NO CHANGE,EXIT
BSRIM:  GLO     RA          ;GET SAVED NEW VALUE (OR IMMEDIATE ONE)
        STR     RB          ;CHANGE TABLE DATA
        CALL    CNTBSR      ;CALL CONTROL-BSR SUB.
NOBSR:  EXIT                ;DO NEXT INSTUCTION ;STOP CURRENT INTERPRETER FUNCTIONS, AND FIND&EXECUTE THE SPECIFIED PROCEDURE
DO:     LDA     RF          ;SAVE PROCEDURE # ON DATA STACK
        STR     R2          ; ...ON SYSTEM STACK
        SEX     RC          ;CHANGE INDEX REG TO R(C),DATA STACK
        GLO     RD          ;SAVE THE "IF...ESLE" NESTS COUNT
        STXD                ;ON THE DATA STACK ....
        GLO     RF          ;...AND THE HIGH & LOW INTERP. P.C.
        STXD
        GHI     RF
        STXD
        SEX     R2          ;RESTORE R(2) AS INDEX REG.
        CALL    RAMBTM      ;RETURN WITH R(F)=RAM BOTTOM, INC PAST '23' TO RAMBTM+1
        INC     RF          ;SET POINTER TO RAMBTM+1
TESTPR: LDA     RF          ;TEST FOR PROCEDURE HEADER
```

```
        XRI     07H
        LBNZ    PERRMS   ;*;ERROR IF NO PROCEDUR IN VALID LOCATION;RESTORE R(F)
        LDA     RF       ;TRY TO MATCH NUMBER OF FOUND PROCEDURE ....
        XOR              ;..WITH THE NUMBER CALLED FOR SAVED ON THE STACK..
        LSNZ             ;IF NO MATCH,KEEP LOOKING
        NOP              ;SPACER FOR LONG-SKIP
        EXIT    ;=>>> IF MATCHED,'RETURN' AND EXECUTE AS NEXT INTRUCTION...
        CALL    SEKDON   ;...ELSE, SEEK 'DONE' OF CURRENT PROCEDURE...
                         ;('SEKDON' LOOKS FOR PATTERN : FF FF F7 )
        BR      TESTPR   ;..AND LOOP TO TEST NEXT PROCEDURE NUMBER.
;Procedures go at the begining of program space:  23 07 NN 23 //////
;A procedure ends & a new one begins: /// FF FF F7 07 NN 23 ///////
;The last procedure in the list,befor regular programing begins,is:
;        //////  FF FF F7 23 \\\\\\\ REG.PROG.\\\\\\\
;If no procedure number (NN) is matched,the last 'TEST FOR 07' will be
;aginst '23' and an error message will result.

;ENDING OF PROCEDURE ,RESTORE IF/ELSE NEST COUNTER & INTERP. P.C. & CONTINUE...
TRPDON: INC     RC       ;INC DATA STACK BACK TO GET SAVED VALUES
        LDA     RC
        PHI     RF       ;RESTORE OLD HIGH INTERP. P.C.
        LDA     RC
        PLO     RF       ;RESTORE OLD LOW INTERP. P.C.
        LDN     RC
        PLO     RD       ;RESTORE OLD IF//ELSE NESTING COUNTER
        BR      NXTTRP   ;JUMP TO EXECUTE INSTRUCTIONS AFTER CALL FOR PROCEDURE

; PORT ON/OFF   'ON' : N SPECIFIES BIT, 0-7 = LOW PORT, 8-F HIGH PORT
PORTON: SEQ              ;SET Q TO ACT AS FLAG
PRTOFF: CALL    BITSET
        GHI     RA       ;GET BIT-SET PATTERN
        LSQ              ;IF 'ON' SKIP NEXT INST.
        XRI     0FFH     ;CREATE MASK TO TURN BIT OFF
        STR     R2       ; SAVE APPROPREATE BIT-SET PATTERN
        LDA     RF       ;GET HI/LOW PORT DATA
        ADI     0F8H     ;SET DF=1 IF P <07H, DF=0 IF P >=07
        LSDF             ;GET HI PORT IF DF=1
        GLO     R9
        SKP
        GHI     R9
        LSNQ             ;SET PORT OFF IF Q=0
        OR               ;ELSE SET ON
        SKP
        AND
        LSDF             ;SET HI PORT IF DF=1
        PLO     R9
        SKP
        PHI     R9
        CALL    SETOUT
        REQ              ;RESET Q;Q WAS ONLY ON FOR 146uCy,=70uS
        EXIT             ;THIS IS 1/50TH OF A 300BAUD BIT TIME.

;IF/THEN/ELSE STRUCTURE
IIF:    CALL    GETVAR   ;GET VARIABLE 'X',RET. IN REG.(A)
        LDA     RF       ;GET NEXT BYTE
        STXD             ;SAVE ">"or"=" ON SYS.STACK (R2-1)
        GHI     RA       ;SAVE 1st VARIABLE
        STXD             ;SAVE HIGH BYTE (R2-1)
        GLO     RA
        STR     R2       ;SAVE LOW BYTE
        CALL    GETVAR   ;GET VARIABLE 'Y'
        GLO     RA
        SM               ;SUB. LOW'X' FROM LOW'Y':LY-LX=>'D'
        PLO     RA       ;SAVE RESULT
        INC     R2       ;INC TO GET HIGH 'X'
        GHI     RA
        SMB              ;SUB.HI'X'&'BORROW' FROM HI'Y'
        PHI     RA       ;SAVE RESULT
        INC     R2       ;INC TO GET ">"or"=" FROM STACK
        LDN     R2
        XRI     81H      ;TEST FOR '>'
        BZ      DTGRTR
```

```
                GLO     RA        ;TEST FOR EQUAL
                BNZ     NEQUAL
                GHI     RA
                BNZ     NEQUAL    ;*;IF R(A)=0,TRUE,DO NEXT INSTRC. (DF=0)
                SKP               ;ELSE,FALSE;
)TGRTR:         LSDF              ;*;IF 'DF'=0,'X'>'Y' IS TRUE,DO NEXT INSTRC.
                EXIT              ;OTHER WISE, SKIPP TILL END OF 'IF'
                NOP               ;PADDING
; ...FALSE...
;IF STATEMENT IS FALSE,ALL IF/THEN/ESLE'ES NESTED WITHIN THE FIRST STATEMENT
;ARE SKIPPED UNTILL THE END OF THE FIRST 'IF' IS FOUND.
NEQUAL:         LDI     01H       ;COUNT # OF NESTS FOR 'IELSE'
                PLO     RD        ;RD.O IS COUNTER
IDIIF:          LDA     RF        ;SEEK '#', FF FF ,END OF IF/THEN
                ADI     01H
                BZ      FF2ND     ;IF 1ST FOUND,SEEK 2ND
TSTSEP:         SMI     24H       ;TEST FOR ';',23 INSTRUC. SEPERATOR
                BNZ     IDIIF
                LDN     RF
                XRI     08H       ;TEST FOR 'IF' OF NESTED IF/THEN
                BNZ     IDIIF
                INC     RF
                INC     RF
                INC     RF
                INC     RF
                INC     RF        ; 'IF ST NN NN ~ CT ' ; ////
                INC     RF        ;INC PAST 'IF DD NN ~ DD NN ' ; ////
                INC     RD        ;INC NEST COUNTER
                BR      IDIIF     ;SEEK TIL END OF LINE MARKER IS FOUND
FF2ND           LDA     RF        ;TEST FOR 2ND FF
                ADI     01H
                BNZ     TSTSEP    ;IF NOT,TEST FOR INST.SEPERATOR
                LDA     RF        ;TEST FOR 1ST FF WAS FALSE
                ADI     01H
                BZ      FFFALS
                DEC     RF
FFFALS:         DEC     RD        ;DEC 'ELSE' COUNTER FOR NEST
                LDA     RF
                XRI     0AH       ;TEST FOR 'ELES' INSTRC.
                BNZ     NDELSE    ; BRANCH IF NOT ELSE
                GLO     RD        ;TEST FOR RIGHT NEST FOR THIS ELSE
                BNZ     IDIIF     ;SEEK NEXT NEST LEVEL
                EXIT
NDELSE:         DEC     RF        ;IF CORRECT NEXT LEVEL
                BR      IELSJP    ;GOTO NEXT PLUS...
;
LGELSE:         INC     RE        ;LOG-DATA ELSE+1
;
IELSE:          LDA     RF        ;SEEK END OF 'ELSE' STRUCTURE
                ADI     01H
                BNZ     IELSE     ;LOOP TIL FOUND
                LDA     RF
                ADI     01H       ;FIND 2ND FF
                BNZ     IELSE
                LDA     RF
                ADI     01H       ;TEST FOR FALSE FF
                LSZ               ;IF FALSE FF,DONT DEC.
                DEC     RF
                NOP
IELSJP:         LDI     A.O(NXTPLS)  ;FIX R6
                PLO     R6        ;FIRST 2 'FF' OF LINE SEPARATOR HAVE ALREADY BEEN FOUND...
                EXIT              ;'RETURN' TO NEXT-PLUS, CHECK FOR START OR F7, "DONE"

; WAIT 2 SEC. MIN.; 4 SEC. MAX.
WAIT:           IDL       ;2 IDL'S USED BECAUSE THERE IS NO SYNC. TO CLOCK.
                IDL               ;WAIT FOR INTERUPT,2 SEC. DELAY
                EXIT

; PROCEDURES SHOULD BE PLACED ONLY AT THE BEGINING OF THE PROGAM. IF FOUND IN
;THE MIDDLE, THEY WILL BE IGNORED. WHEN INVOKED, THEY ARE LOOKED FOR IN THE
;FIRST LINES OF PROG.
PROCDR:         CALL    SEKDON    ;IF PROCEDURE IS ENCOUNTERED,SKIP TILL END OF IT.
```

```
        LDN     RF          ;TEST FOR FOLLOWING '23',WHICH ENDS PROCEDURE SPACE
        XRI     23H
        BNZ     PROCDR
        EXIT                ;WHEN FOUND,XEQ.NEXT INSTRUCTION

;*******
;* DELAY & RESET DELAY USED BY INTERP.  THIS INSTRUCTION STORES THE CURRENT
; CLOCK TIME. 32 DEFFERENT TIMES CAN BE STORED, EACH BEING GIVEN A NUMBER .
; ONCE A TIME HAS BEEN STORED, IT MUST BE RESET BEFOR A NEW DELAY START TIME
; CAN BE SET. THE IF/THEN/ELSE STRUCTURE NOW CONTAINS A NEW VARIABLE, 'DT':
; DelayTime. THIS IS THE TIME DIFFERENCE BETWEEN THE CURRENT CLOCK TIME AND
; VALUE STORED WHEN THE DELAY WAS STARTED,IN EFFECT, A NEW CLOCK.
; THE FORMATE IS : ..23 OE ## 23/FF FF ... WHERE ## IS THE DELAY NUMBER.
;   RESET STORES 0000 IN THE TABLE. A DELAY CAN BE STARTED ONLY IF THE TABLE
;CONTAINS A 0000, OTHER WISE NO CHANGE OCCURES .
;    ORDER IS LOW-TIME FIRST, HIGH-TIME SECOND.

DELAY:  GHI     R3          ;USE HIGH P.C. ADDRESS FOR NON-ZERO VALUE
        LSKP                ;SKIP SETTING ZERO VALUE
RSTDLY: LDI     00H         ;SET ZERO VALUE TO INDICATE RESET OF DELAY
        PLO     RB          ;SAVE FOR LATER
        CALL    SDLTBL      ;SET THE DELAY TABLE POINTER
        GLO     RB          ;TEST FOR RESET-DELAY OR DELAY AS SAVED EARLIER
        BNZ     DLYSTR      ;JUMP TO DELAY START, else reset delay
        STR     R0          ;RESET DELAY (D already = 0)
        INC     R0
        STR     R0
DLYXT:  EXIT
DLYSTR: LDA     R0          ;TEST TABLE FOR ACTIVITY
        BNZ     DLYXT       ;IF NOT 00,DELAY IS ACTIVE, EXIT
        LDA     R0          ;GET HI DLY
        BNZ     DLYXT
        IDL                 ;WAIT FOR CLOCK INTERUPT SO THAT TIME CAN'T CHANGE.
;THIS WILL CAUSE A 2 SEC. DELAY, BUT IT HAPPENS ONLY ONCE.
        DEC     R0          ;DEC BACK TO LOW VALUE ADDRESS
        GHI     R7
        STR     R0          ;SAVE HIGH BYTE OF TIME
        DEC     R0
        GLO     R7
        STR     R0          ;SAVE LOW
        EXIT ;**************** VCCMODEM.LIB ************
;    SPECIAL SUB FOR USING THE J-CAT AS THE CARETAKER MODEM LINK
;  IF THE MODEM LINK IS MADE WITH ANOTHER SYSTEM BY DETECTING A CARRIER SIGNAL,
; A MESSAGE ( WHICH MUST FOLLOW THE MODEM CALL ), IS SENT VIA THE MODEM ,
; EXICUTION OF THE CURRENT PROGRAM STOPS, AND THE SYSTEM RESETS ITSELF. SINCE
; CARRIER-DETECT IS CONNECTED TO THE RTS LINE, THE SYSTEM WILL SEND THE PASS-
; PROMPT "??:"; AFTER 2 TRIES, OR 36 SECONDS, THE INTERPRETER RUNS AGAIN AND
; WILL RETURN TO TRY FOR A MATCHED PASS-WORD AFTER EXICUTION. ON THIS NEXT PASS,
; IF THE RTS LINE IS ACTIVE,THE MODEM CALL ROUTINE WILL BE SKIPPED.
;  IF A LINK CAN NOT BE MADE, THE PROGRAM CONTINUES AND SKIPS SENDING THE
; MESSAGE THAT FOLLOWS THE MODEM CALL.
MODCLL: BN2     MODXIT      ;IF RTS IS ACTIVE, SKIP MODEM-CALL & CONTINUE INTERP
        GLO     R9          ;GET OUTPORT STATUS
        ANI     0FDH
        DEC     R2
        STR     R2
        OUT6                ;TAKE RECEIVER OFF HOOK & WAIT 2-4 SEC.
        IDL     ;2 WAITS FOR INTERUPT ASSURES DELAY WILL BE NO SHORTER THAN 2 SEC
        IDL
NXTDAL: LDA     RF          ;GET DIGIT OF NUMBER TO DIAL FROM PROGRAM
        BZ      DALDON      ;IF 00,END OF DIALING
        PLO     RA          ;SAVE DIGIT, NUMBER OF PULSES
        ADI     0F5H        ;TEST FOR ERROR, NUMBER TOO LARGE
        BDF     WRNGNM      ;IF INVLD. #,EXIT
PULSNX: LDI     0BH         ;SET 60ms DELAY
        PHI     RB
        LDI     3DH
        PLO     RB
        GHI     R3          ;GET BYTE WITH LSB=1,MSB=0 AND SHIFT IT LEFT TO...
        SHL                 ;...SET DF=0
```

```
        CALL    SWOUT     ;PULL LINE LOW FOR 60ms FOR DIGIT OFF TIME
        DEC     RA        ;DEC PULSE COUNTER
        LDI     07H
        PHI     RB
        LDI     0D3H      ;SET 40ms DIGIT ON TIME
        PLO     RB
        GLO     RA
        BNZ     SPCDLY    ;IF RA NOT 00,SEND NEXT PULSE
        LDI     78H       ;SET 700ms DIGIT SPACE TIME
        PHI     RB
        PLO     RB
SPCDLY: GHI     R3        ;GET BYTE WITH LSB=1,MSB=0 AND SHIFT IT RIGHT TO....
        SHR               ;...SET DF=1
        CALL    SWOUT
        GLO     RA
        BNZ     PULSNX    ;IF RA NOT 00,SEND NEXT PULSE
        BR      NXTDAL    ;GET & SEND NEXT DIGIT
DALDON: LDI     0AH
        PLO     RA        ;LOOK FOR CARRIER DETECT FOR 20 SEC.
NOCARR: LDI     0FEH      ;SET CARRIER DETECT MINIMUM ACK TIME
        PHI     RB
CARRIR: DEC     RB
        GHI     RB
        BZ      MODMSG    ;IF CARRIRER DETECTED, SEND MESSAGE THAT FOLLOWS MODCLL
        BN2     CARRIR    ;TEST FLAG-LINE FOR CARRIER DETECT
        IDL               ;WAIT 2 SEC.
        DEC     RA        ;DEC TIME-OUT COUNTER
        GLO     RA        ;GET &...
        BNZ     NOCARR    ;TEST COUNTER, LOOP IF NOT 00, ELSE..
WRNGNM: CALL    MODOFF    ;DISCONECT FROM THE PHONE LINES
MODXIT: LBR     IELSE     ;SKIP MESSAGE & RETURN TO INTERPRET INTRUCTIONS
MODMSG: LDI     00H       ;SET RETURN REG(6) TO CAUSE RETURN TO RESET,NOT INTERP.
        PLO     R6
        PHI     R6
        LBR     SENDMS    ;..AND BRANCH TO 'SEND-MESSAGE' SUB.

; SET-NEW-TIME USED BY DATA LOGGING PART OF INTERP. TO SETUP & STORE THE NEXT
;LOG TIME. THE DATA LOG TIMING INTERVAL IS ADDED TO THE CURRENT TIME, ADJUSTED
; FOR OVER FLOW INTO THE NEXT DAY, AND SAVE IT ON THE DATA STACK,LOW ON TOP.
; FOR BYTE VALUES FROM 01-7F, THE TIME INCREMENTS ARE 4SEC., FOR INTERVALS FROM
; 4SEC. TO 8MIN.,28SEC. FOR 80-FF, THE INCREMENTS ARE 32SEC. , FOR INTERVALS
; FROM 32SEC. TO 1HR,7MIN.,44SEC.
SETIME: LDI     00H       ;CLEAR REG.(A) FOR SUMMING
        PLO     RA
        LDA     RF        ;GET LOG INTERVAL
        STR     R2        ;SAVE IT TO ADD LATER TO CLOCK TIME
        SHL               ;SHIFT MSB INTO DF
        BNF     SHRTIM    ;IF MSB NOT 1, SHORT ITME INTERVAL
        STR     R2        ;SAVE INTERAL VALUE X 2 ON STACK
        LDI     03H       ;SET NUMBER OF MULT LOOPS (TOTAL OF 4 SHIFTS)
        PLO     RB
MLTPLT: LDN     R2        ;GET INTERVAL
        SHL               ;INTERVAL X2
        STR     R2        ;SAVE FOR LATER
        GLO     RA
        RSHL              ;SHIFT IN HIGH BIT
        PLO     RA        ;SAVE OVERFLOW  ::X4
        DEC     RB        ;DEC & TEST COUNTER FOR 00
        GLO     RB
        BNZ     MLTPLT    ;LOOP IF NOT DONE
SHRTIM: GLO     R7        ;GET LOW CLOCK TIME
        DEC     RC        ;MAKE ROOM ON THE DATA STACK
        ADD               ;ADD IT TO THE LOW PAR OF THE LOG INTERVAL TIME
        STR     RC        ;SAVE IT ON THE DATA STACK
        GLO     RA        ;GET HIGH PART OF LOG INTERVAL TIME
        STR     R2        ;PUT IT ON THE STACK TO DO ADDITION
;>>> CATION.... IF CLOCK INC:S HERE FROM ABBF TO 0000, NEXT LOG WILL BE LATE <
        GHI     R7        ;GET HIGH CLOCK TIME
        ADC               ;ADD HIGH INTERVAL TO CLOCK TIME WITH CARRY BIT
        PLO     RA        ;TEMP. SAVE HIGH NEXT LOG TIME
        LDN     RC        ;GET THE LOW NEXT LOG TIME
        SMI     0C0H      ;DO SUBT. TO TEST FOR TIME GREATER THAN MIDNIGHT,ABC0
```

```
              PHI       RA         ;TEMP. SAVE DIFERENCE
              GLO       RA         ;GET HIGH TIME
              SMBI      0A8H       ;DO SUBT. FOR TEST
              BNF       BFRMID     ;IF A BORROW OCURRED , TIME IS BEFOR MIDNIGHT
              PLO       RA         ;...ELSE SAVE NEW TIME-MIDNIGHT IN R(A).O...
              GHI       RA
              STR       RC         ;.. AND M(R(C))
BFRMID:       DEC       RC         ;DEC STACK
              GLO       RA         ;GET LOW INTERVAL AND SAVE IT ON THE DATA STACK
              STR       RC
              EXIT                 ;RETURN

; USED TO SWITCH MODEM HOOK-CONTROL BIT ON/OFF & MAINTAIN STATUS OF PORTS,
;  AND PROVIDE A DELAY FUNCTION DEPENDENT UPON R(B).
; USE OF DF AS FLAG CAN BE USED FOR FAST SERIAL ROUTINES.
SWOUT:        GLO       R9
              LSNF
              ANI       0FDH       ;BIT 1 ON IF DF=1
              LSDF
              ORI       02H        ;BIT 1 OFF IF DF=0
              PLO       R9
              DEC       R2
              STR       R2
              OUT6
SWODLY:       DEC       RB
              GHI       RB
              BNZ       SWODLY
              EXIT

;NO MORE DATA LOG SPACE MESSAGE SUBROUTINE
NLERR:        CALL      SNDMSG     ;SEND STATUS MESSAGE TO INDICATE No more Data Log space
              DB        'Ndl'
              DB        00H
              EXIT
LOGTOP        EQU       DBUFFR     ;DEFINE BEGINING OF SYS SPACE....(TOP OF LOGSPACE)

LOGDAT:       CALL      DTLID      ;FIND BEGINING OF LOG SPACE
              GHI       RA
              BZ        NLERR      ;IF 00, BRANCH TO "NO LOG SPACE" ERROR MESSAGE
              GHI       RE
              BNZ       LOGTIM     ;IF LOG REG NOT 00,LOG SPACE HAS BEEN SET ASIDE
;...ELSE: - CREATE LOG SPACE -  AND SET COMPRESSED/NOT-COMPRESSED MARKER
              GLO       RA         ;MOVE START OF LOG SPACE RETURNED IN R(A) TO R(E)
              PLO       RE
              GHI       RA
              PHI       RE
              LDN       RF         ;GET NUMBER OF COMPRESSIONS
              BNZ       SETCMP     ;IF NOT 00, SET COMMPRESSION MARKER
              LDI       'N'        ;NOT-COMPRESSION DATA
              LSKP                 ;LONG SKIP
SETCMP:       LDI       'C'        ;COMMPRESSED DATA
              STR       RE         ;SAVE IT
              INC       RE
              INC       RE

LOGTIM:       XRI       A.1(LOGTOP) ;DEFINE END OF LOG SPACE,BEGINING OF SYS SPACE
; TEST TO SEE IF LOG SPACE IS OVER FLOWING INTO SYSTEM DATA.
              LBZ       IELSE      ;DO "ELSE" INTERPRETER FUNCTION IF IT IS; NO SPACE LEFT
              SEX       RE
              GLO       R7         ;GET PRESENT TIME
              SD                   ;SUBTRACT FROM NEXT LOG TIME
              DEC       RE
              GHI       R7
              SDB                  ;SUBTRACT FROM NEXT LOG TIME + BORROW
              SEX       R2
              LSDF                 ;LONG SKIP IF LOG TIME > CLOCK TIME
              SDI       57H        ;MAX LEAGAL NEXT LOG.TIME-CLK.TIME=5741H
              LBDF      LGELSE     ;NOT TIME FOR NEXT LOG
; - LOG DATA -
;         LOG DATA FORMATTE : LD  CC  II    'CC' IS THE # OF COMPRESSIONS/LOGN
;              IF 'CC'=00 ,THEN NO COMP. COMP. MUST BE BINARY INC.'S 1,2,4,8,...
;              'II' IS THE INTERVAL BETWEEN LOGINGS IN 2 SEC. INC.'S FROM 00 TO 7FH
;                 FROM 80 TO FF INC.'S ARE BY 32 SEC. ,IGNORING THE HIGH BIT
```

```
           GHI     R7        ;GET AND SAVE PRESENT TIME IN LOG
           STR     RE
           INC     RE
           GLO     R7
           STR     RE
           INC     RE
           LDA     RF        ;GET LOGGING CONTROLS...
           BNZ     COMPDT    ;IF NOT > 00, GOTO COMPRESS DATA
; - LOG DATA , NO COMMPRESSION -
           CALL    SETIME    ;SET NEXT LOG-DATA TIME.
LDNCMP:    INC     RF        ;INC PAST 23H INSTRUCTION SEPARATOR IN PROG.
           CALL    GETVAR    ;GET THE VARIABLE SPECIFIED
           GLO     RA
           STR     RE        ;GET & STORE VARIABLE VALUE
           INC     RE
           LDN     RF
           XRI     OFFH      ;TEST FOR END OF ITEMS-TO-BE-LOGGED MARKER 'FF FF'.
           BNZ     LDNCMP    ;IF NOT MARKER,CONTINUE LOGGING
           LDI     OFFH      ;CHANGES TO 'FF' TO INDICATE LOG SEGMENT END
           STR     RE        ;STORE 2 FFS TO INDICATE END OF LOG ITEMS
           INC     RE
           STR     RE
           INC     RE
           LDA     RC        ;
           STR     RE        ;
           INC     RE        ;
           LDA     RC        ;   STORES NEXT LOG TIME
           STR     RE        ;
           INC     RE        ;
           LDI     OOH
           STR     RE
           DEC     RE
           EXIT              ; JUMP NEXT FOR NEXT INSTRUCTION
; - COMPRESS LOGGED DATA -
COMPDT:    PHI     RD        ;!;SAVE # OF COMPRESSIONS IN R(O).1
           DEC     RE
           DEC     RC
           GHI     RE
           STR     RC
           DEC     RC
           GLO     RE
           STR     RC        ;SAVE LOG STARTING ADRS. ON DATA STACK
           DEC     RE
           CALL    SETIME
           LDA     RC        ; GET & SAVE NEXT LOG TIME
           STR     RE
           INC     RE
           LDA     RC
           STR     RE
           INC     RE
           LDN     RE        ;WHEN DATA LOG IS CLEARED,ALL EXTRA RAM IS OO
           BNZ     NTHPAS    ; ELSE THIS IS THE # OF LOGS STILL TO BE DONE.
; FIRST 'COMPESSED LOG' PASS ......
           GHI     RD
           SMI     01H
           STR     RE
           INC     RE
NOTERM:    INC     RF
           CALL    GETVAR
           GLO     RA
           STR     RE        ;STROE FOR HIGH VALUE
           INC     RE
           STR     RE        ;STORE FOR LOW VALUE
           INC     RE
           STR     RE        ;STORE FOR AVERAGE VALUE
           INC     RE
           GHI     RA
           STR     RE        ;CLEAR SPACE FOR AVERAGE SUMMING
           INC     RE
           LDN     RF
           XRI     OFFH      ;I.D. LOG TERMINATOR
           BNZ     NOTERM    ;LOOP IF NOT LOG TERMINATOR
           LDA     RC        ;
```

```
               PLO      RE       ;
               LDA      RC       ;
               PHI      RE       ; RESTORE LOG STARTING ADRSS.
JMPNXT:        EXIT              ;DO NEXT INSTRUCTION OF INTERPRETER
; N TH PASS OF LOG COMPRESSION......
NTHPAS:        SMI      01H
               STR      RE
               INC      RE
               LDI      00H
               PLO      RD       ;SET DATA POINT COUNTER
SUMDAT:        INC      RF
               CALL     GETVAR
               SEX      RE
               GLO      RA
               SD
               LSDF     ;NTGRTR   ;SAVE NEW VALUE IF GREATER THAN OLD ONE
               GLO      RA
               STR      RE
NTGRTR:        INC      RE
               GLO      RA
               SM
               LSDF     ;NTLESS   ;SAVE NEW DATA IF LESS THAN OLD DATA
               GLO      RA
               STR      RE
NTLESS:        INC      RE
               GLO      RA
               ADD
               STR      RE
               INC      RE
               BNF      NOVERF   ;ADD 1 TO OVERFLOW COUNTER IF DF=1
               LDX
               ADI      01H
               STR      RE
NOVERF:        INC      RE
               INC      RD
               SEX      R2
               LDN      RF
               XRI      0FFH     ;TEST FOR END OF LOG ITEMS
               BNZ      SUMDAT   ;IF NOT END,LOOP
               LDA      RC
               PLO      RE
               LDA      RC
               PHI      RE       ;RESTORE LOG STARTING ADRS.
               INC      RE       ;INC POINTER TO NUMBER OF LOGS TO GO
               LDN      RE       ;TEST # OF LOGS YET TO BE DONE
               DEC      RE
               BNZ      JMPNXT   ;IF # OF LOGS IS NOT 00,RETURN TO INTERPRETER
; R(D).1 : # OF LOGS TO COMPRESS
; R(D).0 : # OF POINTES / LOG
; - DIVIDE SUMS TO GET AVERAGE - .....
               INC      RE
               INC      RE       ;SET POINTER TO FIRST POINT NTH DATA
               GHI      RD
               PHI      RB
DIVLP1:        GLO      RE
               PLO      RA
               GHI      RE
               PHI      RA       ;USE R(A) AS DIV. POINTER
               GLO      RD
               PLO      RB
DIVLP2:        INC      RA
               INC      RA
               INC      RA       ;INC TO HIGH BYTE OF SUM
               LDN      RA
               SHR               ;DIV. BY 2, SET BORROW
               STR      RA
               DEC      RA
               LDN      RA
               RSHR              ;DIV. BY 2 + BORROW
               STR      RA
               INC      RA
               INC      RA
```

```
                DEC     RB          ;DEC # OF POINTES IN LOG
                GLO     RB          ;( DIV ALL DATA POINT SUMS BY 2)
                BNZ     DIVLP2
                GHI     RB
                SHR
                PHI     RB
                SMI     01H
                LBNZ    DIVLP1
; - ALL DIV. DONE , COMPRESS & STORE - .....
                GHI     RE
                PHI     RA
                GLO     RE
                PLO     RA          ;SET SOURCE POINTER
                DEC     RE
STRPNT:         LDA     RA
                STR     RE          ;STORE HIGH POINT
                INC     RE
                LDA     RA
                STR     RE          ;STORE LOW POINT
                INC     RE
                LDA     RA
                STR     RE          ;STORE AVERAGE POINT
                INC     RE
                INC     RA
                DEC     RD
                GLO     RD
                BNZ     STRPNT      ;IF NOT LAST LOG ITEM,REPEATE FOR NEXT ITEM
                LDI     0FFH
                STR     RE
                INC     RE
                STR     RE          ;SET LOG POINTES SEPARATOR
                INC     RE
                GHI     R7
                STR     RE
                INC     RE
                EXIT                ;RETURN TO INTERPRETER
;*******************************************************
;     VCCTROM.PC3       PART 3 OF VCCTROM.ASM   REV-K
;  INITIALIZE VREELAND CONTROL CARD PROGRAM & ROUTINES
;          P.T.MILLER   6//84, 7//84, 7//85, 2//86, 3//86

;********* VCCSUB.  *******
;SET THE OUTPUT PORT BITS TO THE STATUS SPECIFIED BY REG.(9)
SETOUT:         DEC     R2
                GHI     R9
                STXD
                GLO     R9
                STR     R2
                OUT6
                OUT7
                EXIT

;INTERUPT-DRIVEN CLOCK; EVERY 2 SEC. AN INTERUPT IS GENERATED. UPON BEING
;RECEIVED, THE uP'S OLD P.C. IS SAVED AN REG.(1) IS USED INSTEAD. ITS VALUE
;IS ALLWAYS SET TO 'CLOCK'.THIS IS WHY 'CLKRET' IS PLACED BEFOR IT.THIS WILL
;LEAVE REG.(1) POINTING AT 'CLOCK' AFTER IT EXITS AND RESTORES THE OLD P.C.
; THE INTERUPT DRIVEN CLOCK KEEPS THE TIME AS INCERMENTS OF 2 SEC.;43,200 INC.S
; = 24 HOURS, OR A8C0 hex.  REG.(7) IS THE COUNTER FOR THIS CLOCK.
CLKRET:         INC     R2
                LDXA                ;GET BYTE HOLLDING DF, CARRY/BORROW FLAG
                SHR                 ;RESTORE DF
                LDXA                ;RESTORE 'D',PRIMARY ACCUM.
                RET                 ;RESTORE OLD P.C. REG.
;START OF INTERUPT DRIVEN CLOCK PROGRAM
CLOCK:          DEC     R2          ;DEC STACK TO PRESERVE DATA IN PROCESS
                SAV                 ;SAVE TEMP. REG.,OLD P.C.& X REG.S
                DEC     R2
                STXD                ;SAVE 'D'
                SHLC                ;SHIFT DF INTO 'D'
                STXD                ;SAVE IT AND DEC STACK
                INC     R7          ;INCREMENT THE CLOCK TIME REG.
```

```
        GLO     R7      ;THEN TEST TO SEE IF IT HAS OVERFLOWED TO THE NEXT DAY.
        SMI     0BFH
        GHI     R7
        SMBI    0A8H
        BM      CLKRET  ;RETURN IF NOT
        INC     R8      ;ELSE INCREMENT DAYS,...
        GLO     R8      ;KEEP DAYS IN 0-6 BOUNDS .....
        SMI     07H
        BNF     RSTIME
        ANI     07H
        PLO     R8
RSTIME: LDI     00H     ;....AND RESET THE CLOCK TO 12:00AM
        PHI     R7
        PLO     R7
        BR      CLKRET

; SINCE THE 1802 HAS NO TYPICAL 'RETURN' INSTRUCTION, ONE CAN BE IMPLEMENTED
;BY DEDICATING REG.(4),&(5) AS PROGRAM COUNTERS TO SPECIFIC ROUTINES.
;REG.(6) IS USED AS A TEMPORARY REG. FOR HOLDING THEMOST IMMEDIATE RETURN ADRSS
;,THE REST ARE SAVED ON THE STACK. TO MAINTAIN REG.(4) POINTING TO 'PSRET',THE
;SAME JUMP-TO-BEFOR TECNEQUE IS USED HERE AS IN.THE INTERUPT ROUTINE.
RETRET: SEP     R3      ;RESTORE P.C. TO REG.(3)
;START OF PSUEDO-RETURN INSTRUCTION
PSRET:  GHI     R6      ;MOVE REG(6),CALLED-FROM-ADDRESS, INTO REG.(3), P.C.
        PHI     R3
        GLO     R6
        PLO     R3
        INC     R2      ;GET PREIVOUS CALLED-FROM-ADDRESS FROM STACK INTO REG.(6)
        LDA     R2
        PLO     R6
        LDA     R2
        PHI     R6
        BR      RETRET  ;CHANGE P.C.

;THE PSEUDO-CALL INSTRUCTION FUNCTIONS AS ABOVE
RTCALL: SEP     R3
PSCALL: DEC     R2      ;SAVE PREV. CALLED-FROM-ADDRESS ON STACK
        GHI     R6
        STXD
        GLO     R6
        STXD
        GLO     R3      ;GET ADDRESS TO CALL FROM OLD P.C. REG.(3) & ADVANCE
        PLO     R6
        GHI     R3
        PHI     R6
        LDA     R6      ;SAVE PESENT CALLED-FROM ADDRESS IN REG.(6)
        PHI     R3
        LDA     R6
        PLO     R3
        BR      RTCALL  ;RETURN OLD P.C. REG.

;SEND DATA OUT Q FLIP-FLOP PORT AS AN 8-BIT,NO PARITY,1 STOP-BIT,300 BAUD UART
; DATA IS RECEIVED IN REG.(A).1 ,REG.(A).0 IS BIT SHIFT COUNTER, STACK NOT USED
; RS232 VOLTAGES: >+3='0',<-3='1'  CPU CLOCK IS 2.097152 Mhz  3.33ms/BIT
; SINCE Q IS SHARED BY THE RS232 & BSR DRIVERS, Q MUST FIRST BE SWITCHED TO
; THE RS232 DRIVERS BEFOR THE ROUTINE IS CALLED
SDUART: SEX     R3      ;SET X FOR DATA THAT FOLLOWS DISABLE.
        DIS             ;DISABLE INTERUPS FOR 1 CHAR TO PEVENT DATA LOSS
        DB      023H    ;2=X , 3=P.C.
        LDI     09H     ;SET COUNTER FOR (8~BITS+1~STOP)-1 FOR UART WORD
        PLO     RA      ;SAVE IN COUNTER REG.
        ADI     00H     ;SET DF=0 (CARRY/BORROW FLAG) TO SEND START BIT
    ; START SENDING SEIRIAL DATA....
SNDLOP: LSNF            ;SKIP TO SET Q FOR SPACE IF DF= 0
        REQ             ;SET Q FOR MARK;1
        LSKP            ;SKIP OVER SETTING Q FOR SPACE
        SEQ             ;SET Q FOR SPACE;0
        NOP             ;EQUALIZES TIME OF LOOP FOR SPACE/MARK SETTING
        LDI     0D4H    ;SET DELAY TIMING TO PROVIDE BIT DELAY
SBTIME: SMI     01H      ;OF 3.33ms IN THE LOOP. TO CHANGE BAUD RATE,TAKE INTO
        BNZ     SBTIME   ;ACCOUNT THE TIMING OF THE REST OF THE LOOPS.
        DEC     RA      ;DEC. THE BIT COUNTER
        GLO     RA      ;IF 0,TIME TO SEND THE STOP BIT
```

```
            BZ       SNDSTP
            GHI      RA        ;ELSE, GET THE BYTE TO SEND ...
            SHRC               ;AND SHIFT ITS LSB INTO DF ...
            PHI      RA        ;THEN SAVE THE SHIFTED BYTE FOR THE NEXT BIT TO BE SENT
            BR       SNDLOP    ;LOOP AND SEND BIT.
SNDSTP:     NOP                ;EQUALIZE MIRCO-CYCLES OF LOOP
            NOP                ; "
            SHL                ; "
            REQ                ;SEND MARK FOR STOP BIT
            LDI      0DAH      ;SET COUNT FOR DELAY LOOP FOR STOP BIT LENGTH
SNDEQL:     SMI      01H       ;SUBTRACT 1 AND TEST FOR 00...
            BNZ      SNDEQL    ;LOOP IF NOT..
            SEX      R3        ;SET X TO USE DATA THAT FOLLOWS
            RET                ;TO RESTORE P.C.,STACK REG. & ENABLE INTERUPTS
            DB       23H       ;X=2 , P.C.=3
            EXIT               ;RETURN FROM SUB.

;RECEIVE SERIAL DATA     ....SAME CONFIGURATION AS UART SEND... MODIFIES REG.(B)
;           REG.(A).1 RETURNS DATA, IF NO DATA RECEIVED AFTER WAITING FOR START
;           BIT, REG.(A).0 RETURNS 00H
RCUART:     LDI      08H       ;SET SHIFT COUNTER
            PLO      RA
            LDI      00H       ;CLEAR R(A).1 TO 00
            PHI      RA
            PHI      RB        ;SET R(B) FOR MAX. COUNT [0000-1]
            PLO      RB        ; LOOP TIME IS 14uC , TOTAL= 3.5 SEC.
RCSRCH:     BN1      RCSTRT    ;TEST FLAG LINE FOR MARK,START RECEIVING DATA IF MARK
            NOP                ;LENGTHEN LOOP TIMING
            NOP                ; "
            DEC      RB        ;DEC. COUNTER
            GHI      RB        ;TEST TO SEE IF IT IS 00 IN HIGH REG.(SKIP TESTING LOW)
            BNZ      RCSRCH    ; LOOP IF NOT 00NN FOR ANOTHER TRY
            EXIT               ; IF NO START BIT FOUND BEFORE TIME-OUT, RETURN
RCSTRT:     SEX      R3        ; SET POINTER FOR DATA
            DIS                ;DISABLE INTERUPTS TO PREVENT DATA LOSS
            DB       23H       ;X=2 , PC=3
            LDI      0B3H      ;SET DELAY LOOP FOR 1.5 BIT TIMES TO GET FAST START BIT
            LSKP               ;INTO MIDDEL OF FIRST DATA BIT; SKIP SETING FOR BITS
RCSET:      LDI      76H       ;SET DELAY FOR 1 BIT TIME TO GET INTO MIDDEL OF NEXT BIT
RCWBIT:     SMI      01H       ;SUB. 1 FROM DELAY VALUE
            NOP                ; LENGTHEN LOOP CYCLE TIME
            BNZ      RCWBIT    ;CONTINUE LOOPING TILL 00
            GHI      RA        ;GET BYTE TO SHIFT IN RECEIVED BIT
            BN1      RCV0      ;TEST FLAG LINE FOR MARK/SPACE; JUMP IF SPACE
            ORI      80H       ;ELSE SET MSB BIT ...
            LSKP               ;AND SKIP EQUALIZING INSTRUCTIONS
RCV0:       NOP                ;EQUALIZE TIMING
            DEC      RB        ; "
            PHI      RA        ;SAVE INPUT DATA BYTE
            DEC      RA        ;DEC. BIT COUNTER
            GLO      RA        ;TEST TO SEE IF ALL BIT HAVE BEEN SHIFTED IN
            BZ       SHFTD     ;JUMP TO WAIT FOR STOP BIT TO PASS IF YES,ELSE...
            GHI      RA        ;GET INPUT DATA BYTE
            SHR                ;SHIFT ONCE TO THE RIGHT
            PHI      RA        ;SAVE IT FOR NEXT BIT
            BR       RCSET     ;AND JUMP BACK AND WAIT FOR IT
SHFTD:      LDI      0D0H      ;SET DELAY LOOP COUNTER
RCEND:      SMI      01H       ;SUB. 1
            BNZ      RCEND     ;LOOP IF NOT 00
            SEX      R3        ;DATA FOR RESTORING INTERUPTS
            RET                ;RE-ENABLE INTERUPTS
            DB       23H       ;X=2 , PC=3
            EXIT               ;RETURN FROM SUB.

; HEX. NUMBER TO ASCII/HEX SUB.  RECEIVES BYTE IN R(A).1
;RETURNS 2 BYTE ASCII REPPRESENTATION ON DATA STACK [R(C)],HIGH NIBBLE FIRST
HEXASC:     GHI      RA        ;GET HEX. BYTE PASSED IN R(A).1
            DEC      RC        ;DEC DATA STACK
            ANI      0FH       ;ISOLATE LOW NIBBLE
            SMI      0AH       ;SUBT. TO TEST FOR VALUE > 9
            LSDF               ;SKIP NEXT INSTR. IF IT IS; NO BORROW
            ADI      0F9H      ;IF IT WAS < 9,BORROW OCURRED, ADD F9H+41H=3AH
```

```
        ADI     41H         ;IF > 9, ADD ONLY 41H (OVERFLOW IGNORED   )
        STR     RC          ;NIBBLE IS NOW IN ASCII REPPRESENTATION, ON SYS.STACK
        DEC     RC          ;DEC. DATA STACK FOR HIGH NIBBLE
        GHI     RA          ;GET HEX. BYTE PASSEDIN R(A).1
        SHR                 ;SHIFT O INTO MSB X4 TO PLACE HIGH NIBBLE IN LOW PLACE
        SHR
        SHR
        SHR
        SMI     OAH         ;DO SAME ROUTINE AS BEFOR TO CONVER FROM HEX TO ASCII
        LSDF
        ADI     OF9H
        ADI     41H
        STR     RC          ;SAVE LOW NIBBLE...
        EXIT                ;... AND RETURN
;RECEIVE CHAR.S INTO BUFFER UNTIL A CR IS RECEIVED, THEN RESET THE BUFFER TO
; START, AND RETURN. BECAUSE OF UART SUB. OO IS NOT RECEIVEABLE IN FILBUF
;REG.(D) IS THE BUFFER POINTING REG.
FILBUF: LDI     A.1(DBUFFR) ;SET HIGH BUFFER ADDRESS
        PHI     RD
        LDI     OOH         ;SET LOW BUFFER ADDRESS
        SKP                 ;SKIP GETTING R(D) FOR FIRST PASS..
OVFPRT: GLO     RD          ;GET LOW R(D) FOR THE REMAINING PASSES...
        ANI     1FH         ;...AND LIMIT BUFFER SIZE TO 32 BYTES
        PLO     RD
URTCLL: CALL    RCUART      ;WAIT FOR DATA FROM UART
        GHI     RA          ;GET DATA RECEIVED
        BZ      URTCLL      ;IF OO, NO DATA ,WAIT AGAIN
        STR     RD          ;SAVE RECEIVED BYTE IN BUFFER
        INC     RD          ;INC. BUFFER POINTER
        XRI     ODH         ;TEST FOR CR,IF NOT,RESET HIGH PART OF BUFFER TO PEVENT
        BNZ     OVFPRT      ; OVER FLOW AND WAIT FOR NEXT CHAR.
        LDI     OOH         ;RESET BUFFER TO THE STARTING ADDRESS
        PLO     RD          ;[ R(D).1 IS UNCHANGED. ]
        EXIT

;ASCII/HEX TO HEX. BYTE SUB.  2 ASCII/HEX BYTES ARE RECEIVED ON THE DATA STACK
;LOW NIBBLE @ R(C)-2,HIGH R(C)-1 ,CONVERT TO A HEX. BYTE RETURNED IN R(A).1
ASCHEX: CALL    ASC2H       ;CONVERT ASCII BYTE ON DATA STACK TO A HEX NIBBLE
        INC     RC          ;INC DATA STACK TO NEXT BYTE,LEAVE CONVERTED BYTE SAFE
        CALL    ASC2H       ;CONVERT
        LDN     RC          ;GET HIGH CONVERTED NIBBLE
        SHL                 ;SHIFT IT TO HIGH 4 BITS
        SHL
        SHL
        SHL
        DEC     RC          ;DEC DATA STACK TO LOW NIBBLE
        SEX     RC          ;CHANGE INDEX REG X TO REG(C)
        OR                  ;OR HIGH NIBBLE WITH LOW IN M(R(C))
        SEX     R2          ;RESTORE X=2
        INC     RC          ;INC. TO RESTOR DATA STACK
        PHI     RA          ;SAVE CONVERTED BYTE IN R(A).1
        EXIT                ;RETURN

;SUB. USED BY SUB. CONVERT ASCII BYTE ON DATA STACK TO HEX NIBBLE ON DATA STACK
ASC2H:  LDN     RC          ;GET ASCII BYTE FROM STACK
        ANI     7FH         ;CLEAR HIGH BIT
        SMI     3AH         ;SUBT. 3AH TO TEST FOR > 9
        LSDF                ;SKIP NO BORROW, "A"-"F"
        ADI     07H         ;ADD FOR 0-F
        ADI     03H         ;ADD FOR A-F
        STR     RC          ;SAVE CONVERTED BYT ON DATA STACK
        EXIT                ;RETURN

;BUFFER TO HEX. SUB. TAKE 2 BYTES FROM THE BUFFER AND CONVERTS THEM TO A HEX.
; BYTE RETURNED IN R(A).1 R(D) THE BUFFER REG. IS UP-DATAED TO THE NEXT BYTE.
BFR2HX: LDA     RD          ;GET BYTE & ADVANCE R(D)
        STR     RC          ;SAVE IT ON DATA STACK
        DEC     RC          ;DEC STACK
        LDA     RD          ;GET ,ADVANCE ,& SAVE
        STR     RC
        CALL    ASCHEX      ;CONVERT USING SUB.
MSGRET: EXIT
```

```
;SEND MESSAGE; SEND THE BYTES FOLLOWING THE CALL VIA THE UART UNTILL 00 FOUND
SNDMSG: LDA     R6         ;GET BYTE POINTED TO BY TEMP. RETURN REG.(6) & INC. R(6)
        PHI     RA         ;PASS IT TO R(A).1 FOR THE UART
        BZ      MSGRET     ;IF IT IS 00, RETURN VIA EXIT OF PEVIOUS SUB.TO SAVE MEM
        CALL    SDUART     ;SEND VIA UART
        BR      SNDMSG     ; LOOP FOR NEXT BYTE
;SEND THE HEX. BYTE RECEIVED IN R(A).1 VIA THE UART AS 2 ASCII/HEX CHAR.S
BYTSND: CALL    HEXASC     ;CONVERT R(A).1 TO 2 ASCII/HEX BYTES ON THE DATA STACK
        LDA     RC         ;GET THE HIGH BYTE FROM THE DATA STACK & ADVANCE
        PHI     RA         ;PASS IT IN R(A).1 ....
        CALL    SDUART     ;... TO THE UART
        LDA     RC         ; DO THE SAME FOR THE NEXT CHAR.
        PHI     RA
        CALL    SDUART
        EXIT

;READ THE SELECTED ANALOG INPUT CHANNEL SPECIED BY R(A).1 UPON ENTRY.
;CHANNEL NUMBER MUST BE IN LOW NIBBLE,HIGH NIBBLE SHOULD BE 0.  R(A).0 IS MOD.
; THE MAX. VALUE IS LIMITED TO 'FE' TO ASSURE THAT 'FF' IS A UNEQUE SEPARATOR.
REDADC: GHI     RA         ;GET CHANNEL
        ANI     0FH        ;CLEAR HIGH BITS
        DEC     R2         ;DEC STACK
        STXD               ;SAVE ON STACK AND DEC.
        STR     R2         ;SAVE ON STACK AGAIN
        OUT3               ;OUT PUT PORT TO READ TO ADC, THIS ALSO STARTS
;CONVERSION. A DELAY IS REQUIRED TO PERMIT THE INPUT TO SETTLE
        LDI     20H        ;SETTLING DELAY VALUE 6uC X 7937 X 3.8147uS/uC = 181mS
        PHI     RA
CHNDLY: DEC     RA         ;DEC LOOP COUNTER
        GHI     RA         ;TEST FOR 00 IN HIGH REG.
        BNZ     CHNDLY     ;LOOP IF NOT 00
        OUT3               ;IF DONE, RESTART CONVERSION
CNVW1:  B4      CNVW1      ;TEST FOR CONVERSION DONE;IF EF4=1,DOING CONVERSION,LOOP
        DEC     R2         ;DEC. SYS.STACK FOR DATA
        INP1               ;READ ADC ONTO STACK
        LDA     R2         ;GET DATA & MAKE SURE IT'S LESS THAN FF ;R(2)+1
        ADI     01H        ;IF IT IS FF, NOW IT WILL BE 00
        LSNZ               ;SKIP FIRST SMI IF NOT 00, RESTORING ORIGINAL NUMBER
        SMI     01H        ;..ELSE -2, MAKING MAX VALUE FE
        SMI     01H
        PHI     RA
BSXET:  EXIT               ;RETURN

;CREATE A 1 BYTE BIT MASK USE BYE THE INTERPRETER IN ACCESSING A SINGLE BIT
;OF THE INPUT OR OUTPUT PORTS. IT READ S ABYT DIRECTLY FROM THE PROGRAM VIA
; R(F) & USES THE LOWER 3 BITS TO CREATE THE MASK: "03" : R(A).1= 00000100
; THIS IS BIT 3.
BITSET: LDN     RF         ;GET BIT POSITION FROM INTERP. P.C.
        ANI     07H        ;CLEAR TO LIMIT RANGE
        PLO     RA         ;SAVE IN R(A).0 AS POSITION COUNTER
        LDI     01H        ;SET 'D' TO BIT IN 0 POSITION
SHLOP:  PHI     RA         ;SAVE IT
        GLO     RA         ;GET BIT POSITION COUNTER
        BZ      BSXET      ;EXIT VIA PREVIOUS SUB. IF 00, TO CONSERVE MEM.
        DEC     RA         ;DEC. POSITION COUNTER
        GHI     RA         ;GET MASK BYTE
        SHL                ;SHIFT IT ON PLACE LEFT TO THE NEXT BIT ...
        BR      SHLOP      ;.. AND TRY AGAIN TILL DONE

;LOCATE THE BEGINING OF THE DATA-LOG SPACE BY FINDING THE "DTL:" MARKER AT THE
; END OF THE PROGRAM AND RETURNING THE ADDRESS FOLOWING THE ":" IN R(A)
; IF NO MARKER IS FOUND, R(A).1 RETURNS AS 00
DTLID:  LDI     08H        ;INIT. R(A) TO START OF LOWEST POSSIBEL ADDRESS OF DTL:
        PLO     RA
        PHI     RA
SEKDTL: LDA     RA         ;GET BYTE FROM MEM(R(A)) AND INC. R(A)
        XRI     44H        ;TEST FOR "D"
        BZ      IDCHR      ;IF FOUND, TEST FOR NEXT CHAR.,ELSE...
        GHI     RA         ;...TEST FOR END OF VALID MEM.
        XRI     A.1(DBUFFR)
        BZ      NDTL       ;IF OUT OF RANGE, NO-DATA-LOG
        BR      SEKDTL     ;...ELSE, TRY AGAIN..
```

```
IDCHR:   LDA    RA         ;TEST FOR 2ND CHAR.
         XRI    54H
         BNZ    SEKDTL     ;IF NO MATCH,LOOK FOR 1ST AGAIN
         LDA    RA         ;..ELSE TRY FOR 3RD
         XRI    4CH
         BNZ    SEKDTL     ;IF NOT, TRY FOR FIRST
         LDA    RA         ;....ELSE TEST FOR LAST CHAR.
         XRI    3AH
         BNZ    SEKDTL     ;IF NOT, TRY FOR FIRST..
         EXIT              ;... ELSE RETURN WITH R(A9 SET TO LOG-DATA-ADDRESS
NDTL:    PHI    RA         ;CLEAR R(A).1 TO INDICATE NO-DATA-LOG
         EXIT

; GETS THE CHAR.S FOLLOWING THE INTERPRETER INSTRUCTION TO SEND A MESSAGE,
;  AND SENDS THEM VIA RS232 TILL 00H IS ENCOUNTERD. THIS SUB. USED ONLY BY THE
; INTERPRETER
SENDMS:  LDN    RF         ;GET BYTE FROM INTERPRETER P.C.
         PHI    RA
         CALL   SDUART     ;SEND BYTE TO UART
         LDA    RF
         BNZ    SENDMS     ;LOOP TIL 00H
         EXIT

; SUBROUTINE CALLED AS INTERPRETER INSTRUCTION TO PERMIT EXECUTION OF SPECIAL
; MACHINE CODE ROUTINES WITHIN THE INTERPRETER. AFTER USER ROUTINE IS DONE,
; RETURN TO THE INTERPRETER IS ACCOMPLISHED BY SETTING R(F) TO THE ADDRESS
; JUST AFTER THE USR CODE'S RETURN INSTRUCTION, D5-Hex. THE STACK AND R(6) MUST
; BE JUST AS THEY WERE UPON ENTERING THE MACHINE CODE.
USR:     DEC    R2         ;DEC. STRACK POINTER
         GHI    R6         ;GET HIGH RETURN ADDRESS
         STXD              ;SAVE IT ON THE STACK
         GLO    R6         ;SAME FOR LOW ADDRESS
         STXD
         GLO    RF         ;TRANSFER INTERPRETER POINTER FROM INTERP. P.C.
         PLO    R6         ; TO TEMPORARY REG. FOR RETURN.
         GHI    RF         ;THIS SETS THE ADRS. FOR A SNEEKY 'RETURN'
         PHI    R6         ; TO THE USR PROGRAM
USRET:   EXIT              ;JUMP TO USR,RET TO NEXT INSTRUC. OF PROGRAM

;VARIABLE LOOK-UP-JUMP TABLE
         ORG    0680H
         DB     A.0(DLYTIM)    ; 84 DELAY TIME
         DB     A.0(CLKDAY)    ; 85 CLOCK DAY VARIABLE
         DB     A.0(INPUTN)    ; 86 INPUT BIT FROM PORT
         DB     A.0(DATANN)    ; 87 DATA VALUE
         DB     A.0(CLKDAT)    ; 88 CLOCK TIME
         DB     A.0(SCHTIM)    ; 89 SCHEDUAL TIME
         DB     A.0(BSRNN)     ; 8A BSR DEVICE NN STATUS
         DB     A.0(OTPRTN)    ; 8B OUTPUT PORT BIT "N"
;GET VARIABLE SUB. USED BY INTERPRETER TO GET DAT FOR CONDITONALS. IT READS &
;ADVANCES THE INTERP. PC. TO GET DATA.  THE VARIABLE IS RETURNED IN R(A).1 & .0
; >>>>>>>>>>> CATION !!! <<<<<<< THIS SUB MUST RESIDE WITHIN ONE 256 BYTE PAGE
GETVAR:  SEX    R2         ;ASSURE INDEX X REG IS R(2)
         LDA    RF         ;GET VARIABLE TYPE BYTE, INC. R(F)
         SMI    04H        ;REDUCE 84-8B TO 80-87, THEN AND WITH 87 MASK TO
         ANI    87H        ;KEEP VAR.VAL IN RANGE, LESS THAN 88 AND.....
         ORI    80H        ;GREATER THAN 7F , PREVENTING ERRONIOUS EXECUITION.
         PLO    RA         ;STROE AS LOW ADDRESS FOR LOOK-UP-JUMP
         GHI    R3         ;GET HIGH ADDRESS OF BLOCK
         PHI    RA         ;SET HIGH ADDRESS FOR LOOK-UP-JUMP
         LDN    RA         ;GET LOW ADDRESS OF VARIABLE ROUTINE...
         PLO    R3         ;.. AND PUT IT IN PC TO CAUSE A JUMP

;RETURN WITH BYTE 00 IF PORT IS OFF, OR WITH ONLY THE SELECTED BIT SET
OTPRTN:  CALL   BITSET     ;CREATE BIT MASK AS SPECIFIED BY PROG. BYTE
         GHI    RA
         STR    R2         ;PUT ON STACK
         LDA    RF         ;PROG. BYTE, INC. INTERP. POINTER R(F)
         ANI    08H        ;TEST FOR UPPER OR LOWER PORT
         LSZ               ;IF BIT 4 NOT SET,SKIP 2 INSTRUCTION & GET LOW PORT BIT
         GHI    R9         ;... ELS GET HIGH POTR BIT, AND SKIP LOW PORT
         SKP
```

```
              GLO     R9
              AND              ;AND PORT STAT WITH MASK TO RETURN WITH SELECTED BIT
              BR      FINSH
;INPUTS CAN BE FROM EITHER ANALOG OR DIGITAL INPUTS. THE HIGH NIBBLE OF THE
;PORT SPECIFYING BYTE DETERMINES A/D OR DIGITAL: IF > 0,LOW NIBBLE IS ADC
;CHANNEL; IF = 0, THE LOW NIBBLE IS THE PORT CHANNEL NUMBER
INPUTN:       LDN     RF       ;GET PORT I.D. & CHANNEL
              ANI     0F0H     ;CLEAR LOW NIBBLE
              BZ      PORT     ;IF HIGH NIBBLE IS 0, DIGITAL INPUT....
              LDA     RF       ;..ELSE GET ADC PORT NUMBER & ADVANCE INTERP. PC
              PHI     RA
              CALL    REDADC   ;AND DO ADC CONVERSION
              GHI     RA
              BR      FINSH    ;CONFIGURE DATA AND RETURN
PORT:         LDN     RF       ;GET DIGITAL INPUT NUMBER,BUT DON'T ADVANCE POINTER
              ANI     08H      ;TEST FOR HIGH OR LOW PORT
              LSZ              ;IF LOWER,SKIP READING HIGH PORT & SKIP
              INP5             ;READ HIGH INPORT
              SKP              ;SKIP READING LOW PORT
              INP4             ;READ LOW INPORT
              CALL    BITSET   ;CREATE BIT MASK FOR PORT BIT
              GHI     RA       ;GET MASK
              INC     RF       ;INC. INTERP.PC NOW THAT BIT MASK IS SET
              AND              ;MASK INPORT DATA TO GET PORT BIT
              BR      FINSH    ;CONFIGURE DATA & RETURN
;RETURN STATUS OF SELECTED BSR DEVICE; 02=ON , 03=OFF ANYTHING ELSE IS NOT VALID
BSRNN:        LDA     RF       ;GET BSR CODE FROM INTERP. PC & ADVANCE
              PLO     RA       ;SAVE IT AS LOW ADDRESS OF STAT. TABLE
              LDI     A.1(BSRSTA)  ;SET HIGH ADDRESS
              PHI     RA
              LDN     RA       ;GET BSR STAT FOR SPEC.ED CODE
              BR      FINSH    ;CONFIGURE DATA & RETURN
;RETURN CLOCK TIME AS 2 BYTES IN R(A).1,.0
CLKDAT:       GHI     R7       ;MOVE R(7) DATA (THE INTERUPT CLOCK) INTO R(A)
              PHI     RA
              GLO     R7
MTCHW:        ANI     0E0H     ;ROUND TIME OFF TO 64 SECOND INCREMENTS TO ALLOW FOR
              PLO     RA          ;CONTROL-LOOP CYCLE TIME
              EXIT
;RETURN IMIDEATE DATA IN R(A) FROM INTERP.PC
DATANN:       LDA     RF       ;GET DATA BYTE & ADVANCE PC
              SKP              ;SKIP READING DAY IN NEXT ROUTINE AND USE THE REST
;RETURN THE CLOCK DAY OF THE WEEK
CLKDAY:       GLO     R8       ;GET DAY NUMBER FROM REG(8)
FINSH:        PLO     RA       ;STORE 'D' IN REG.(A).0
              LDI     00H      ;SET REG.(A).0 LOW FOR MOST VARIABLES WHICH ARE 1 BYTE
              PHI     RA
              EXIT             ;RETURN
;READ THE SCHEDUAL TIME FROM THE INTERP. PC POINTER & PUT IT IN R(A)
SCHTIM:       LDA     RF       ;GET HIGH BYTE OF SCHD.TIME AND ADVANCE THE PC......
              PHI     RA       ;...INTO HIGH R(A)
              LDA     RF       ;GET LOW BYTE OF SCHD.TIME AND ADVANCE THE PC...
              BR      MTCHW    ;...THEN JUMP TO SAVE IT LIKE CLKDAT TO SAVE MEM.
;REURN DIFERENCE-TIME BETWEEN DELAY-TIME-START AND CLOCK-TIME.
; ADJUST FOR AFTER MIDNIGHT WRAP-AROUND.
DLYTIM:       CALL    SDLTBL   ;SET R0 AS POINTER TO DELAY TABLE
              SEX     R0
              GLO     R7       ;GET CLOCK TIME
              SM               ;DO 1st SUBTRACTION: CT-DT=>R(A),DF
              PLO     RA
              INC     R0       ;(POINT X TO HIGH VALUE)
              GHI     R7
              SMB
              PHI     RA
              BPZ     DLYOK    ;IF DF=1, NO BORROW OCCURED, VALUE IS OK. ELSE....
              GLO     RA       ;...SUBTRACT 'GAP' BETWEEN MIDNIGHT AND FFFFH
              SMI     40H      ; R(A)-5740H=> R(A),DF
              PLO     RA
              GHI     RA
              SMBI    57H
              PHI     RA
DLYOK:        SEX     R2       ;RESTORE X
```

```
        GLO     RA
        BR      NTCHW   ;ROUND TIME OFF AS IN CLT-TIME ROUTINE

;PROCEDURE-ERROR IN INTERPRETER MESSAGE :     PROCEDURE NOT DEFINED.
;THE OLD R(F) MUST BE RESTORED SO THAT A VALID ERROR ADDRESS IS SENT.
PERRMS: INC     RC      ;INC DATA STACK BACK TO GET SAVED VALUES
        LDA     RC
        PHI     RF      ;RESTORE OLD HIGH INTERP. P.C.
        LDA     RC      ;GET OLD LOW R(F)
        PLO     RF      ;RESTORE IT, AND USE NORMAL ERROR MESSAGE.....

;ERROR IN INTERPRETER INSTRUCTION STRING MESSAGE; SEND ERROR HEADER & ADDRESS
; ADDRES IN MEM. WHERE INVALID BYTE OCCURES. THEN RETURNS TO RESTART THE SYSTEM
ERRMSG: CALL    SNDMSG  ;SEND ERROR HEADER
        DC      'ER-@'
        DB      00H
        GHI     RF      ;GET CURRENT INTERP. PC HIGH ADDRESS AND SEND IT
        PHI     RA
        CALL    BYTSND
        GLO     RF      ;SANE FOR THE LOW ADDRESS
        PHI     RA
        CALL    BYTSND
        LBR     BSRUPD  ;THEN DO THE BSR UPDATE & RESTART THE PROGRAM

;SET R(F) AS AN INDEX REGISTER BY READING 4 ASCII/HEX BYTES FROM THE LINE INPUT
;BUFFER, M(R(D)), AND CONVERTING THEM TO HEX., LOADED INTO R(F)
SETNDX: DEC     RC      ;MAKE ROOM ON THE DATA STACK
        LDA     RD      ;GET BYTE FROM BUFFER & INC.
        STR     RC      ;SAVE IT FOR CONVERSION
        DEC     RC      ;DEC STACK
        LDA     RD      ;GET NEXT BYTE & INC
        STR     RC      ;SAVE ON STACK
        CALL    ASCHEX  ;CONVERT IT AND RETURN HEX IN R(A).1
        GHI     RA      ;GET IT AN MOVE IT TO R(F).1
        PHI     RF
        LDA     RD      ;DO THE SAME FOR THE NEXT 2 ASCII/HEX BYTES....
        STR     RC
        DEC     RC
        LDA     RD
        STR     RC
        CALL    ASCHEX
        GHI     RA      ;...AND MOVE INTO R(F).0
        PLO     RF
        INC     RC      ;RESTORE DATA STACK
        EXIT            ;...AND RETURN

NOLIST
;****************************************
; NEW BSR CONTROL PROGRAM      3/9/86 P.T.Miller
;  The BSR control signals consist of pulses of 120Khz signals placed across
; the 60Hz AC power lines and synchronized to the zero crossings. A "1" bit is
; reppresented by 3 1mS bursts separated by 1.793mS off peiodes, and starting
; 200uS after the zero crossing. A "0" bit is no signal for 1 half cycle from
; zero crossing to zero crossing. A control signal consistes of 3 parts: the
; LEADER, the HOUSE code, and the DEVICE select or CONTROL code.
;  The LEADER consistes of 3 "1" bits followed by a "0" bit. That is imidiately
; followed by the 4 bit HOUSE code and the 5 bit DEVICE or CONTROL code. These
; are sent, MSB first, with each bit being followed by its inverse,so that 2
; bits of BSR signal are sent for every bit of data (except the LEADER).
;  The controling sequence consistes of 2 parts: 1) send the HOUSE and DEVICE
; code. 2) send the HOUSE and CONTROL code. HOUSE code are 0 to F hex, 4 bits.
; CONTROL and DEVICE codes are 5 bits. For selecting the device, the lower 4
; bits are specify the device and the 5th bit is set to 0. CONTROL codes have
; 5th bit set to 1 and only use the low 3 bit to specify 1 of 6 control func-
; tions. It is also NECCESSARY to allow at least 2 full 60Hz cycles between
; messages.
```

|          | D8 | D4 | D2 | D1 | D16 |     |
|----------|----|----|----|----|----|-----|
| CLEAR:   | 0  | 0  | 0  | 0  | 1  | 10H |
| ALL:     | 0  | 0  | 0  | 1  | 1  | 11H |
| ON:      | 0  | 0  | 1  | 0  | 1  | 12H |
| OFF:     | 0  | 0  | 1  | 1  | 1  | 13H |
| BRIGHTEN:| 0  | 1  | 0  | 0  | 1  | 14H |

```
;           DIMMER:      0     1     0     1     1    15H
;
; The HOUSE and DEVICE codes follow the same Real to Logical sequence,("1" or
; "A" on the code selector not being 0001 as a 4 bit hex code) :
;   Logical:    1  2  3  4  5  6  7  8  9 10 11 12 13 14 15 16
;               A  B  C  D  E  F  G  H  I  J  K  L  M  N  O  P
;   Real,hex:   6  E  2  A  1  9  5  D  7  F  3  B  0  8  4  C
;
; Line:    _-----_        _-----_       _-----_       _-----_        _---
;        - -/     \ - - -/       \ - -/       \ - -/       \ - -/   -
;      __/         \_____/         \_____/         \_____/         \_____/
; Zero Crosings:
;          :       :        :       :       :       :       :       :
; 120khz Bursts:
;       ----H-H-H---H-H-H---H-H-H----------H-H-H-------------------H-H-H---H-H-H-
;           1       1       1       0       1       0       0       1       1
;       ^........... LEADER ..........^    "1"data  ^    "0"data  ^
;                                       Start of HOUSE code 101...
;
;Bit stream .. 1  1  1  0  H4 H4 H2 H2 H1 H1 H0 H0 D4 D4 D2 D2 D1 D1 D16 D16 ..
;
;  Hn are the house code bits, Dn are the DEVICE code bits if D16 is low, or
;  the CONTROL code bits if D16 is high.
; The uP clock is running @ 2.097152 Mhz, providing a uCycle time of 3.8147uS/uC ; Sychronize to the lines zero crossings; Uses the Flag-Line to test if the ZCP
; (ZeroCrossingPulse) is high or low and waits to find falling edge.(The control
; modual used with this program must supply active-low pulses at each power line
; zero crossing.) If no ZCPs are received within 54.6mS (1 zero crossing period
; is 8.333mS), the routine times out and returns Reg.(0).0 as 00.
        LIST SYNC:   GHI     R3      ;USE HIGH PC, WICH SHOULD BE 07H, TO SAVE MEM.
        ;MAKE SURE FLAG LINE IS HIGH FIRST TO FIND FALLING EDGE...
        PHI     R0      ;SET DOWN COUNTER
SYLOW:  DEC     R0      ;2uC\
        GHI     R0      ;2uC  8uC X ~1792min X 3.8147uS/uC = 54.6mS
        BZ      EXSYNC  ;2uC /  IF TIME-OUT COUNTER IS 00, EXIT
        BN3     SYLOW   ;2uC/   IF FLAG-LINE IS LOW,LOOP TILL HIGH
        ;NOW WAIT FOR FLAG-LINE TO GO LOW, INDICATING ZERO CROSSING
        GHI     R3      ;USE HIGH PC, WICH SHOULD BE 07H, FOR DATA TO SAVE MEM.
        PHI     R0      ;SET DOWN COUNTER
SYHI:   DEC     R0      ;2uC\
        GHI     R0      ;2uC  8uC X ~1792min X 3.8147uS/uC = 54.6mS
        BZ      EXSYNC  ;2uC /  IF TIME-OUT COUNTER IS 00, EXIT
        B3      SYHI    ;2uC/   IF FLAG-LINE IS HIGH,LOOP TILL LOW
        ;THE 200uS DELAY BEFOR THE FIRST BIT IS SENT IS PROVIDED BY THE NEXT 26
        ; INTRUCTIONS, (11 FOR THE RETURN)
EXSYNC: PLO     R0      ;IF R0.0=00, NO POWER
PLSXIT: EXIT            ;RETURN FOR PULSE & SYNC TO SAVE MEM.

;PULSE CREATES ONE BURST OF 120Khz FOR 1mS, THEN NOTHING FOR 1.793mS
; FOR 3 BURSTS. USES R(0).0
; THIS CREATES THE PATTERN OF PUSES THAT ARE RECOGNIZED AS A "1" BSR BIT
; A "0" BIT IS CREATED BY JUST CALLING SYNC
PULSE:  CALL    SYNC    ;SYC. PULSES TO LINE
        LDI     03H     ;SET COUNTER FOR 3 BURSTS
        PLO     R0
PLSLOP: SEQ             ;SET Q ON
        LDI     41H     ;SET DELAY FOR 1mS ON     ;2uC
PSDLY1: SMI     01H     ;2uC
        BNZ     PSDLY1  ;2uC     4uC X 65 X 3.8147uS/uC = .9918ms
        REQ             ;SET Q OFF
        DEC     R0      ;DEC. BURST COUNTER
        GLO     R0      ;TEST FOR 3 BURSTS SENT
        BZ      PLSXIT  ;EXIT IF YES,..ELSE DELAY BEFOR NEXT BURST
        LDI     73H     ;2uC    115 LOOPS
PSDLY2: SMI     01H     ;2uC
        BNZ     PSDLY2  ;2uC    ((4uC X 115)+10 uC) X 3.8147uS/uC = 1.793mS
        BR      PLSLOP  ;LOOP TILL 3 BURSTS SENT

;SEND-CODE SENDS THE CONTENS OF R(A).1 AS A SERIAL BIT STREAM IN THE BSR FORMAT
; R(A).0 IS USED AS THE BITS SENT COUNTER.
```

```
SNDCOD: GLO     R0
        STXD                ;SAVE R0.0 ON STACK,LSB IS CONTROL=1/DEVCICE=0 BIT
        CALL    PULSE       ;1   SEND LEADER TO START MESSAGE
        CALL    PULSE       ;1
        CALL    PULSE       ;1
        CALL    SYNC        ;0
        INC     R2
        LDN     R2          ;GET BACK DEVICE/CONTROL BIT
        SHR                 ;SHIFT LSB INTO DF
        LDI     09H         ;SET COUNTER FOR 9 BITS OF CODE, 4 HOUSE,5 DEVIC/CONTRL
        PLO     RB
SNDCDL: GHI     RB          ;GET BYTE
        RSHL                ;SHIFT DF INTO LSB,MSB INTO DF
        PHI     RB          ;SAVE FOR NEXT SHIFT
        BNF     DTABT0      ;BRANCH TO SEND DATA BIT 0 & ITS INVERSE
DTABT1: CALL    PULSE       ;1       ;DF=1, SEND DATA BIT 1 & ITS INVERSE
        CALL    SYNC        ;INV.1
        BR      BTNXT       ;TEST FOR NEXT BIT
DTABT0: CALL    SYNC        ;0
        CALL    PULSE       ;INV.0
BTNXT:  DEC     RB          ;DEC. BIT COUNTER
        GLO     RB          ;GET & TEST IF ALL BITS SENT
        BNZ     SNDCDL      ;BRANCH TO CODE SENDING LOOP IF NOT DONE

;DELAY USED BETWEEN SENDING BSR CODE SIGNALS
DLYBSR: LDI     05H
        PLO     RB
DLYLOP: CALL    SYNC        ;WAIT 2.5 FULL 60HZ CYCLES
        DEC     RB
        GLO     RB
        BNZ     DLYLOP
PWRXIT: EXIT                ;RETURN FOR 2 SUB.S

;SEND BSR CONTROL SIGNALS TWICE & SWITCH Q. INTERUPTS ARE NOT DISABLED
; ENTER WITH R(A).1 SET TO REAL BSR CODE, R(A).0 TO CONTROL CODE
;   RETURN WITHOUT SENDING IF NO 60HZ POWER, R0.0=00
; BSR CODES C1-C16(REAL HOUSE CODE 0) ARE USED AS FLAGS, AND ARE NOT SENT
;CONVERT R(A).1 FROM JUST CONTROL TO HOUSE/CONTROL CODE
CNTBSR: GHI     RA          ;GET HOUSE CODE..
        ANI     0F0H        ;...SEPARATE IT FROM DEVICE CODE
        BZ      PWRXIT      ;RETURN IF IT IS HOUSE CODE 0, NOT ACTIVE BSR.
        STR     R2          ;SAVE IT ON STACK
        GLO     RA          ;GET CONTROL CODE
        ANI     0FH         ;SEP. IT FROM HIGH BITS
        OR                  ;COMBINE IT WITH HOUSE CODE ON STACK
        PLO     RA          ;SAVE HOUSE/CONTROL IN R(A).0, HOUSE/DEVICE IN R(A).1
;BEFOR SENDING, CHECK TO SE THAT THER IS AC POWER...
        CALL    SYNC
        GLO     R0          ;GET POWER STATUS
        BZ      PWRXIT      ;RETURN IF NO POWER , ELSE.....
; SWITCH Q TO THE BSR CONTROL PORT AND DISABLE INTERUPTS TO PREVENT TIMING
; ERRORS. THE TOTAL OF 8 MESSAGES PLUS THE DELAYS TAKES 1.80 SEC. SINCE THE
; INTERUPTS FOR THE CLOCK OCCURE EVERY 2 SEC. AND ARE LATCHED, THE CLOCK WON'T
; LOOSE TIME.
        SEX     R3          ;SET INDEX X TO PC
        OUT3                ;SWICH Q FROM RS232 TO BSR
        DB      10H         ;SWITCH DATA FOR CONTROL LATCH
        DIS                 ;DISABLE INTERUPTS
        DB      23H         ;X=2 , PC=3   (RESTORES X)

LDI     0CCH        ;SET CONTROL BITS SEQUENCE, 11001100, TO DO 8 LOOPS;
; SEND HOUSE/DEVICE TWICE,THEN HOUSE/CONTROL TWICE, AND REPEAT ONCE.
; HTIS GIVES A TOTAL OF 8 MESSAGES THAT ARE SENT; 2-TRYS AT SENDING THE WHOLE
; CONTROL FUNCTION.
XMLOOP: PLO     R0          ;PASS IT TO SNDCOD ,LSB IS 9TH BIT
        BZ      BSRXIT      ;IF CONTROL BIT SEQUENCE IS 00, DONE SENDING 2H/D,2H/C
        SHR                 ;SHIFT LSB INTO DF
        STXD                ;SAVE UPDATED CONTROL BIT SEQUENCE FOR NEXT PASS
        GHI     RA          ;GET HOUSE/DEVICE CODE
        LSNF                ;SKIP 2 IF DF=0, HOUSE/DEVICE CODE
        NOP                 ;SPACER FOR SKIP...
        GLO     RA          ;GET HOUSE/CONTROL CODE
```

```
            PHI     RB          ;PASS CODE TO SEND TO SUB.
            CALL    SNDCOD      ;SEND HOUSE CODE
            INC     R2
            LDN     R2          ;RESTORE CONTROL BIT SEQUENCE
            BR      XMLOOP      ;CONTINUE TILL ALL SENT

BSRXIT:     SEX     R3          ;SET X TO USE IMMIDEATE DATA
            OUT3                ;SWIRCH Q BACK TO RS232
            DB      00H         ;SWITCH DATA FOR CONTROL LATCH
            RET                 ;RETSTORE INTERUPTS
            DB      23H         ;X=2 , PC=3
            EXIT

NOLIST
; FIND RAM-BOTTOM; START OF PROGRAM SPACE (RAM OR EPROM), RETURN VALUE IN R(F)
; IN FULL MEMORY CONFIGURATION, ALL MEM. IS AVALIBLE; RAMBTM WILL FIND THAT
; 0800H IS RAM AND RETURN WITH R(F)=0800H. IF IT IS NOT RAM, IT WILL TEST IT
; FOR 23Hex. IF IT IS ,THEN IT IS A SPECIAL EPROM PROGRAM USING ALL MEM. AND
; IT WILL RETURN WITH R(F)=0800H. IF IT IS NOT RAM, OR 23H, THEN IT WILL SET
; R(F) TO 1000H, WHICH WILL CONTAIN EITHER RAM OR AN EPROM PROGRAM.
;Jumper Block Pins: x x x x EPROM     x x x x RAM      x x x x Full Memory
;           Jumpers:      H                    H                 H
; Note: Full RAM Memory also requires cutting the jumper wire just above Mem.
; Chip 2 and connecting the connection centered just above the chip to the hole
; just above that. This provides the MEM.WRITE signal.
            LIST
RAMBTM:     LDI     00H         ;SET FOR LOWEST RAM LOCATION
            PLO     RF
            LDI     08H         ;0800H = LOWEST ADDRESS
            PHI     RF          ;SKIP GETTING THE OLD HIGH POINTER ON THE FIRST PASS
            LDN     RF          ;GET BYTE FROM MEM.
            STXD                ;SAVE ORIGINAL BYTE ON THE STACK AND DEC STACK
            XRI     0AAH        ;CHANGE BYTE SO IT IS DIFFERENT FROM WHAT WAS THERE
            STR     R2          ;SAVE IT ON THE STACK FOR TESTING
            STR     RF          ;..AND PUT THE NEW BYTE BACK INTO MEM.
            LDN     RF          ;NOW READ IT BACK
            SM                  ;TEST IT
            IRX                 ;INC STACK BACK
            BZ      RAMBXT      ;IF IT MATCHES, 0800H IS RAM-BOTTOM, EXIT
            XRI     66H         ;TEST FOR 23H, START OF EPROM PROG.IN LOW ADDRESS
;23H IF READFROM EPROM, WOULD BECOME 66H AFTER THE AAH XOR.
            BZ      RAMBXT      ;IF IT IS , R(F)= 0800H OK, EPROM. ELSE....
PREPKG:     LDI     10H         ;SET RAM BOTTOM FOR 1000H, PREPAKAGED-PROGRAM OR RAM.
            PHI     RF
            EXIT                ;EXIT,DON'T PUT BACK BYTE FROM STACK INTO POSSIBLE RAM
RAMBXT:     LDA     R2          ;...TO GET BACK ORIGINAL BYTE...
            STR     RF          ;...AND RESTORE MEM. (IF EPROM, NOTHING HAPPENS)
            EXIT ;****** NEW SUB.
;SET POINTER R(0) TO VALUE IN DELAY TABLE
SDLTBL:     LDA     RF          ;GET # OF DELAY,
            ANI     1FH         ;PERMIT ONLY 32 DELAYS,
            SHL                 ;MULT. X2 AND...
            ADI     A.0(DLYTBL) ;ADD LOWEST DELAY ADDRESS ...
            PLO     R0          ;AND STORE AS LOW POINTER
            LDI     A.1(DLYTBL) ;SET POINTER TO DELAY TABLE
            PHI     R0
            EXIT ;TEST FOR MONITOR OCCUPYING NEXT BLOCK OF MEM. JUMP TOIT IF IT IS, ELSE SEND
; INV ERROR MESSAGE.
            ORG     07F0H
JPMONX:     LDI     08H         ;SET R(A) AS POINTER INTO NEXT BLOCK
            PLO     RA
            PHI     RA
            LDA     RA          ;GET BYTE FROM NEXT BLOCK FOR TEST
            XRI     4DH         ;TEST FOR "M"
            BNZ     NMONX       ;IF NO MATCH, JUMP TO SEND INV MESSAGE
            LDA     RA          ;GET 2ND BYTE TO MATCH
            XRI     58H         ;TEST FOR "X"
NMONX:      LBNZ    INVMSG      ;SEND INVALID MESSAGE IF NO MATCH...
            NOP                 ;..ELSE,EXICUTE INSTRUCTIONS ON INTO NEXT BLOCK

END
```

What is claimed is:

1. A slave processor for controlling environments, comprising:
   (a) a microprocessor having a first plurality of terminals connected to lines of a data bus, a second plurality of terminals connected to lines of an address bus, a third plurality of terminals connected to a corresponding plurality of selector signal lines, a serial output terminal, and a serial input terminal;
   (b) a plurality of digital outputs connected to said data bus by way of digital output means;
   (c) a plurality of digital inputs connected to said data bus by way of digital input means;
   (d) a plurality of analog inputs connected to said data bus by way of analog-to-digital conversion means having multiplexing means incorporated therein;
   (e) decoding means having a plurality of input terminals respectively connected to said plurality of selector signal lines and output terminals connected to said digital input means, said digital output means and said analog input means for sending enabling signals thereto;
   (f) interfacing means for connecting said serial input terminal of said microprocessor to an external control arrangement;
   (g) memory means connected to said data bus and said address bus for storing operating system instructions, applications program instructions, logged data and status information;
   (h) a carrier current transmission means for transmitting signals output from said serial output terminal by said microprocessor; and
   (i) switching means having an input terminal connected to said serial output terminal of said microprocessor and having a first output terminal connected to said interfacing means and a second output terminal operatively coupled to said carrier current transmission means;

wherein said microprocessor is capable of retrieving at least one bit of data information from said digital input means, retrieving a byte of data information from said analog-to-digital conversion means, sending a bit of control information to said digital output means and sending a pulse-width-modulated control signal to said carrier current transmitter in accordance with operating system instructions and applications program instructions in a first mode, and said microprocessor is capable of outputting said stored applications program instructions, logged data and status information in serial form to said interfacing means and receiving new applications program instructions in serial form from said interfacing means in accordance with operating system instructions in a second mode.

2. The slave processor as defined in claim 1, wherein said microprocessor has a clocking terminal connected to driving means inside said microprocessor and a reset terminal, further comprising a timing means connected to said clocking terminal and outputting a clocking signal of a first predetermined frequency, and counter means for dividing said clocking signal of said first predetermined frequency into a reset signal of a second predetermined frequency, said counter means having an input terminal connected to the output terminal of said timing means, a first output terminal operatively connected to said microprocessor reset terminal, and a reset terminal connected to a further output terminal of said decoding means, wherein said decoding means is capable of outputting a reset signal to said counter means in response to a predetermined combination of selector signals output by said microprocessor on said selector signal lines, said predetermined combination of selector signals in turn being output at a third predetermined frequency in accordance with operating system instructions in said first mode, and wherein said counter means is capable of outputting said reset signal of said second predetermined frequency to said reset terminal of said microprocessor, said second predetermined frequency being less than said third predetermined frequency, whereby said microprocessor is automatically reset only if the count in said counter means reaches a predetermined level as a result of the discontinuance of the regular output of said predetermined combination of selector signals at said third predetermined frequency.

3. The slave processor as defined in claim 1, further comprising power supply means and a plurality of ports, each of said ports having four contacts, including:
   (a) a first group of ports each having one contact connected to a digital output, one contact connected to an analog input, one contact connected to said power supply means, and one contact connected to ground;
   (b) a second group of ports each having three contacts connected to digital inputs and one contact connected to ground;
   (c) a third group of ports each having two contacts connected to analog inputs, one contact connected to said power supply means, and one contact connected to ground; and
   (d) a fourth group of ports each having two contacts connected to digital outputs, one contact connected to said power supply means, and one contact connected to ground.

4. The slave processor as defined in claim 3, wherein a further port has two contacts connected to digital inputs, a contact connected to said power supply means, and a contact connected to ground.

5. The sieve processor as defined in claim 3, wherein a further port has three contacts connected to analog inputs and one contact connected to ground.

6. The slave processor as defined in claim 1, wherein said memory means comprises EPROM or ROM means for storing the operating system program and RAM means for storing logged data and status information.

7. The slave processor as defined in claim 6, wherein said memory means further comprises ROM or EPROM/RAM means having a write enable terminal connected to said microprocessor by way of a user-settable jumper, said jumper having a first position whereat said EPROM/RAM means functions as an EPROM or ROM and a second position whereat said ROM or EPROM/RAM means functions as a RAM.

8. The sieve processor as defined in claim 1, wherein said external control arrangement is a higher-level computer.

9. The slave processor as defined in claim 3, wherein each of said ports is connected to a peripheral device by way of a telephone type cable.

10. The slave processor as defined in claim 1, wherein said memory means comprises a plurality of memory chips, each memory chip having a plurality of address terminals and a chip select terminal, said address terminals of said microprocessor being connected to a corresponding number of said address terminals of each memory chip, said slave processor further comprising latchin means having input terminals connected to some of said address terminals of said microprocessor and having output terminals connected to said chip select terminals by way of gating means.

11. The slave processor as defined in claim 10, wherein said latching means has further output terminals connected to those address terminals of said memory chips which are not connected to the address terminals of said microprocessor.

12. The slave processor as defined in claim 2, further comprising a latching means having an input terminal, an output terminal, and a reset terminal, said microprocessor having an interrupt terminal connected to said output terminal of said latching means and a register for storing a count corresponding to the number of interrupt signals received at said interrupt terminal after a predetermined time, said counter means having a second output terminal connected to said input terminal of said latching means, said second output terminal outputting an interrupt signal of a fourth predetermined frequency, in response to which said microprocessor updates the count in said register.

13. The slave processor as defined in claim 12, further comprising gating means having input terminals connected to first and second status terminals of said microprocessor and having an output terminal connected to said reset terminal of said latching means, said microprocessor enabling said gating means in response to an interrupt signal, whereby said latching means is reset.

14. The slave processor as defined in claim 1, wherein said digital input means comprises first and second latching circuits each having an output enabling terminal connected to an output terminal of said decoding means.

15. The slave processor as defined in claim 1, wherein said digital output means comprises first and second latching circuits each having a clock terminal operatively connected to a respective output terminal of said decoding means by way of respective gating means, and first, second and third driving circuits each having a plurality of input terminals connected to corresponding output terminals of said first and second latching circuits.

16. The slave processor as defined in claim 1, further comprising analog signal conditioning means and a plurality of current mode sensors connected to said analog-to-digital conversion means, said analog signal conditioning means being connected to input a voltage to said conversion means corresponding to the current input by a selected current mode sensor minus a base current supplied to said selected sensor, said input voltage being converted from an analog to a digital signal by said conversion means.

17. The slave processor as defined in claim 1, wherein said memory means comprises first and second memory chips in which first and second applications programs are stored, each of said first and second memory chips having a chip select terminal operatively connected to the address terminals of said microprocessor by way of a jumper block, said jumper block comprising jumpers which are settable to first and second positions, said first memory chip being selected in response to predetermined chip select signals from said microprocessor when said jumpers are in said first positions and said second memory chip being selected in response to said predetermined chip select signals from said microprocessor when said jumpers are in said second positions, said microprocessor outputting said predetermined chip select signals when an applications program instruction is to be performed.

18. The slave processor as defined in claim 1, wherein said interfacing means comprise first through fourth current mode operational amplifiers and an RS232 connector having a plurality of contacts, said first operational amplifier having an output terminal operatively connected to said microprocessor and an input terminal operatively connected to a first contact of said RS232 connector for receiving a request-to-send signal from said external control arrangement, said second operational amplifier having an input terminal operatively connected to said microprocessor and an output terminal connected to a second contact of said RS232 connector for outputting a clear-to-send signal to said external control arrangement, said third operational amplifier having an input terminal operatively connected to said serial output terminal of said microprocessor by way of said switching means and an output terminal connected to a third contact of said RS232 connector for transmitting serial data to said external control arrangement, and said fourth operational amplifier having an output terminal operatively connected to said serial input terminal of said microprocessor and an input terminal operatively connected to a fourth contact of said RS232 connector for receiving serial data from said external control arrangement.

19. The slave processor as defined in claim 18, wherein said serial data received at said serial input terminal by said microprocessor is converted to parallel data inside said microprocessor in accordance with operating system instructions stored in said memory means.

20. The slave processor as defined in claim 19, wherein the serial data transmitted at said serial input terminal by said microprocessor is converted from parallel data inside said microprocessor in accordance with operating system instructions stored in said memory means.

21. The slave processor as defined in claim 1, wherein said analog-to-digital conversion means has a plurality of selection input terminal connected to said microprocessor by way of said first data bus and a plurality of analog input terminals respectively connected to said plurality of analog inputs, a selected one of said plurality of analog input terminals being enabled in response to a predetermined combination of selection signals received at said selection input terminals.

22. The slave processor as defined in claim 1, further comprising a remotely located analog setting module connected to one of said ports and an alarm circuit connected to another of said ports, said analog setting module having a user-accessible dial for setting an analog signal, said microprocessor being capable of disarming said alarm circuit only in response to the setting of said dial to produce an analog signal corresponding to a prestored predetermined analog value.

* * * * *